US 8,248,484 B2

(12) United States Patent
Sugimoto

(10) Patent No.: US 8,248,484 B2
(45) Date of Patent: Aug. 21, 2012

(54) IMAGING APPARATUS AND METHOD

(75) Inventor: Masahiko Sugimoto, Kawasaki (JP)

(73) Assignee: FUJIFILM Corporation, Tokyo (JP)

( * ) Notice: Subject to any disclaimer, the term of this patent is extended or adjusted under 35 U.S.C. 154(b) by 382 days.

(21) Appl. No.: 12/509,047

(22) Filed: Jul. 24, 2009

(65) Prior Publication Data

US 2010/0020191 A1  Jan. 28, 2010

(30) Foreign Application Priority Data

Jul. 25, 2008  (JP) .................................. 2008-192281
Jul. 29, 2008  (JP) .................................. 2008-195273

(51) Int. Cl.
H04N 5/235 (2006.01)
H04N 5/228 (2006.01)

(52) U.S. Cl. ................................................... 348/222.1
(58) Field of Classification Search ............... 348/222.1, 348/224.1, 229.1, 230.1, 231.99, 231.2, 231.3, 348/231.6
See application file for complete search history.

(56) References Cited

U.S. PATENT DOCUMENTS

| 7,855,740 B2 * | 12/2010 | Hamilton et al. ............ 348/273 |
| 2007/0153111 A1 * | 7/2007 | Kato .......................... 348/333.11 |
| 2007/0279499 A1 * | 12/2007 | Takeshita .................... 348/231.6 |
| 2008/0037975 A1 * | 2/2008 | Nakajima ...................... 396/104 |
| 2008/0088710 A1 * | 4/2008 | Iwamoto et al. ............. 348/220.1 |
| 2009/0009606 A1 * | 1/2009 | Takeuchi ....................... 348/169 |
| 2011/0090368 A1 * | 4/2011 | Iwamoto et al. .......... 348/231.99 |

FOREIGN PATENT DOCUMENTS

| EP | 1 748 378 A1 | 1/2007 |
| JP | 2001-320623 A | 11/2001 |
| JP | 2003-244530 A | 8/2003 |
| JP | 2003-344891 A | 12/2003 |
| JP | 09-070012 A | 3/2007 |

OTHER PUBLICATIONS

EP Communication, dated Jan. 15, 2010, issued in corresponding EP Application No. 09251860.4, 7 pages.

* cited by examiner

Primary Examiner — Nicholas Giles
(74) Attorney, Agent, or Firm — Sughrue Mion, PLLC

(57) ABSTRACT

To output stable results as necessary when recognizing scenes with a camera. Unless the result of scene recognition can be stabilized, an output result will confuse the user. In consideration thereof, by combiningly performing processing for determining what type of scene a particular scene is and processing for monitoring whether or not a change has occurred from a recognized scene, it is now possible to perform scene recognition in an accurate and stable manner.

8 Claims, 36 Drawing Sheets

FIG.16
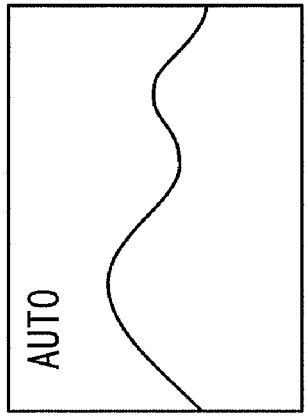
LANDSCAPE
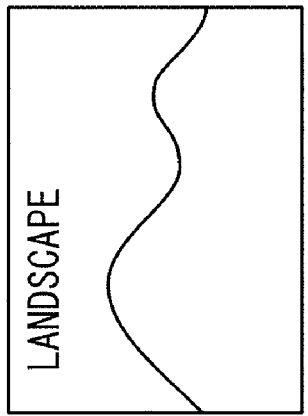
AUTO
AUTOMATIC SCENE RECOGNITION ON
WHEN JUDGEABLE          WHEN NOT JUDGEABLE
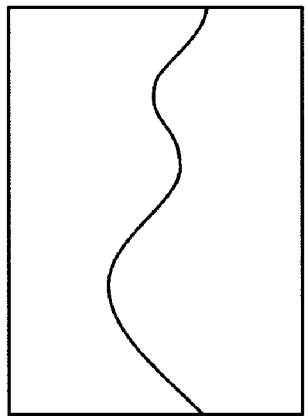
AUTOMATIC SCENE RECOGNITION OFF
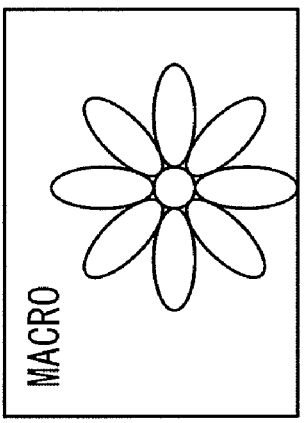
MACRO
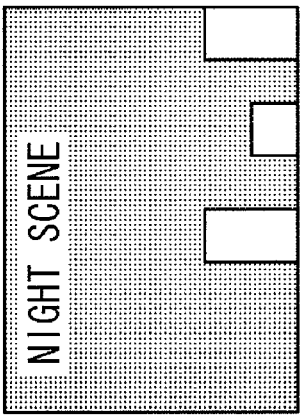
NIGHT SCENE
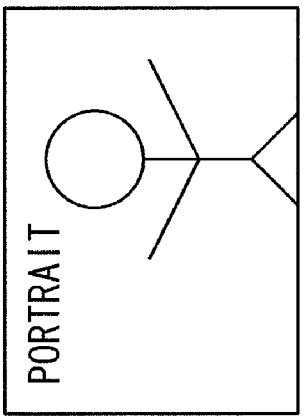
PORTRAIT
OTHER EXAMPLES

FIG.18

| ORDER | PROCESSING | WEIGHT | CHANGE RESULT | | |
|---|---|---|---|---|---|
| 1 | FACE PRESENCE/ABSENCE CHANGE | 2 | ○ | ○ | × |
| 2 | FOCUS POSITION CHANGE | 1 | ○ | × | ○ |
| 3 | PHOTOMETRIC VALUE CHANGE | 1 | × | × | ○ |
| | change_measure | | 3 | 2 | 2 |
| | FRAME CHANGE (E_AUTOSP_FRAME_CHANGE_MEASURE = 2) | | ○ | ○ | × |

NOTE: CIRCLES DENOTE OCCURRENCE OF CHANGE, CROSSES DENOTE THAT CHANGE HAS NOT OCCURRED

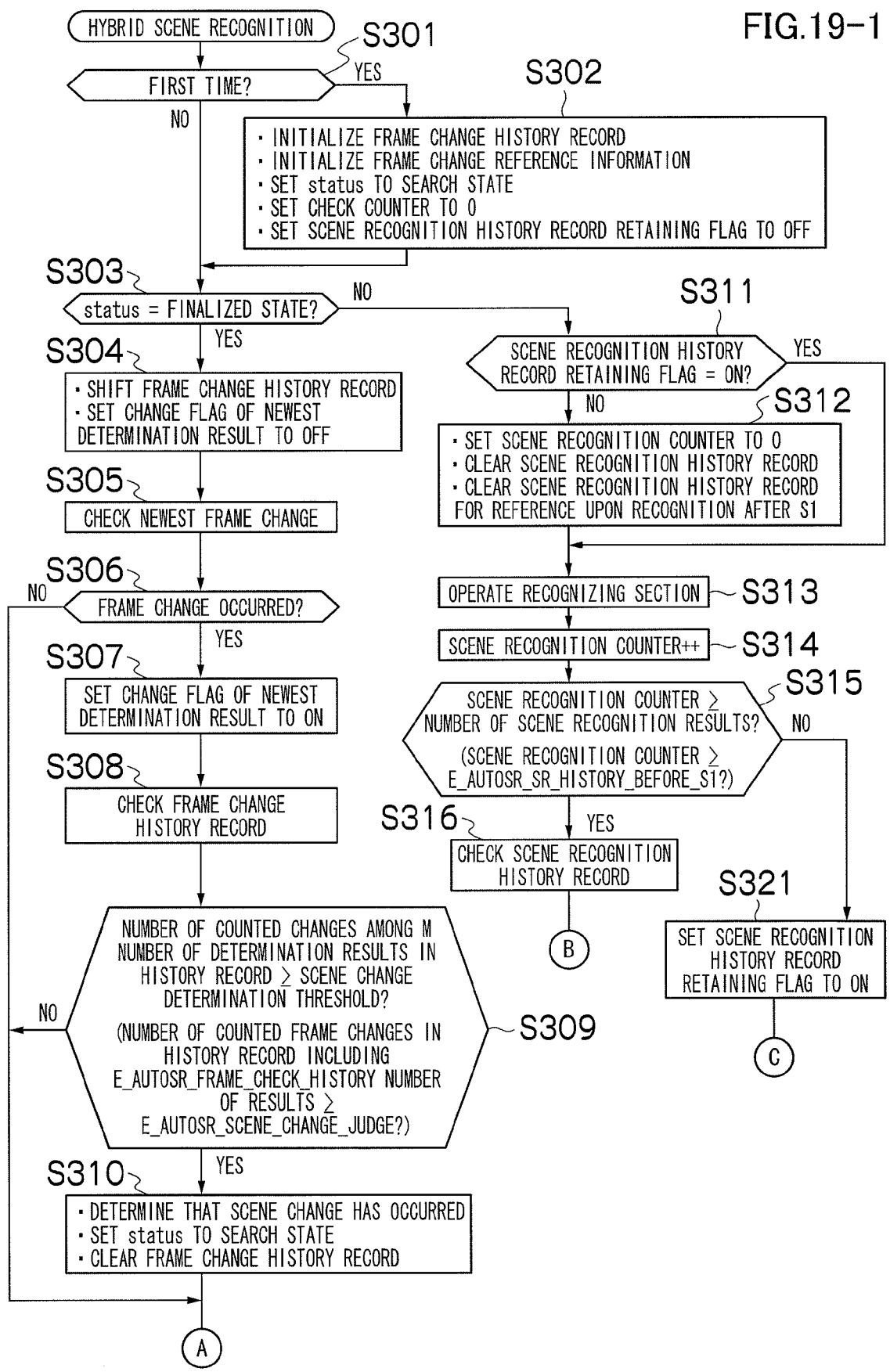

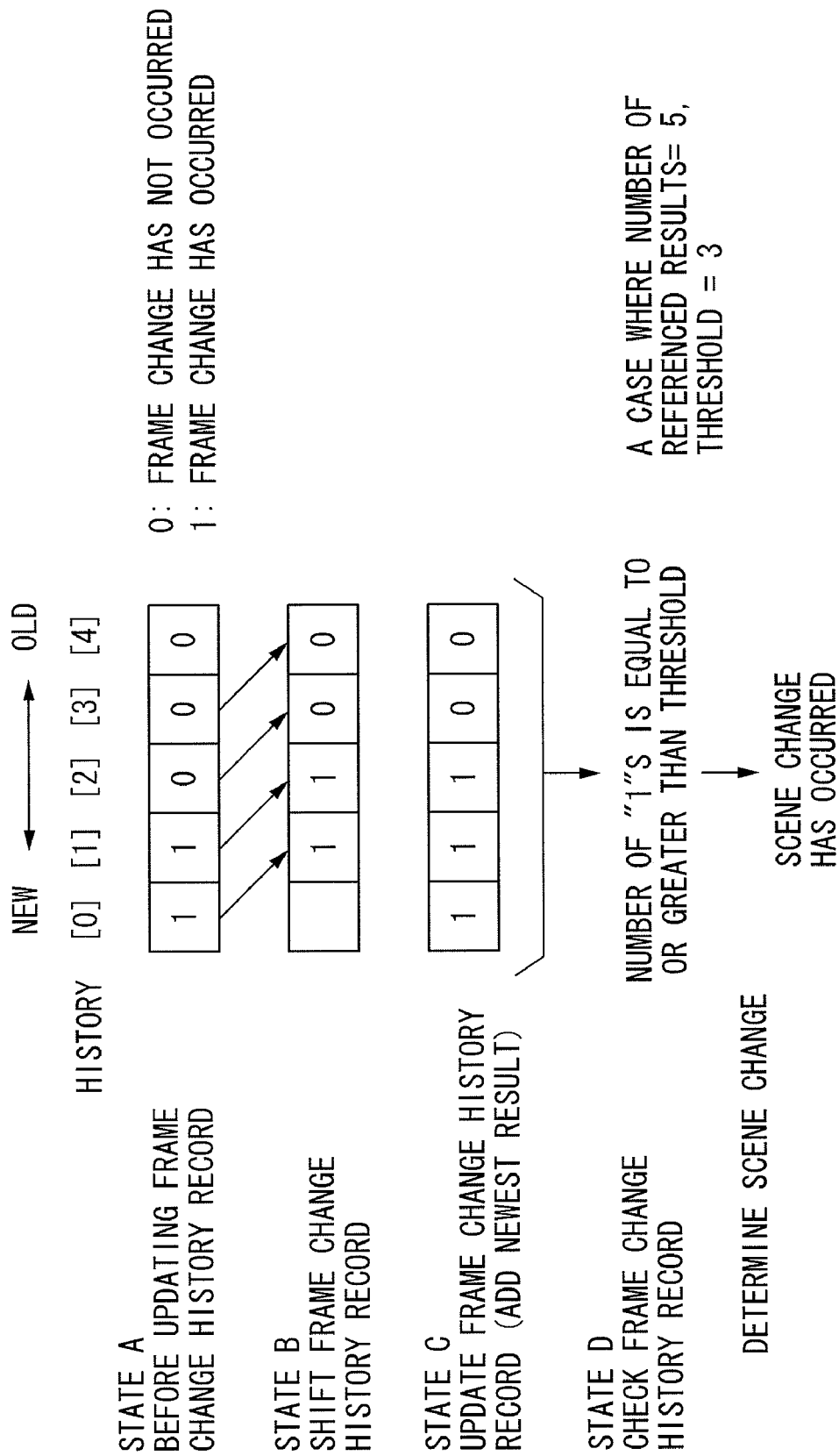

| CUMULATIVE SCORE | SCENE ID | SCORE |
|---|---|---|
| | 3 | 10 |
| | 1 | 5 |
| | 0 | 4 |
| | OTHER | 0 |

JUDGMENT OF CURRENT SCENE (SR)    SR = 3

IMAGING APPARATUS AND METHOD

BACKGROUND OF THE INVENTION

1. Field of the Invention

The present invention relates to an imaging apparatus including a photographic scene recognition function.

2. Description of the Related Art

In Japanese Patent Application Laid-Open No. 2003-244530, whether or not an actual photographic scene is appropriate with respect to a set photographic mode is judged based on a digital image signal loaded via a CCD or on an EV value. When the photographic mode is appropriate, a digital camera performs photographic processing in the photographic mode and records information on the photographic mode on a header portion of image data. When the photographic mode is inappropriate, the digital camera confirms with an operator as to whether or not photography is to be carried out in the set photographic mode and transitions to photographic processing, and either confirms with an operator as to whether or not the photographic mode information is to be recorded on the header portion of image data or records standard photographic mode information.

Japanese Patent Application Laid-Open No. 2003-344891 discloses a photographing mode autoconfiguration camera that sets a photographing mode of the camera based on output information from a face recognizing device and a state detecting device. The camera according to Japanese Patent Application Laid-Open No. 2003-344891 automatically configures a camera photographing mode (shooting mode) based on output information on subject movement, imaging magnification, or subject distance. Here, photographic mode settings include Tv value, Av value, program, diagram, exposure (dimming correction), strobe flashing, zoom AF mode, paper feed mode, photometry mode, and the like.

SUMMARY OF THE INVENTION

"Photographic mode check processing" (S13 in FIG. 2) according to Japanese Patent Application Laid-Open No. 2003-244530 is always in working condition. Therefore, the processing becomes less efficient compared to the case where the processing is performed when necessary. In addition, "photographic mode autoconfiguration" (step 112 in FIG. 4) according to Japanese Patent Application Laid-Open No. 2003-344891 is a once-only operation performed after a shutter button is pressed halfway. Therefore, an appropriate photographic mode is not necessarily stably set in response to photographic scenes that are likely to change constantly.

An object of the present invention is to output stable results as necessary when recognizing scenes with a camera.

An imaging apparatus according to a first aspect of the present invention comprises: an information acquiring device which acquires photographic information which is information on a photographic scene; a reference information registering device which registers reference information which is set based on the photographic information; a scene change determining device that determines whether or not the scene has changed based on the reference information stored in the reference information registering device and the photographic information acquired by the information acquiring device, a scene recognizing device which recognizes a scene based the photographic information acquired by the information acquiring device when it is determined, by the scene change determining device, that a scene is changed; and a control device which performs at least one of display control, photographic control, signal processing control, and information recording control in response to a scene recognition result by the scene recognizing device.

In the imaging apparatus, the scene recognition device can update the reference information registered in the reference information registering device based on the photographic information corresponding to the scene recognition result.

In the imaging apparatus, the information acquiring device can acquire at least one of: face detection result information indicating whether a human face exists in the photographic scene; subject distance information on a subject distance; and photometric information on brightness of a subject.

Otherwise, in the imaging apparatus, the information acquiring device can acquire, as the photographic information, two or more of: face detection result information indicating whether a human face exists in a photographic scene; subject distance information on a subject distance; and photometric information on brightness of a subject, and the scene change determining device can determine whether the photographic scene has changed or not based on the photographic information acquired by the information acquiring device and the reference information corresponding to the photographic information.

In the imaging apparatus, the scene change determining device can include a weight setting device which respectively weights, by information type, the two or more of information acquired by the information acquiring device and the reference information corresponding to the two or more of information.

In the imaging apparatus, the scene change determining device can comprise: a single scene change determining device which successively determines the occurrence/nonoccurrence of scene change based on the reference information stored in the reference information registering device and the photographic information acquired by the information acquiring device; a scene change history record registering device which registers, as a scene change history record, single scene change determination results by the single scene determining device; and a total scene change determining device which determines whether the photographic scene has changed or not based on the scene change history record.

In the imaging apparatus, the scene recognizing device can comprise: a single scene recognizing device which executes, for a predetermined time period or a predetermined times, single scene recognition for recognizing the photographic scene based on the photographic information acquired by the information acquiring device; a scene recognition history record registering device which registers, as a scene recognition history record, a history of single scene recognition results by the single scene recognizing device; and a total scene recognizing device which executes total scene recognition for recognizing the photographic scene based on the scene recognition history record registered in the scene recognition history record registering device.

In the imaging apparatus, the total scene recognizing device can detect a photographic scene with a greatest frequency from the scene recognition history record, and recognize the photographic scene with the greatest frequency as the total scene recognition result.

In the imaging apparatus, the total scene recognizing device detects a plurality of photographic scenes with the greatest frequency are detected, the total scene recognizing device can recognize a most recent photographic scene with the greatest frequency as the total scene recognition result.

In the imaging apparatus, the total scene recognizing device can include: a weight setting device which weights each single scene recognition result in the scene recognition history record registered in the scene recognition history record registering device such that the greater weight is assigned to the newer single scene recognition result; and a calculating device which calculates a cumulative score for each single scene recognition result weighted by the weight setting device, and the total scene recognizing device can determine a single scene recognition result with the highest cumulative score calculated by the calculating device, as the total scene recognition result.

The imaging apparatus can further comprise a shutter button which instructs photometering and ranging for primary exposure when halfway pressed and instructs primary exposure when fully pressed, wherein a number of single scene recognition results before the shutter button is halfway pressed and a number of single scene recognition results after the shutter button is halfway pressed are separately set in the scene recognition history record registered in the scene recognition history record registering device.

The imaging apparatus can further comprise a photographic information history record registering device which registers, as a photographic information history record, a history of the photographic information acquired by the photographic information acquiring device, wherein the scene recognition device comprises a total scene recognizing device which performs total scene recognition for recognizing the photographic scene based on the photographic information history record registered in the history record registering device.

The imaging apparatus can further comprise a shutter button which instructs photometering and ranging for primary exposure when halfway pressed and instructs primary exposure when fully pressed, wherein a number of units of photographic information before the shutter button is halfway pressed and a number of units of photographic information after the shutter button is halfway pressed are separately set in the photographic information history record registered in the photographic information history record registering device.

The imaging apparatus can further comprise a photographing mode setting device which sets a photographing mode depending on the scene recognition result by the scene recognition device, wherein the control device performs the photographic control according to the set photographing mode.

The imaging apparatus can further comprise a shutter button that instructs photo-metering and ranging for primary exposure when halfway pressed and instructs primary exposure when fully pressed, wherein after the shutter button is pressed halfway, the information acquiring device acquires only information indicating a subject distance for primary exposure and information on the brightness of a subject for primary exposure.

The imaging apparatus can further comprise a selecting device which selects a timing to perform scene recognition of the photographic scene from upon a determination of scene change or at a predetermined cycle; and a cycle setting device which sets the predetermined cycle when the scene recognition is to be performed, wherein when the selecting device selects to perform the scene recognition of the photographic scene at the predetermined cycle, the scene recognition device performs the scene recognition of the photographic scene based on the photographic information acquired by the information acquiring device at the predetermined cycle set by the cycle setting device instead of upon the determination of scene change by the scene change determining device.

In the imaging apparatus, the predetermined cycle to be set by the cycle setting device can be a preset cycle or a cycle arbitrarily settable by a user.

According to a second aspect of the present invention, an imaging method comprises: acquiring photographic information which is information on a photographic scene; recognizing a scene from the acquired photographic information; storing reference information which is set based on the photographic information corresponding to the scene recognition result; determining whether the scene has changed or not from based on the stored reference information and the acquired photographic information; recognizing the scene based on the photographic information when it is determined that the scene has changed; and performing at least one of display control, photographic control, signal processing control, and information recording control in response to the scene recognition result.

In the imaging method, the recognizing of a scene can include: a single scene recognizing step for recognizing the photographic scene based on the acquired photographic information; a scene recognition history record registering step for registering a predetermined number of newest single scene recognition results recognized in the single scene recognizing step as a scene recognition history record in a history record registering device; and a total scene recognizing step for recognizing the photographic scene based on the scene recognition history record registered in the scene recognition history record registering device.

Otherwise, in the imaging method, the recognizing of a scene can include: a photographic information history record registering step for registering a predetermined number of newest units of photographic information as photographic history record in a photographic information history record registering device; and a total scene recognizing step for recognizing the photographic scene based on the photographic information history record registered in the photographic information history record registering device.

According to the present invention, processing for determining what kind of scene a particular scene is, and processing for monitoring whether a scene change has occurred compared to a scene when the recognition has been performed are combinedly operated. Moreover, the determination of a kind of scene (scene recognition) is performed when the scene has changed. This enables scene recognition to be performed in an accurate and stable manner.

BRIEF DESCRIPTION OF THE DRAWINGS

FIG. 16 is a diagram showing an example of a scene judgment result display;

FIG. 18 is a table showing a relationship between weights E_AUTOSP_FRAME_CHECK1 to 3 corresponding to first to third frame change checks and "change_measure" values corresponding to the occurrence/nonoccurrence of changes in the first to third frame change checks;

FIG. 20 is a diagram showing an example of frame change history records; and

DETAILED DESCRIPTION OF THE PREFERRED EMBODIMENTS

First Embodiment

Figure 1:
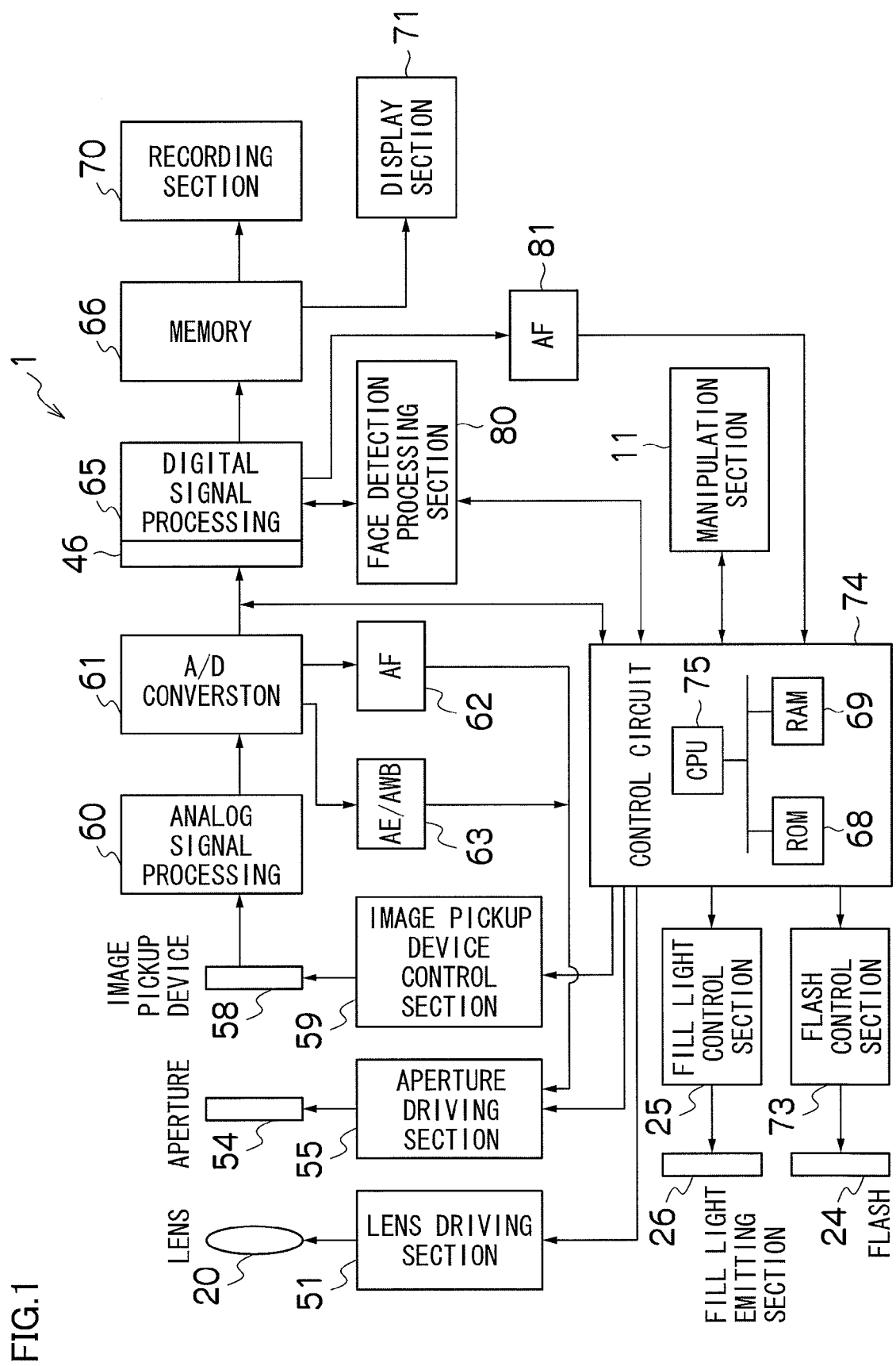
FIG. 1 is a schematic block diagram showing a configuration of a digital camera.

FIG. 1 is a schematic block diagram showing a configuration of a digital camera 1 according to the present invention. A digital camera 1 converts image data acquired through photography into an Exif-format image file and records the Exif-format image file into a recording section 70 such as an external recording medium that is attachable/detachable to a main body.

A manipulation system of the digital camera includes: a manipulation section 11 having an operating mode switch, a menu/OK button, a zoom/upward/downward arrow lever, a leftward/rightward arrow button, a Back (return) button, a display switching button, a shutter button, a power switch, and the like; and a control circuit 74 that interprets contents of manipulations performed on the manipulation section 11 and controls the respective sections. The control circuit 74 includes: a CPU 75 which performs information processing; a ROM 68 on which are recorded programs defining information processing, firmware, constants such as thresholds used when performing various judgments with the programs, and the like; and a RAM 69 storing variables, data, and the like necessary for information processing.

A lens 20 includes a focusing lens and a zoom lens. The lens 20 is movable in the direction of an optical axis by a lens driving section 51. The lens driving section 51 controls movement of the focusing lens or the zoom lens based on either focusing lens driving amount data outputted from the CPU 75 or manipulation amount data of the zoom/upward/downward arrow lever included in the manipulation section 11.

In addition, an aperture 54 is driven by an aperture driving section 55 including a motor and a motor driver. The aperture driving section 55 adjusts an aperture diameter based on aperture value data outputted from an AE/AWB processing section 63.

An image pickup device 58 such as a CCD or a CMOS is disposed posteriorly to an imaging optical system including the lens 20 and the aperture 54. The image pickup device 58 has a photoelectric surface on which a large number of light receiving elements are arranged two-dimensionally. A subject light passed through the optical system is formed on the photoelectric surface to be subjected to photoelectric conversion. A microlens array for collecting light to each pixel and a color filter array in which filters of the respective colors of R, G, and B are regularly arranged are disposed anteriorly to the photoelectric surface. The image pickup device 58 outputs, line by line, electrical charges accumulated per pixel as serial analog photographic signals in synchronization with a vertical transfer clock and a horizontal transfer clock supplied from an image pickup device control section 59. The period of time over which an electrical charge is accumulated in each pixel or, in other words, an exposure time is determined by an electronic shutter driving signal provided from the image pickup device control section 59. In addition, a gain of the image pickup device 58 is adjusted by the image pickup device control section 59 so that analog photographic signals of a predetermined size can be acquired.

An analog photographic signal loaded from the image pickup device 58 is inputted to an analog signal processing section 60. The analog signal processing section 60 includes a correlated double sampling (CDS) circuit that removes noise from an analog signal and an auto-gain controller (AGC) that adjusts the gain of the analog signal.

An A/D converting section 61 converts an analog image signal processed by the analog signal processing section 60 into digital image data. The image data converted into a digital signal is CCD-RAW data having R, G, and B concentration values per pixel.

The control circuit 74 generates a timing signal and inputs the timing signal to the image pickup device control section 59 so as to synchronize: a manipulation of the shutter button included in the manipulation section 11; the loading of an electrical charge by the image pickup device 58; and processing performed by the analog signal processing section 60.

A flash control section 73 emits a flash 24 configured by a strobe discharge tube and other circuits during photography (when the shutter button is fully pressed). Specifically, when the flash emission mode is set to "flash on", the flash 24 is turned on in order to make the flash 24 emit light during photography. On the other hand, when the flash emission mode is set to "flash off", emission of the flash 24 during photography is prohibited.

The control circuit 74 performs photometry by detecting a luminance of an image signal generated by the image pickup device 58. Upon receiving a photometry result indicating that the luminance of field is low, the control circuit 74 instructs a fill light control section 25 to cause fill light to be irradiated from a fill light emitting section 26 configured by an LED or the like.

Respective image data (CCD-RAW data) of R, G, and B outputted from the A/D converting section 61 is subjected to white balance (WB) adjustment, gamma correction, and YC processing by a digital signal processing section 65. Processed image data is written into a memory 66.

The digital signal processing section 65 is provided with a photometry section 46. The photometry section 46 receives Y signals for one screen from the A/D converting section 61. The photometry section 46 integrates the received Y signals for each of blocks (e.g., 64) produced by vertically and horizontally equally splitting into a predetermined number of blocks (e.g., 8), a desired area within an imaging plane of the image pickup device 58 such as an area in the vicinity of the center of the imaging plane, a face detection area, or the entire imaging plane. An integrated luminance value of each block is sent to the CPU 75 as a photometry result. During AE control, the CPU 75 performs known arithmetic processing on the luminance integrated values based on a predetermined algorithm to determine a correct exposure (aperture value, shutter speed).

The memory 66 is a work memory to be used when performing various digital image processing (signal processing), to be described later, on image data. For example, an SDRAM (Synchronous Dynamic Random Access Memory) that performs data transfer in synchronization with a constant-cycle bus clock signal is used as the memory 66.

A display section 71 is provided for displaying image data successively stored in the memory 66 after a photographic mode is set until an actual photography instruction is issued as live views on, for example, a liquid crystal monitor (not shown), and for displaying image data saved in the recording section 70 during a replay mode on the liquid crystal monitor. The live views are to be photographed by the image pickup device 58 at a predetermined interval while the photographic mode is being selected. The live views are images which are sequentially displayed on the display section 71 based on image signals representing subjects to be photographed captured by the image pickup device 58 at predetermined time intervals while the photographing mode is being selected so that a user can recognize an angle of view and situation in real time.

The pre-actual photography AF processing section 81 determines a photographic condition based on the live views successively supplied until the shutter button is pressed halfway. In other words, the pre-actual photography AF processing section 81 detects a focus position based on the live views, and outputs focusing lens driving amount data. Conceivable methods of detecting a focus position include a passive method in which an in-focus position is detected by taking advantage of the characteristic that the contrast of an image increases in a focused state. That is, the pre-actual photography AF processing section 81 extracts high frequency components from the live view, and integrates the high frequency components within an entire image or within an area (the center portion, a face detection area or the like) of a specific portion of the image to obtain an AF (in-focus) evaluated value. A local maximum point of the obtained AF evaluation value is searched across the lens driving range, whereby a lens position at which the local maximum point is obtained is determined as the in-focus position.

An AF processing section 62 and the AE/AWB processing section 63 determine a photographic condition based on a pre-image. A pre-image is an image represented by image data stored in the memory 66 as a result of the CPU 75, upon detecting a half-press signal generated when the shutter button of the manipulation section 11 is pressed halfway, causes the image pickup device 58 to execute pre-photography.

The AF processing section 62 detects a focus position based on a pre-image and outputs focusing lens driving amount data (AF processing). Conceivable methods of detecting a focus position include the above-described passive method in which an in-focus position is detected by taking advantage of the characteristic that the contrast of an image increases in a focused state.

The AE/AWB processing section 63 measures a subject luminance based on a pre-image, determines an aperture value, a shutter speed and the like based on the measured subject luminance, and determines the aperture value data and the shutter speed data as an exposure set value (AE processing). Based on image data obtained by primary exposure performed in response to the shutter button being fully pressed, the AE/AWB processing section 63 determines a white balance correction amount of the image data (AWB processing).

Exposure and white balance can be set by manual manipulation by a user of the digital camera 1 when the photographic mode is set to manual mode. In addition, even when the exposure and the white balance are set automatically, the user is able to manually adjust the exposure and the white balance by issuing an instruction from the manipulation section 11 including the menu/OK button.

A photographic condition corresponds to a scene recognition result SR to be described later. For example, if the scene recognition result SR is a night scene, ISO sensitivity may be set to 80 and the shutter speed to 1/1.6 seconds. Alternatively, if the scene recognition result SR is macro, the aperture diameter is opened and emission of the flash 24 is prohibited. The searching of an in-focus position preferably proceeds from a near position (Near side) as a starting point to a far position (INF side). Alternatively, if the scene recognition result SR is landscape, "average photometry" is used as a photometry mode and the photometry section 46 is arranged to perform divisional photometry. Alternatively, if the scene recognition result SR is a portrait, the AF processing section 62 assumes a calculation area for which an AF evaluation value is to be calculated (AF evaluation value calculation area) as a face area detected by a face detection processing section 80. If the scene recognition result SR is AUTO, photograph conditions such as the shutter speed and aperture value are automatically set.

Image data of an actual image is subjected by the digital signal processing section 65 to image quality correction processing such as gamma correction, sharpness correction, and contrast correction, as well as YC processing in which CCD-RAW data is converted into YC data made up of Y data that is a luminance signal, Cb data that is a blue color-difference signal, and Cr data that is a red color-difference signal. An actual image refers to an image formed by image data loaded from the image pickup device 58 during actual photography that is executed when the shutter button is fully pressed and stored in the memory 66 via the analog signal processing section 60, the A/D converting section 61, and the digital signal processing section 65. While an upper limit of the number of pixels of an actual image is determined by the number of pixels (pixel count) of the image pickup device 58, for example, the number of recording pixels may be changed by settings such as fine and normal. Meanwhile, the numbers of pixels of a live view and a pre-image are smaller than that of the actual image and, for example, a live view and, a pre-image are to be loaded with around 1/16 of the number of pixels of the actual image.

In addition, the digital signal processing section 65 calculates the luminance of a face area in the actual image when the amount of emission of the flash 24 is set smaller than during normal photography and performs processing for adjusting the luminance of the face area to a predetermined threshold Th1 when the luminance is smaller than the threshold Th1.

The digital signal processing section 65 performs compression processing in a compression format such as JPEG on image data of an actual image subjected to correction/conversion processing to generate an image file. A tag storing collateral information such as the time and date of photography is added based on the Exif format or the like to the image file. In addition, during replay mode, the digital signal processing section 65 reads out a compressed image file from the recording section 70 and performs expansion processing thereon. The expanded image data is to be displayed on an external liquid crystal monitor by the display section 71.

The ROM 68 stores various constants to be set by the digital camera 1, programs to be executed by the CPU 75, and the like. The RAM 69 temporarily stores data required by the CPU 75 to execute the programs.

The CPU 75 controls various sections of the digital camera 1 based on signals from the various processing sections such as the manipulation section 11 and the AF processing section 62.

The face detection processing section 80 detects a human face from a live view, a pre-image, or an actual image. Specifically, what is detected as an face area includes, but is not limited to, an area having facial characteristics included in a face (for example, having skin color, having eyes, having the shape of a face, or the like).

Figure 2:
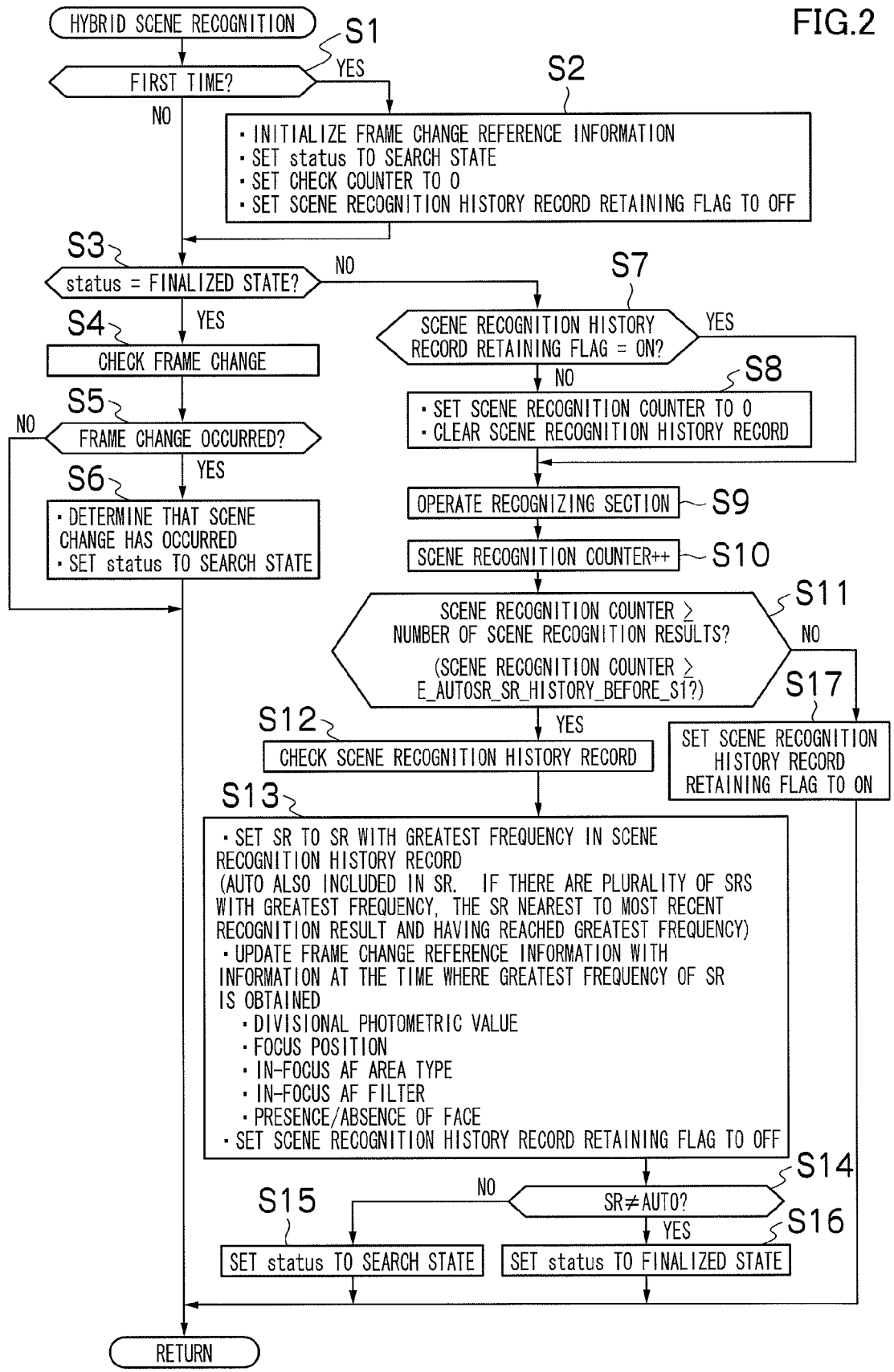
FIG. 2 is a flowchart of scene recognition main processing according to a first embodiment.

FIG. 2 is a flowchart of scene recognition main processing. Scene recognition is to recognize that a subject at a time of photography is in a prescribed subject condition (photographic scene or simply scene). In other words, scene recognition is to recognize a type of a photographic scene of frame image which a user desires to photograph. A photographic scene includes portrait, landscape, night scene, and macro (described later). Execution of the processing is controlled by the CPU 75 of the digital camera 1. A program defining the processing is stored in the ROM 68. The processing is started when a photographic mode has been set from the manipulation section 11 and, at the same time, "automatic scene recognition ON" has been set from the manipulation section 11. The processing does not start when "automatic scene recognition OFF" has been set from the manipulation section 11.

In S1, a determination is made on whether or not the processing is to be executed for the first time. If "Yes", the main processing proceeds to S2. If "No", the main processing proceeds to S3.

In S2, frame change reference information in the RAM 69 is initialized. The frame change reference information is information being referenced when a frame change check processing is performed. The frame change reference information is generated on the basis of photographic information which is information on photographic scene (information on frame image, described later), and updated on the basis of a total scene recognition result in S13. The frame change reference information includes: a divisional photometric value; a focusing lens position; an in-focus AF area type (whether or not an AF area having entered a focused state is a face area detected by the face detection processing section 80 or a default area in the vicinity of the center of a screen); an in-focus AF filter (for example, the low-pass filter and the high-pass filter according to Japanese Patent Application Laid-Open No. 2006-145964); and the occurrence/nonoccurrence of face detection (face detection result) by the face detection processing section 80. In addition, "status" in the RAM 69 is set to a search state, a check counter is set to 0, and a scene recognition history record retaining flag (flag indicating whether a scene recognition history record is retained) is set to OFF.

In S3, a determination is made on whether or not "status" in the RAM 69 is a finalized state. If "Yes", the main processing proceeds to S4. If "No", the main processing proceeds to S7.

In S4, a frame change check is performed. This processing will be described later.

In S5, as a result of the frame change check, a determination is made on whether or not a frame change has occurred. If "Yes", the main processing proceeds to S6. If "No", the main processing returns to S1.

In S6, it is determined that a scene change has occurred, whereby "status" in the RAM 69 is set to a search state.

In S7, a determination is made on whether or not the scene recognition history record retaining flag in the RAM 69 is set to ON. If "Yes", the main processing proceeds to S9. If "No", the main processing proceeds to S8.

In S8, a scene recognition counter in the RAM 69 is set to 0. In addition, the scene recognition history records in the RAM 69 are cleared.

In S9, a single scene recognition operation by a recognizing section is performed. This processing will be described later. As a result of this processing, a single scene recognition result SR is stored in the RAM 69. The single scene recognition result SR includes landscape, AUTO, portrait, night scene, macro, and the like. Details of processing for single scene recognition will be described later.

In S10, the scene recognition counter in the RAM 69 is incremented by 1.

In S11, the scene recognition counter in the RAM 69 and a predetermined threshold of the number of single scene recognition results (E_AUTOSR_SR_HISTORY_BEFORE_S1) of the ROM 68 are compared to determine whether or not scene recognition counter≧threshold of the number of single scene recognition results is true. If "Yes", the main processing proceeds to S12. If "No", the main processing proceeds to S17.

In S12, the scene recognition history record in the RAM 69 is checked. A scene recognition history record includes a plurality of single scene recognition results SR respectively individually stored by repeating S9 until "status" reaches a finalized state.

In S13, total scene recognition is performed. That is, the scene recognition result SR in the RAM 69 is updated to a scene recognition result SR having the greatest frequency of appearance in the scene recognition history record including the plurality of scene recognition results SR stored at different times in S9. In addition, the frame change reference information of RAM 69 is updated to frame change reference information acquired at the same time point as the scene recognition result SR having the greatest frequency of appearance.

In S14, a determination is made on whether or not the scene recognition result SR in the RAM 69 is different from "AUTO". If "Yes", the main processing proceeds to S16. If "No", the main processing proceeds to S15.

In S15, "status" in the RAM 69 is set to the search state and the main processing returns to S1.

In S16, "status" in the RAM 69 is set to the finalized state and the main processing returns to S1.

Figure 3:
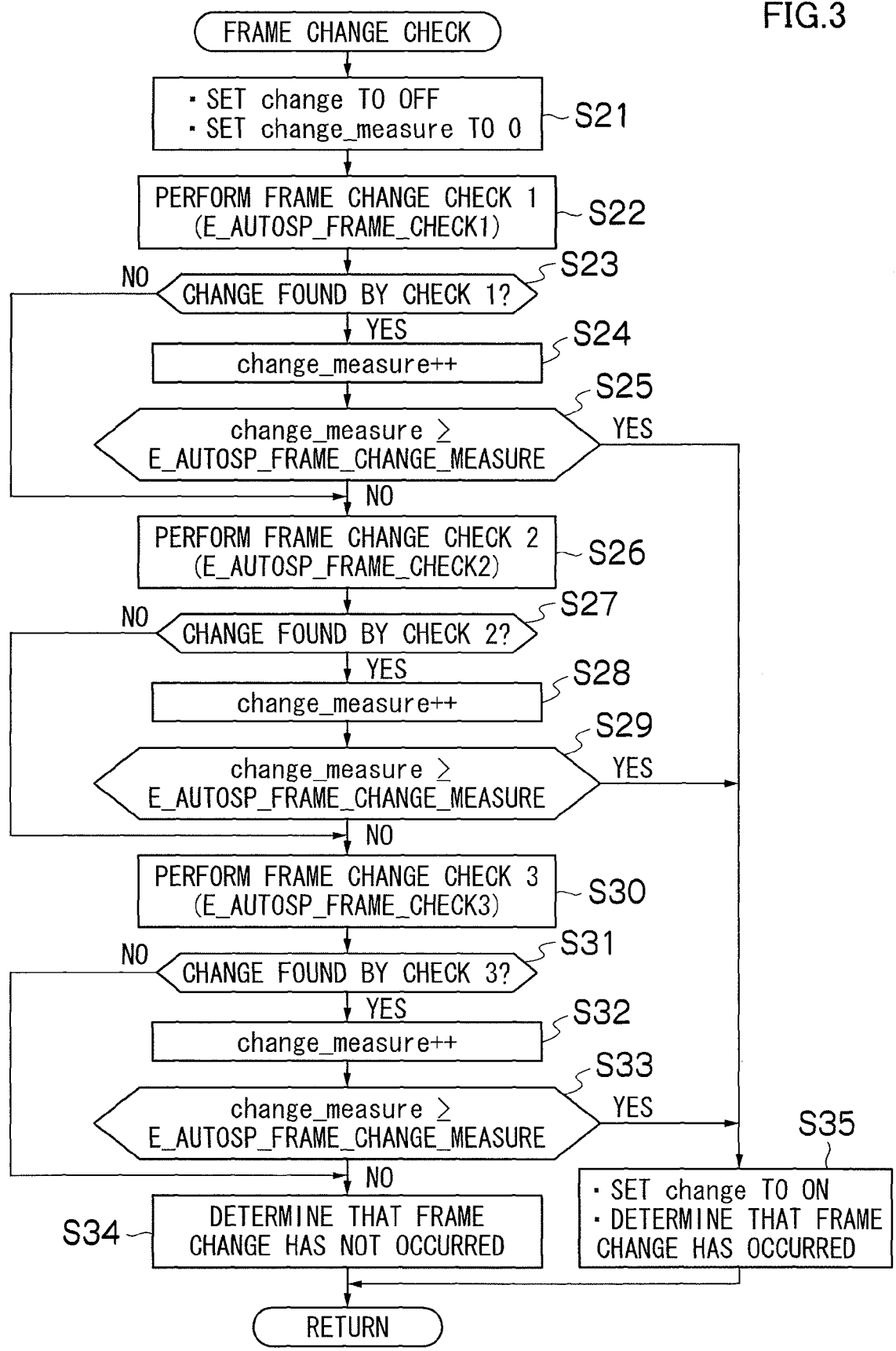
FIG. 3 is a flowchart of a frame change check.

FIG. 3 is a flowchart showing a detailed processing flow of the frame change check (S4). Execution of the processing is controlled by the CPU 75 of the digital camera 1. A program defining the processing is stored in the ROM 68.

In S21, parameters "change" and "change_measure" in the RAM 69 are set to OFF and 0, respectively.

In S22, frame change reference information is generated based on photographic information. The photographic information includes: a face detection result; a focusing lens position; a zoom lens position; an in-focus state and a photometric value. Data items included in the frame change reference information can be the same as those included in the photographic information. In addition, based on the generated frame change reference information, a first frame change check is performed. Here, the frame change check refers to a processing for detecting whether a state (condition) of current frame is changed compared to a state of frame when previous scene recognition has been performed. When a frame change is detected, it is judged that a photographic scene has been changed and scene recognition is performed. In this case, while the frame change check is assumed to be any one of a photometric value change check, a focus position change check, and a face presence/absence change check, other types may be included instead. These processing will be described later. The result of the first frame change check is to be stored as E_AUTOSP_FRAME_CHECK1 that is a parameter in the RAM 69.

In S23, based on the result of the first frame change check in S22, a determination is made on whether or not a frame change has occurred. If "Yes", the processing proceeds to S24. If "No", the processing proceeds to S26.

In S24, "change_measure" in the RAM 69 is incremented by 1.

In S25, "change_measure" in the RAM 69 and a predetermined threshold E_AUTOSP_FRAME_CHANGE_MEASURE of the ROM 68 are compared to determine whether or not "change_measure"≧E_AUTOSP_FRAME_CHANGE_MEASURE is true. If "No", the processing proceeds to S26. If "Yes", the processing proceeds to S35.

In S26, a second frame change check is performed. In this case, the frame change check is assumed to be any one selected from a photometric value change check, a focus position change check, and a face presence/absence change check, but other than one selected in the first frame change check. The result of the second frame change check is to be stored as E_AUTOSP_FRAME_CHECK2 that is a parameter in the RAM 69.

In S27, based on the result of the second frame change check in S26, a determination is made on whether or not a frame change has occurred. If "Yes", the processing proceeds to S28. If "No", the processing proceeds to S30.

In S28, "change_measure" in the RAM 69 is incremented by 1.

In S29, "change_measure" in the RAM 69 and a threshold E_AUTOSP_FRAME_CHANGE_MEASURE stored in the ROM 68 are compared to determine whether or not "change_measure"≧E_AUTOSP_FRAME_CHANGE_MEASURE is true. If "No", the processing proceeds to S30. If "Yes", the processing proceeds to S35.

In S30, a third frame change check is performed. In this case, the frame change check is assumed to be any one selected from a photometric value change check, a focus position change check, and a face presence/absence change check, but other than those selected in the first and second frame change checks. The result of the third frame change check is to be stored as E_AUTOSP_FRAME_CHECK3 that is a parameter in the RAM 69.

In S31, based on the result of the third frame change check in S30, a determination is made on whether or not a frame change has occurred. If "Yes", the processing proceeds to S32. If "No", the processing proceeds to S34.

In S32, "change_measure" in the RAM 69 is incremented by 1.

In S33, "change_measure" in the RAM 69 and a threshold E_AUTOSP_FRAME_CHANGE_MEASURE stored in the ROM 68 are compared to determine whether or not "change_measure"≧E_AUTOSP_FRAME_CHANGE_MEASURE is true. If "No", the processing proceeds to S34. If "Yes", the processing proceeds to S35.

In S34, it is determined that a frame change has not occurred. A flag indicating this determination may be stored in the RAM 69. The processing then returns to S5 of the scene recognition main processing.

In S35, it is determined that a frame change has occurred. A flag "change" which is a flag indicating "frame change occurred" is set to ON and stored in the RAM 69. The processing then returns to S5 of the scene recognition main processing.

Figure 4:
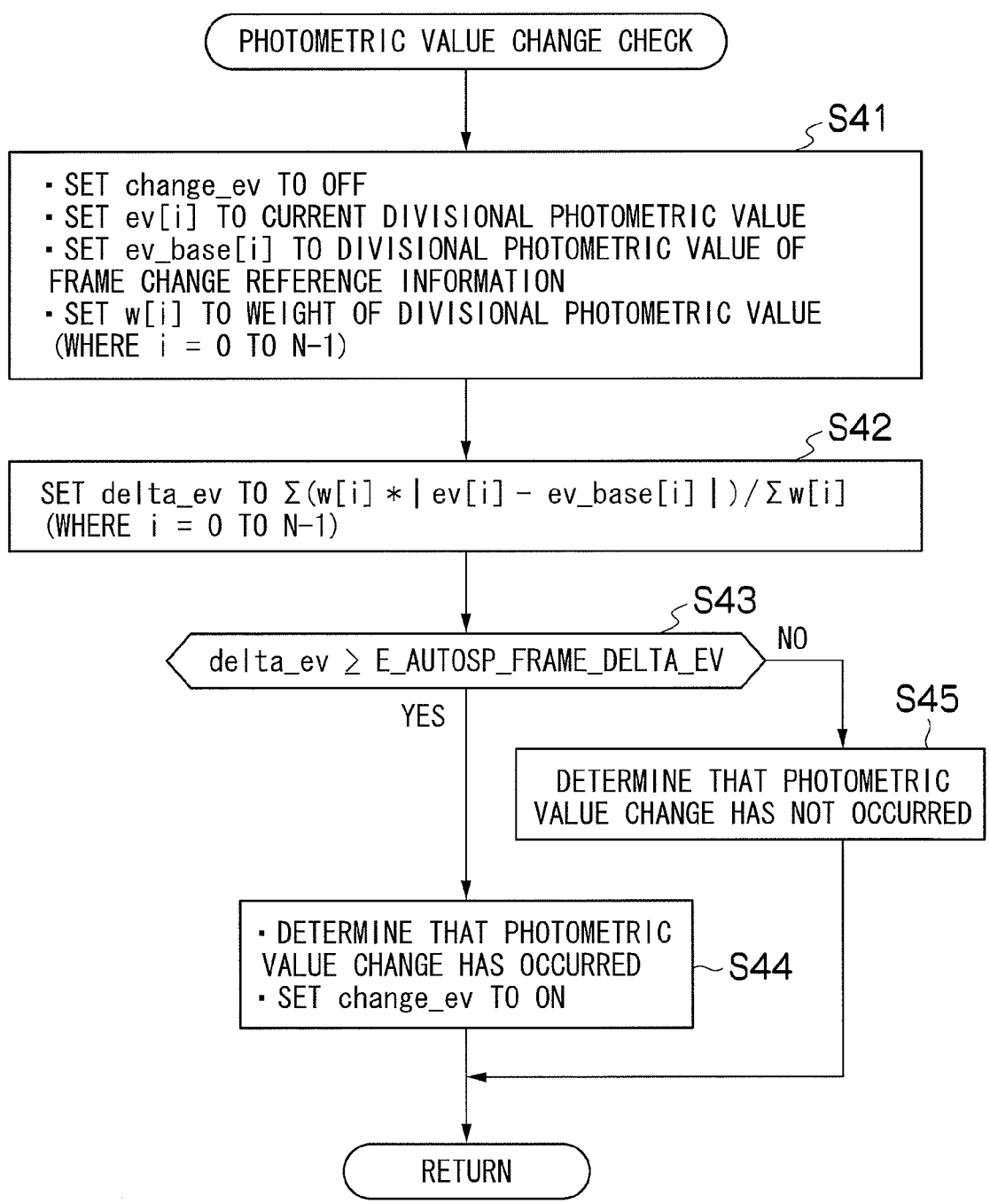
FIG. 4 is a flowchart of a photometric value change check.

FIG. 4 is a flowchart of a photometric value change check. Execution of the processing is controlled by the CPU 75 of the digital camera 1. A program defining the processing is stored in the ROM 68.

In S41, a parameter "change_ev" in the RAM 69 is set to OFF. In addition, a parameter ev[i] in the RAM 69 is set to a photometric value obtained from the photometry section 46 for the current frame image. Reference character "i" designates a suffix corresponding to each of N number of blocks (N blocks) obtained by dividing the image into predetermined units. In this case, it is assumed that i=0 to N−1.

In addition, a parameter "ev_base[i]" in the RAM 69 is set to a divisional photometric value of the frame change reference information and the value is retained in the RAM 69. Moreover, "ev_base[i]" is initialized in S2 and updated in S13 of the main processing. In addition, a weight w[i] corresponding to each block is read from the ROM 68.

In S42, a parameter "delta_ev" is set in the RAM 69 according to the following equation. Summation is to be performed for i=0 to N−1. Or, "delta_ev" may be a difference between brightnesses of the entire screen.

$$delta\_ev=\Sigma W[i]*|ev[i]-ev\_base[i]|/\Sigma W[i]$$

The reason why summation is performed on absolute values of the differences of the respective areas is as follows. Absolute values are taken in order to prevent summation from cancelling out changes in the respective areas and eliminating change as a whole even when significant changes are actually occurring in the respective areas.

In S43, "delta_ev" in the RAM 69 and a threshold E_AUTOSP_FRAME_DELTA_EV stored in the ROM 68 is compared to determine whether or not "delta_ev"≧E_AUTOSP_FRAME_DELTA_EV is true. If "Yes", the processing proceeds to S44. If "No", the processing proceeds to S45.

In S44, it is determined that a change in the photometric value has occurred. A flag "change_ev" indicating that a change in the photometric value has occurred is set to ON and stored in the RAM 69.

In S45, it is determined that a change in the photometric value has not occurred. A flag indicating that a change in the photometric value has not occurred may be stored in the RAM 69.

Figure 5:
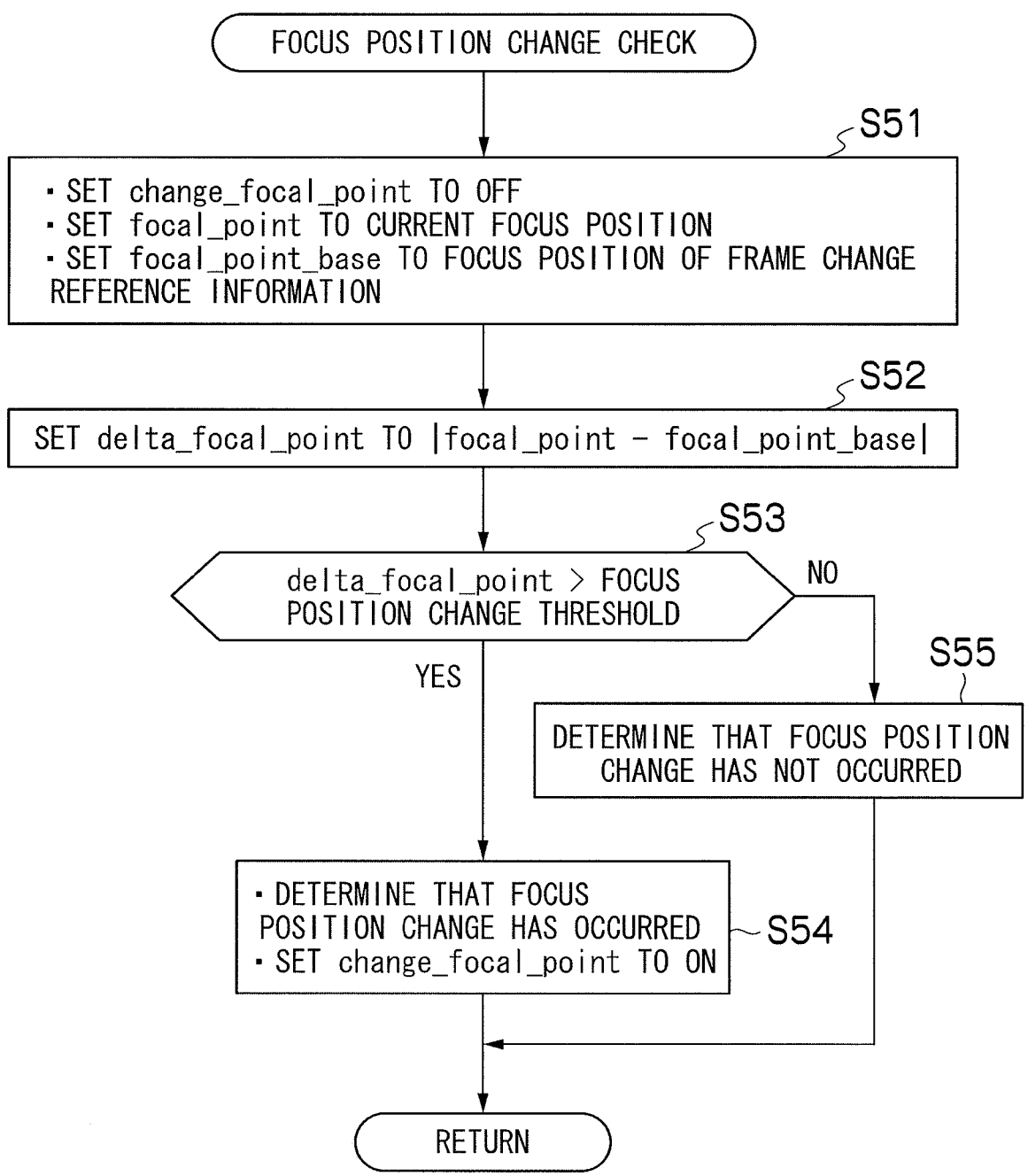
FIG. 5 is a flowchart of a focus position change check.

FIG. 5 is a flowchart of a focus position change check. Execution of the processing is controlled by the CPU 75 of the digital camera 1. A program defining the processing is stored in the ROM 68.

In S51, a parameter "change_focal_point" in the RAM 69 is set to OFF, a parameter "focal_point" in the RAM 69 is set to a focusing lens position (number of drive pulses) set by the lens driving section 51 when acquiring the current frame image, and a parameter "focal_point_base" in the RAM 69 is set to the focusing lens position (that is initialized in S2 or updated in S13) of the frame change reference information, whereby a storage area for them is secured in the RAM 69.

In S52, "delta_focal_point" is set to the RAM 69 according to the following equation.

$$delta\_focal\_point=|focal\_point-focal\_point\_base|$$

In S53, "delta_focal_point" in the RAM 69 and a predetermined focus position change threshold stored in the ROM 68 are compared to determine whether or not "delta_focal_point">focus position change threshold is true. If "Yes", the processing proceeds to S54. If "No", the processing proceeds to S55.

In S54, it is determined that a change in focus position has occurred. Subsequently, a flag "change_focal_point" indicating that a change in focus position has occurred is set to ON and stored in the RAM 69.

In S55, it is determined that a change in focus position has not occurred. A flag indicating that a change in focus position has not occurred may be stored in the RAM 69.

Figure 6:
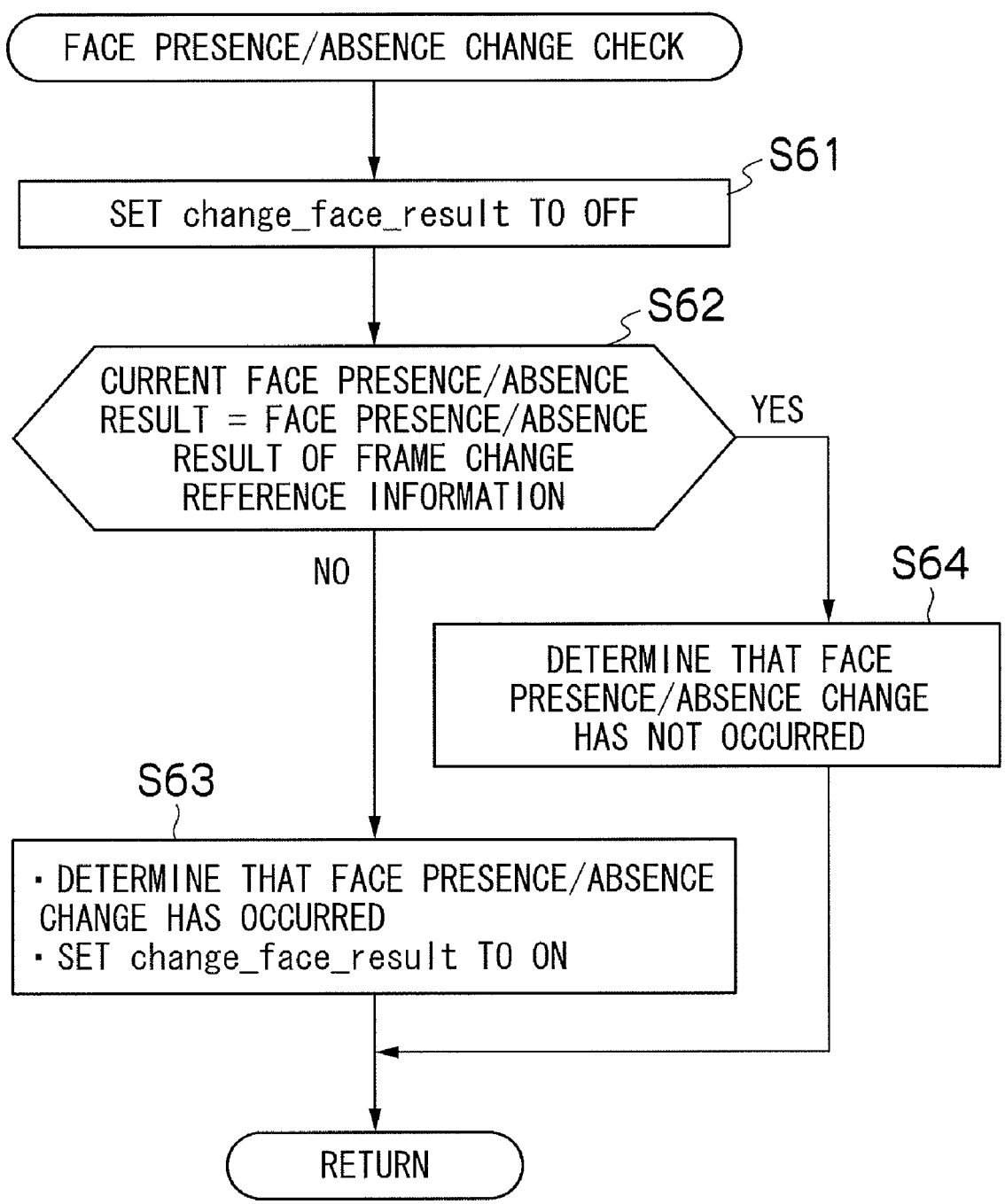
FIG. 6 is a flowchart of a face presence/absence change check.

FIG. 6 is a flowchart of a face presence/absence change check. Execution of the processing is controlled by the CPU 75 of the digital camera 1. A program defining the processing is stored in the ROM 68.

In S61, a parameter "change_face_result" in the RAM 69 is set to OFF.

In S62, a determination is made on whether or not the occurrence/nonoccurrence of face detection outputted by the face detection processing section 80 when the current frame image had been acquired is consistent with the occurrence/nonoccurrence (that is initialized in S2 or updated in S13) of face detection of the frame change reference information. If "Yes", the processing proceeds to S64. If "No", the processing proceeds to S63.

In S63, it is determined that a change in the occurrence/nonoccurrence of face detection has occurred. A flag "change_face_result" indicating that a change in the occurrence/nonoccurrence of face detection has occurred is set to ON and stored in the RAM 69.

In S64, it is determined that a change in the occurrence/nonoccurrence of face detection has not occurred. A flag indicating that a change in the occurrence/nonoccurrence of face detection has not occurred may be stored in the RAM 69.

Figure 7:
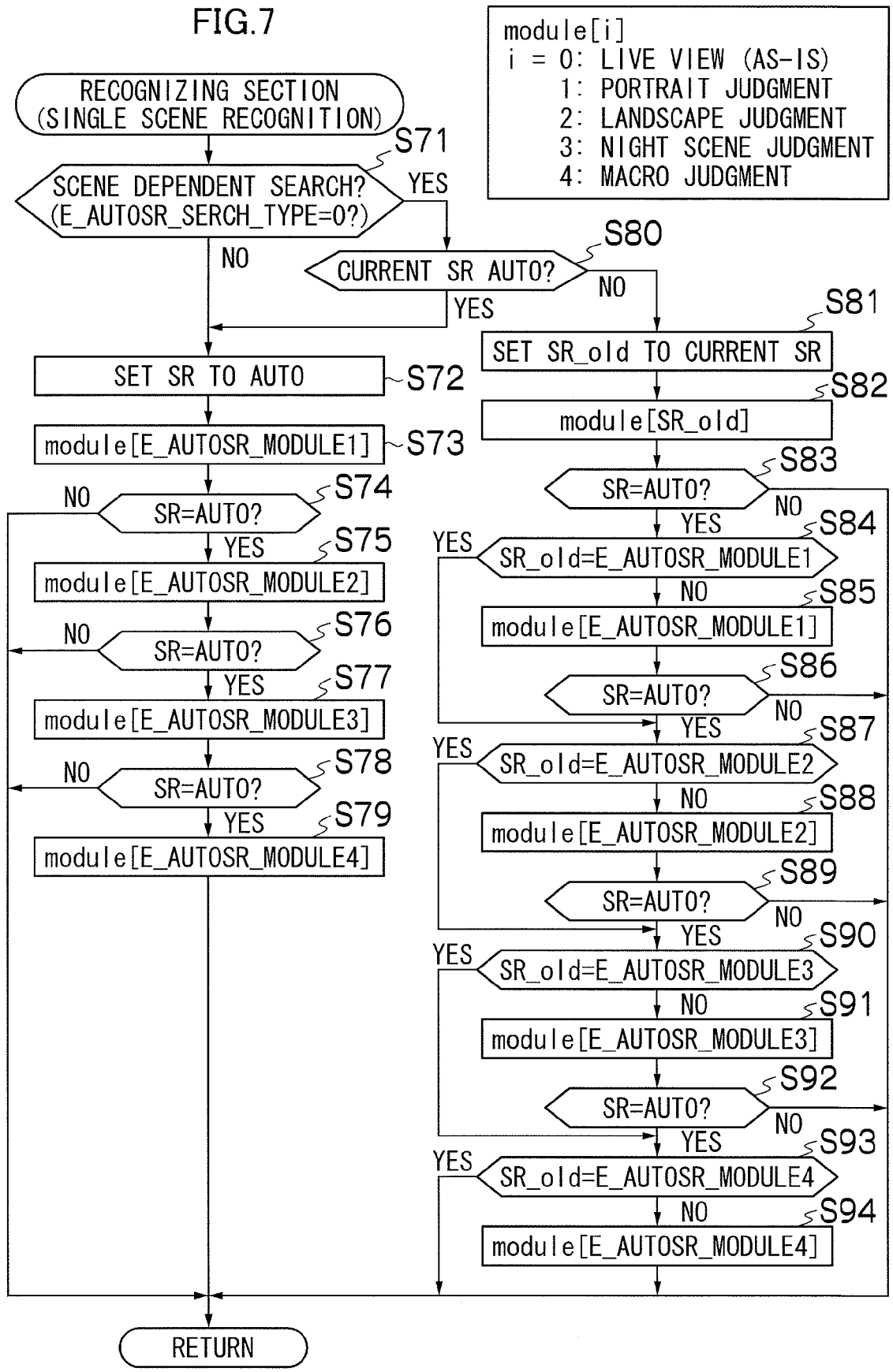
FIG. 7 is a flowchart showing details of scene recognition.

FIG. 7 is a flowchart showing details of a single scene recognition operation (S9) of the recognizing section. Execution of the processing is controlled by the CPU 75 of the digital camera 1. A program defining the processing is stored in the ROM 68.

In S71, a determination is made on whether or not a flag (E_AUTOSR_SEARCH_TYPE) for carrying out a scene-dependent search and which is stored in the RAM 69 is set to 0. If "Yes", the operation proceeds to S80. If "No", the operation proceeds to S72. The value of E_AUTOSR_SEARCH_TYPE is assumed to be arbitrarily settable from the manipulation section 11.

In S72, AUTO is set to the scene recognition result SR in the RAM 69.

In S73, E_AUTOSR_MODULE1 stored in advance in the ROM 68 is substituted into parameter i in the RAM 69. E_AUTOSR_MODULE1 is any integer from 0 to 4. Subsequently, a scene judgment (recognition) subroutine corresponding to module[i] is carried out. module[0] performs nothing. module[1] performs a portrait judgment to be described later. module[2] performs a landscape judgment to be described later. module[3] performs a night scene judgment to be described later. module[4] performs a macro judgment to be described later.

In S74, based on the result of carrying out module[i] in S73, a determination is made on whether or not the scene recognition result SR in the RAM 69 is AUTO. If "Yes", the operation proceeds to S75. If "No", the operation returns to S10 of the main processing.

In S75, E_AUTOSR_MODULE2 stored in advance in the ROM 68 is substituted into parameter i in the RAM 69. E_AUTOSR_MODULE2 is any integer from 0 to 4 which is different from E_AUTOSR_MODULE1. Subsequently, a scene judgment subroutine corresponding to module[i] is carried out.

In S76, based on the result of carrying out module[i] in S75, a determination is made on whether or not the scene recognition result SR in the RAM 69 is AUTO. If "Yes", the operation proceeds to S77. If "No", the operation returns to S10 of the main processing.

In S77, E_AUTOSR_MODULE3 stored in advance in the ROM 68 is substituted into parameter i in the RAM 69. E_AUTOSR_MODULE3 is any integer from 0 to 4 which is different from both E_AUTOSR_MODULE1 and E_AUTOSR_MODULE2. Subsequently, a scene judgment subroutine corresponding to module[i] is carried out.

In S78, based on the result of carrying out module[i] in S77, a determination is made on whether or not the scene recognition result SR in the RAM 69 is AUTO. If "Yes", the operation proceeds to S79. If "No", the operation returns to S10 of the main processing.

In S79, E_AUTOSR_MODULE4 stored in advance in the ROM 68 is substituted into parameter i in the RAM 69. E_AUTOSR_MODULE3 is any integer from 0 to 4 which is different from E_AUTOSR_MODULE1, E_AUTOSR_MODULE2, and E_AUTOSR_MODULE3. Subsequently, a scene judgment subroutine corresponding to module[i] is carried out. Values of E_AUTOSR_MODULE1, E_AUTOSR_MODULE2, E_AUTOSR_MODULE3, and E_AUTOSR_MODULE4 may be set in any way. However, it is preferable that a smaller number is assigned to a type of a scene judgment which needs to be preferentially performed. For example, when it is desirable to perform scene judgment in an order of portrait judgment>landscape judgment>night scene judgment>macro judgment, then E_AUTOSR_MODULE1=1, E_AUTOSR_MODULE2=2, E_AUTOSR_MODULE3=3, and E_AUTOSR_MODULE4=4 shall suffice. These values may alternatively be arranged so as to be arbitrarily settable from the manipulation section 11.

In S80, a determination is made on whether or not the current scene recognition result SR in the RAM 69 is AUTO. If "Yes", the operation proceeds to S72. If "No", the operation proceeds to S81.

In S81, the current scene recognition result SR in the RAM 69 is set to a parameter "SR_old" in the RAM 69. In other words, if the current scene recognition result SR in the RAM 69 is AUTO then "SR_old"=0, if the current scene recognition result SR in the RAM 69 is portrait then "SR_old"=1, if the current scene recognition result SR in the RAM 69 is landscape then "SR_old"=2, if the current scene recognition result SR in the RAM 69 is night scene then SR_old=3, and if the current scene recognition result SR in the RAM 69 is macro then "SR_old"=4.

In S82, "SR_old" is substituted into the parameter i in the RAM 69. Subsequently, a scene judgment subroutine corresponding to module[i] is carried out.

In S83, based on the result of carrying out module[i] in S82, a determination is made on whether or not the scene recognition result SR in the RAM 69 is AUTO. If "Yes", the operation proceeds to S84. If "No", the operation returns to S10 of the main processing.

In S84, a determination is made on whether or not "SR_old"=E_AUTOSR_MODULE1. If "Yes", the operation proceeds to S87. If "No", the operation proceeds to S85.

In S85, E_AUTOSR_MODULE1 stored in advance in the ROM 68 is substituted into parameter i in the RAM 69. Subsequently, a scene judgment subroutine corresponding to module[i] is carried out.

In S86, based on the result of carrying out module[i] in S85, a determination is made on whether or not the scene recognition result SR in the RAM 69 is AUTO. If "Yes", the operation proceeds to S87. If "No", the operation returns to S10 of the main processing.

In S87, a determination is made on whether or not "SR_old"=E_AUTOSR_MODULE2. If "Yes", the operation proceeds to S90. If "No", the operation proceeds to S88.

In S88, E_AUTOSR_MODULE2 stored in advance in the ROM 68 is substituted into parameter i in the RAM 69. Subsequently, a scene judgment subroutine corresponding to module[i] is carried out.

In S89, based on the result of carrying out module[i] in S88, a determination is made on whether or not the scene recognition result SR in the RAM 69 is AUTO. If "Yes", the operation proceeds to S90. If "No", the operation returns to S10 of the main processing.

In S90, a determination is made on whether or not "SR_old"=E_AUTOSR_MODULE3. If "Yes", the operation proceeds to S93. If "No", the operation proceeds to S91.

In S91, E_AUTOSR_MODULE3 stored in advance in the ROM 68 is substituted into parameter i in the RAM 69. Subsequently, a scene judgment subroutine corresponding to module[i] is carried out.

In S92, based on the result of carrying out module[i] in S91, a determination is made on whether or not the scene recognition result SR in the RAM 69 is AUTO. If "Yes", the operation proceeds to S93. If "No", the operation returns to S10 of the main processing.

In S93, a determination is made on whether or not "SR_old"=E_AUTOSR_MODULE4. If "Yes", the processing returns to S10 of the main processing. If "No", the operation proceeds to S94.

In S94, E_AUTOSR_MODULE4 stored in advance in the ROM 68 is substituted into parameter i in the RAM 69. Subsequently, a scene judgment subroutine corresponding to module[i] is carried out. The processing then returns to S10 of the main processing.

Figure 8:
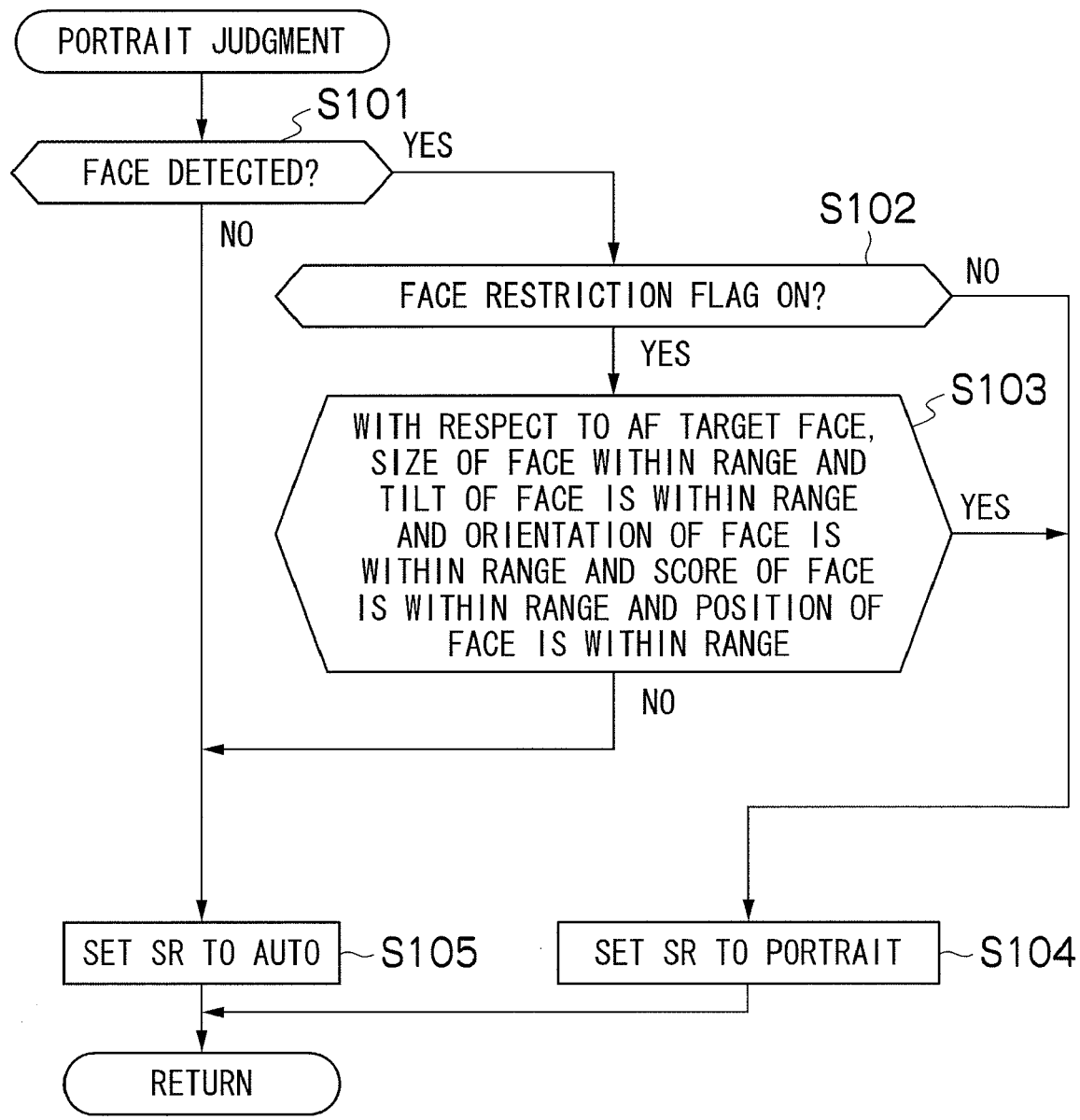
FIG. 8 is a flowchart of a scene judgment subroutine (portrait judgment)

FIG. 8 is a flowchart showing details of a scene judgment subroutine (portrait judgment, module[1]). Execution of the processing is controlled by the CPU 75 of the digital camera 1. A program defining the processing is stored in the ROM 68.

In S101, a determination is made on whether or not the face detection processing section 80 has detected a face. If "Yes", the subroutine proceeds to S102. If "No", the subroutine proceeds to S105.

In S102, a determination is made on whether or not a face limitation flag in the RAM 69 is turned on. If "Yes", the subroutine proceeds to S103. If "No", the subroutine proceeds to S104.

In S103, with respect to a face area set in an AF evaluation value calculation area, a determination is made on: whether or not the size of the face is within a predetermined range; the tilt of the face is within a predetermined range; the orientation of the face is within a predetermined range; the accuracy score of the face is within a predetermined range; and the position of the face is within a predetermined range. If "No", the subroutine proceeds to S103. If "Yes", the subroutine proceeds to S104.

In S104, the scene recognition result SR is set to portrait. Subsequently, the subroutine proceeds to processing subsequent to module[1] or, in other words, any one of processing subsequent to S73, S75, S77, and S79 or any one of processing subsequent to S85, S88, S91, and S94.

In S105, the scene recognition result SR is set to AUTO.

Figure 9:
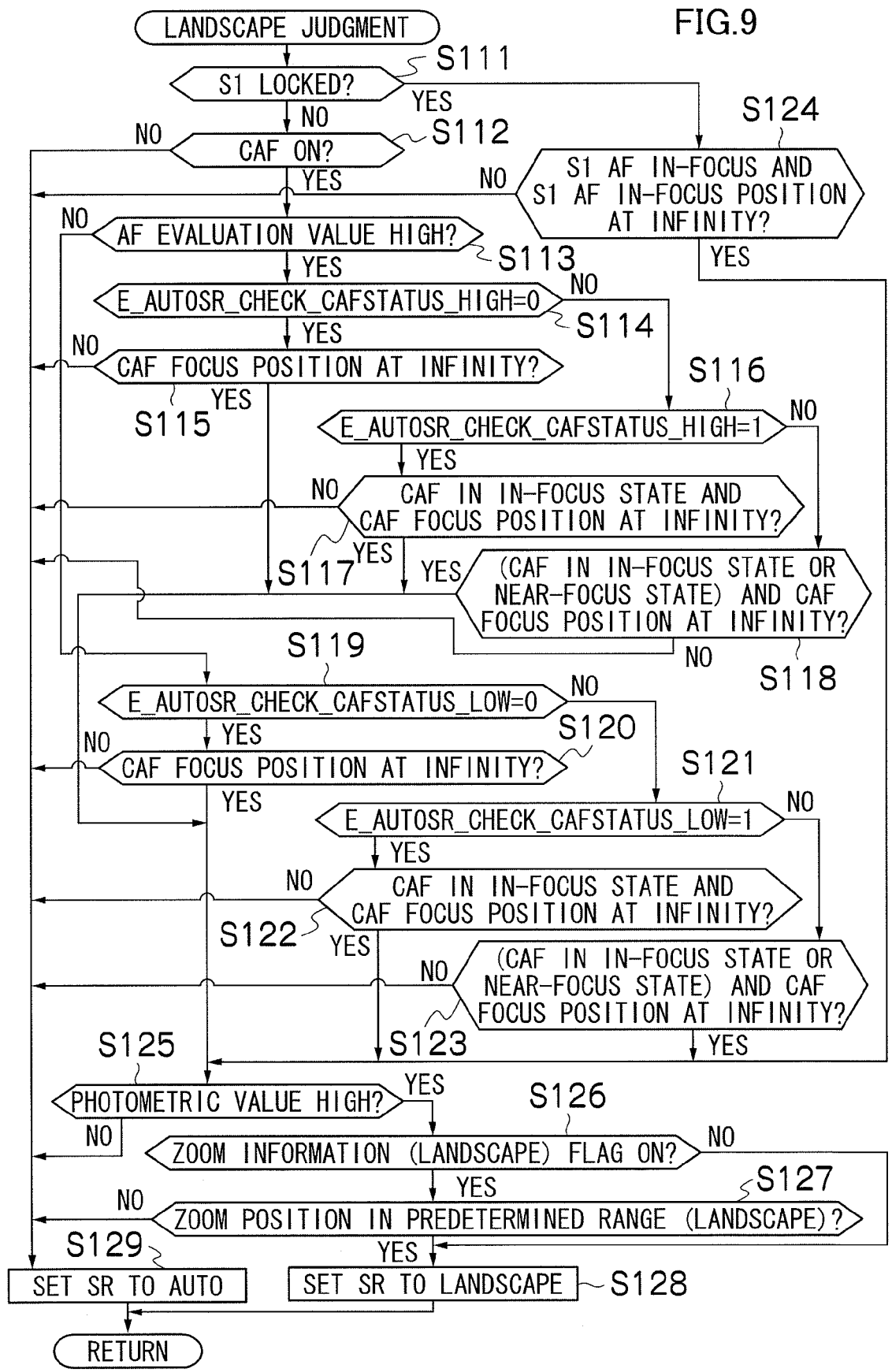
FIG. 9 is a flowchart of a scene judgment subroutine (landscape judgment)

FIG. 9 is a flowchart showing details of a scene judgment subroutine (landscape judgment, module[2]). Execution of the processing is controlled by the CPU 75 of the digital camera 1. A program defining the processing is stored in the ROM 68.

In S111, a determination is made on whether or not half-press (S1) of the shutter button has been locked. If "Yes", the subroutine proceeds to S124. If "No", the subroutine proceeds to S112.

In S112, a determination is made on whether or not the execution of continuous AF (hereinafter denoted to as "CAF") has been set in advance via settings menu or the manipulation section 11. If "Yes", the subroutine proceeds to S113. If "No", the subroutine proceeds to S129.

In S113, a determination is made on whether or not the AF evaluation value calculated by the pre-actual photography AF processing section 81 is higher than a predetermined threshold stored in the ROM 68. If "Yes", the subroutine proceeds to S114. If "No", the subroutine proceeds to S119. Moreover, the present step S113 may be omitted. In this case, the subroutine proceeds to S114 if "Yes" in S112. In addition, the various subsequent processing (S119, S120, S121, S122, and S123) when "No" is determined in S113 is also omitted.

In S114, a determination is made on whether or not E_AUTOSR_CHECK_CAFSTATUS_HIGH stored in the ROM 68 is 0. If "Yes", the subroutine proceeds to S115. If "No", the subroutine proceeds to S116.

In S115, a determination is made on whether or not an in-focus position decided as a result of the CAF is to the infinity (INF) side of a predetermined focal distance threshold stored in the ROM 68 or, in other words, whether or not the in-focus subject is more distant than a predetermined distance. If "Yes", the subroutine proceeds to S125. If "No", the subroutine proceeds to S129.

In S116, a determination is made on whether or not E_AUTOSR_CHECK_CAFSTATUS_HIGH=1 is true. If "Yes", the subroutine proceeds to S117. If "No", the subroutine proceeds to S118.

In S117, a determination is made on whether or not a local maximum point of the AF evaluation value has been detected as a result of the CAF, and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S118, a determination is made on whether or not a local maximum point of the AF evaluation value has been detected as a result of the CAF or the AF evaluation value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S119, a determination is made on whether or not E_AUTOSR_CHECK_CAFSTATUS_LOW stored in the ROM 68 is 0. If "Yes", the subroutine proceeds to S120. If "No", the subroutine proceeds to S121.

In S120, a determination is made on whether or not an in-focus position decided as a result of the CAF is to the infinity (INF) side of a predetermined focal distance threshold stored in the ROM 68 or, in other words, whether or not the in-focus position is more distant than a predetermined distance. If "Yes", the subroutine proceeds to S125. If "No", the subroutine proceeds to S129.

In S121, a determination is made on whether or not E_AUTOSR_CHECK_CAFSTATUS_LOW=1 is true. If "Yes", the subroutine proceeds to S122. If "No", the subroutine proceeds to S123.

In S122, a determination is made on whether or not a local maximum point of the AF evaluation value has been detected as a result of the CAF and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S123, a determination is made on whether or not a local maximum point of the AF evaluation value has been detected as a result of the CAF or the AF evaluation value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S124, a determination is made on whether or not an in-focus position has been determined by AF processing of the AF processing section 62 and a focal distance corresponding to the in-focus position is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S125, a determination is made on whether or not the subject luminance measured by the control circuit 74 is lower than a predetermined threshold stored in the ROM 68. If "Yes", the subroutine proceeds to S126. If "No", the subroutine proceeds to S129.

In S126, a determination is made on whether or not a landscape zoom information flag has been set to ON in advance as a set parameter of ROM 68 or from the manipulation section 11. If "Yes", the subroutine proceeds to S126. If "No", the subroutine proceeds to S129.

In S127, a determination is made on whether or not the zoom lens position is within a predetermined range, such as on the wide side of a predetermined position. If "Yes", the subroutine proceeds to S128. If "No", the subroutine proceeds to S129. Note that the zoom position not being within a predetermined range refers to a case where, for example, the zoom lens position is at the tele end or the vicinity thereof. In this case, since a panoramic view cannot be fit into the field angle and is therefore unsuited for landscape photography, the photographic scene is determined to be AUTO.

In S128, SR is set to landscape. The subroutine then proceeds to processing subsequent to module[2].

In S129, SR is set to AUTO. The subroutine then proceeds to processing subsequent to module[2].

Figure 10:
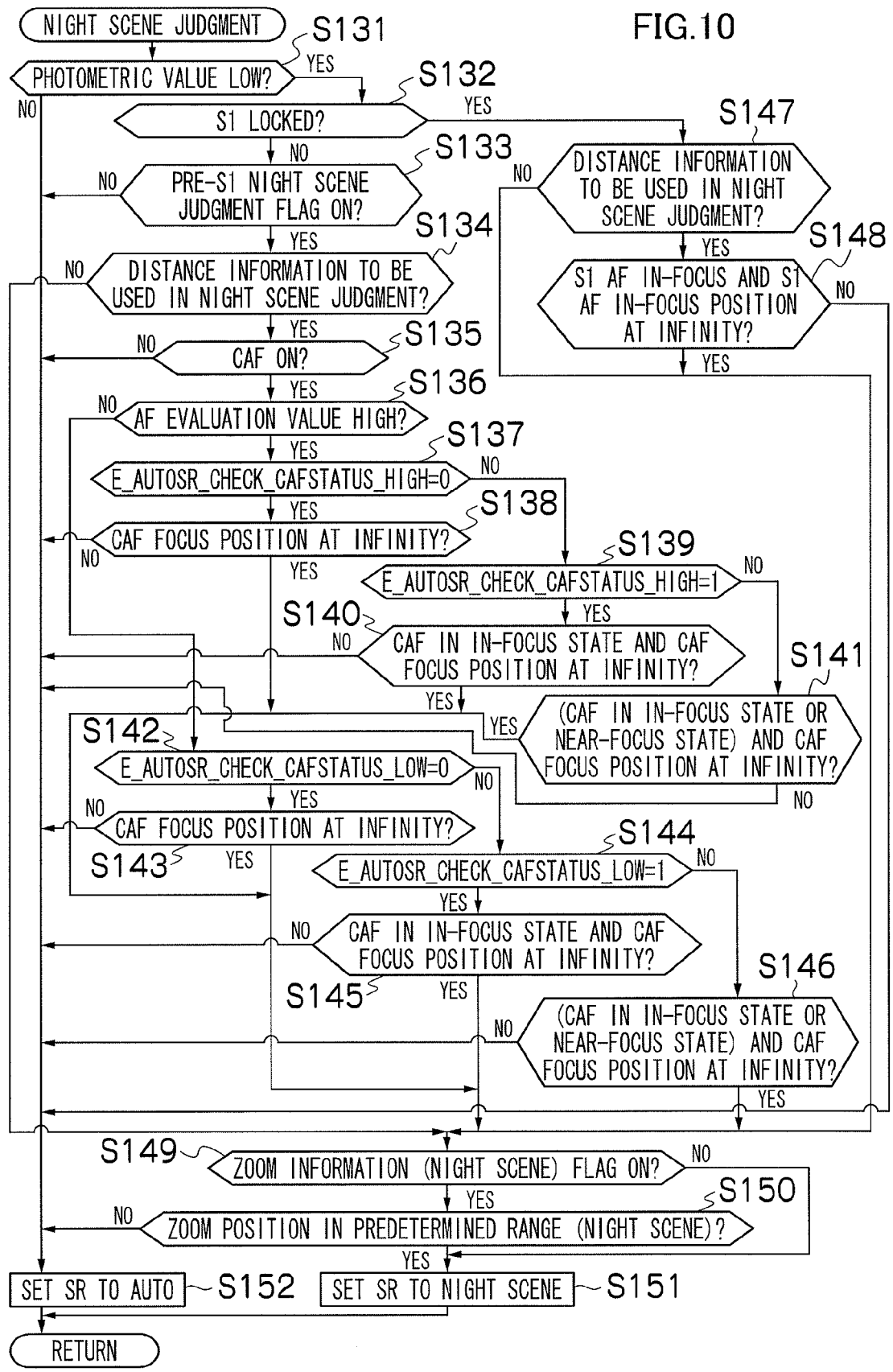
FIG. 10 is a flowchart of a scene judgment subroutine (night scene judgment)

FIG. 10 is a flowchart showing details of a scene judgment subroutine (night scene judgment, module[3]). Execution of the processing is controlled by the CPU 75 of the digital camera 1. A program defining the processing is stored in the ROM 68.

In S131, a determination is made on whether or not the subject luminance measured by the control circuit 74 is lower than a predetermined threshold stored in the ROM 68. If "Yes", the subroutine proceeds to S132. If "No", the subroutine proceeds to S152.

In S132, a determination is made on whether or not half-press (S1) of the shutter button has been locked. If "Yes", the subroutine proceeds to S147. If "No", the subroutine proceeds to S133.

In S133, a determination is made on whether or not a night scene judgment flag prior to half-press (S1) stored in the RAM 69 has been set to ON. If "Yes", the subroutine proceeds to S134. If "No", the main subroutine proceeds to S152.

In S134, a determination is made on whether or not distance information has been set to be used in night scene judgment by an input from the manipulation section 11 or a parameter stored in the ROM 68. If distance information has been set to be used in night scene judgment, the subroutine proceeds to S135. If distance information has not been set to be used in night scene judgment, the subroutine proceeds to S149.

In S135, a determination is made on whether or not the execution of CAF has been set in advance via settings menu or the manipulation section 11. If "Yes", the subroutine proceeds to S136. If "No", the main subroutine proceeds to S152.

In S136, a determination is made on whether or not the AF evaluation value calculated by the pre-actual photography AF processing section 81 is higher than a predetermined threshold stored in the ROM 68. If "Yes", the subroutine proceeds to S137. If "No", the subroutine proceeds to S142. Moreover, the present step S136 may be omitted. In this case, the subroutine proceeds to S137 if "Yes" in S135. In addition, the various subsequent processing when "No" is determined in S136 is also omitted.

In S137, a determination is made on whether or not E_AUTOSR_CHECK_CAFSTATUS_HIGH=0 is true. If "Yes", the subroutine proceeds to S138. If "No", the subroutine proceeds to S139.

In S138, a determination is made on whether or not an in-focus position decided as a result of the CAF is to the infinity (INF) side of a predetermined focal distance threshold stored in the ROM 68 or, in other words, whether or not the in-focus position is more distant than a predetermined distance. If "Yes", the subroutine proceeds to S149. If "No", the subroutine proceeds to S152.

In S139, a determination is made on whether or not E_AUTOSR_CHECK_CAFSTATUS_HIGH=1 is true. If "Yes", the subroutine proceeds to S140. If "No", the subroutine proceeds to S141.

In S140, a determination is made on whether or not a local maximum point of the AF evaluation value has been detected as a result of the CAF and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S141, a determination is made on whether or not a local maximum point of the AF evaluation value has been detected as a result of the CAF or the AF evaluation value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S142, a determination is made on whether or not E_AUTOSR_CHECK_CAFSTATUS_LOW=0 is true. If "Yes", the subroutine proceeds to S143. If "No", the subroutine proceeds to S144.

In S143, a determination is made on whether or not an in-focus position decided as a result of the CAF is to the infinity (INF) side of a predetermined focal distance threshold stored in the ROM 68 or, in other words, whether or not the in-focus position is more distant than a predetermined distance. If "Yes", the subroutine proceeds to S149. If "No", the subroutine proceeds to S152.

In S144, a determination is made on whether or not E_AUTOSR_CHECK_CAFSTATUS_LOW=1 is true. If "Yes", the subroutine proceeds to S145. If "No", the subroutine proceeds to S146.

In S145, a determination is made on whether or not a local maximum point of the AF evaluation value has been detected as a result of the CAF and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S146, a determination is made on whether or not a local maximum point of the AF evaluation value has been detected as a result of the CAF or the AF evaluation value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S147, a determination is made on whether or not distance information has been set to be used in night scene judgment by an input from the manipulation section 11 or a parameter stored in the ROM 68. If distance information has been set to be used in night scene judgment, the subroutine proceeds to S148. If distance information has not been set to be used in night scene judgment, the subroutine proceeds to S149.

In S148, a determination is made on whether or not an in-focus position has been determined by AF processing of the AF processing section 62 and a focal distance corresponding to the in-focus position is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S149, a determination is made on whether or not a night scene zoom information flag has been set to ON in advance as a set parameter of ROM 68 or from the manipulation section 11. If "Yes", the subroutine proceeds to S150. If "No", the subroutine proceeds to S151.

In S150, a determination is made on whether or not the zoom lens position is within a predetermined range, such as on the wide side of a predetermined position. If "Yes", the subroutine proceeds to S151. If "No", the subroutine proceeds to S152. Note that the zoom position not being within a predetermined range refers to a case where, for example, the zoom lens position is at the tele end or the vicinity thereof. In this case, since a background distant landscape with low incident light intensity cannot be fit into the field angle and is therefore unsuited for night scene photography, the photographic scene is determined to be AUTO.

In S151, SR is set to night scene. The subroutine then proceeds to processing subsequent to module[3].

In S152, SR is set to AUTO. The subroutine then proceeds to processing subsequent to module[3].

Figure 11:
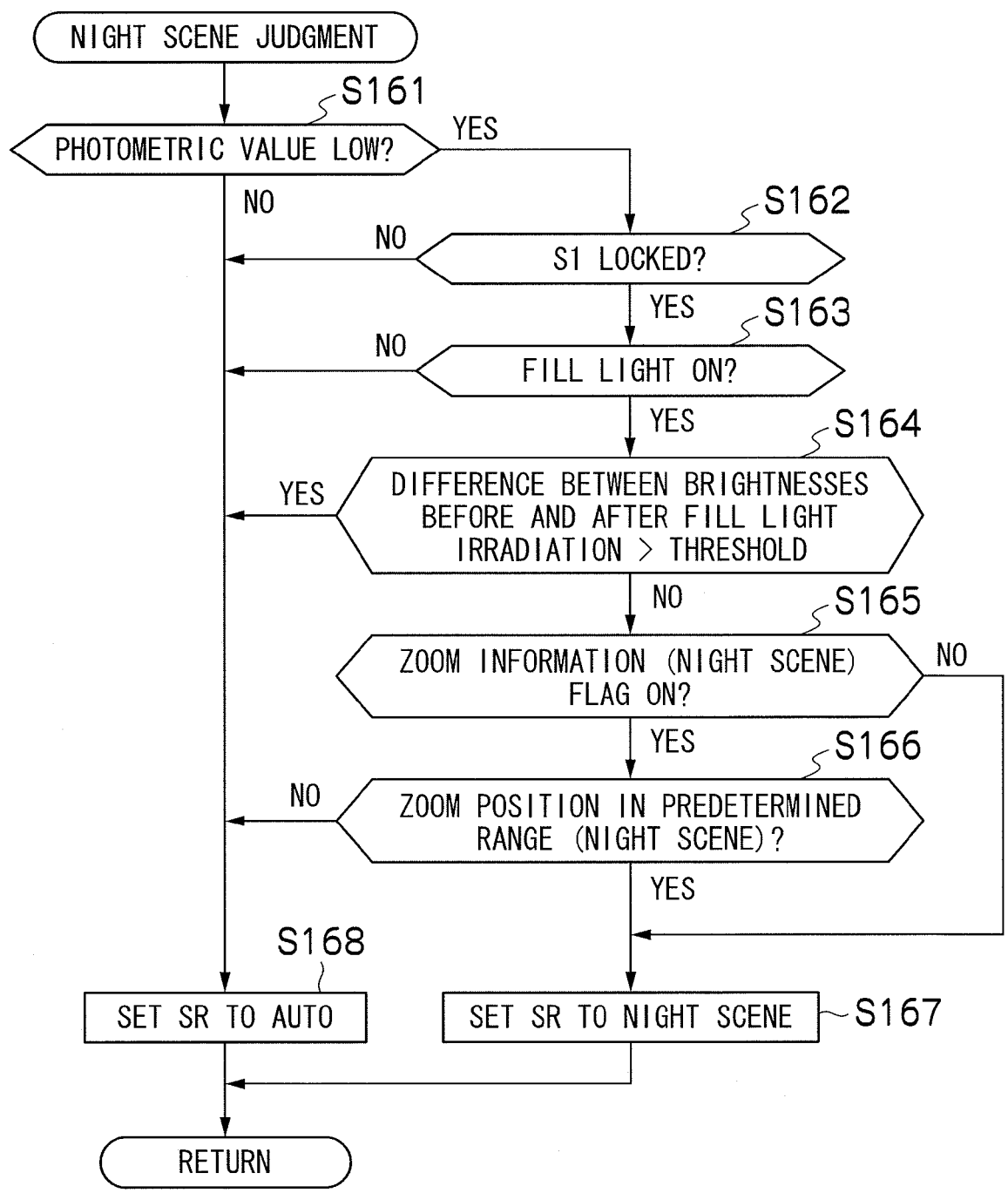
FIG. 11 is another example of a flowchart of a scene judgment subroutine (night scene judgment)

FIG. 11 is a flowchart showing another example of a scene judgment subroutine (night scene judgment, module[3]). Execution of the processing is controlled by the CPU 75 of the digital camera 1. A program defining the processing is stored in the ROM 68. For night scene judgment, adopting either FIG. 10 or 11 shall suffice. Alternatively, an arrangement is also possible in which either one is selectively executed.

In S161, a determination is made on whether or not the subject luminance measured by the control circuit 74 is lower than a predetermined threshold stored in the ROM 68. If "Yes", the subroutine proceeds to S162. If "No", the subroutine proceeds to S168. This threshold may either be the same as or different from the threshold for judging whether or not emission is to be instructed to the fill light control section 25.

In S162, a determination is made on whether or not half-press (S1) of the shutter button has been locked. If "Yes", the subroutine proceeds to S163. If "No", the subroutine proceeds to S168.

In S163, a determination is made on whether or not emission of the fill light 26 has been instructed to the fill light control section 25. If "Yes", the subroutine proceeds to S164. If "No", the subroutine proceeds to S168.

In S164, a determination is made on whether or not a difference between subject luminances respectively measured by the control circuit 74 immediately before and immediately after the fill light control section 25 causes the fill light emitting section 26 to be emitted exceeds a predetermined threshold stored in the ROM 68. If "Yes", the subroutine proceeds to S168. If "No", the subroutine proceeds to S165. Moreover, if the difference has not exceeded the threshold and is minute, it may be described that the contribution of an increase in subject luminance due to fill light irradiation is minimal and the subject is not near.

In S165, a determination is made on whether or not the night scene zoom information flag has been set to ON in advance as a set parameter of ROM 68 or from the manipulation section 11. If "Yes", the subroutine proceeds to S166. If "No", the subroutine proceeds to S167.

In S166, a determination is made on whether or not the zoom lens position is within a predetermined range, such as on the wide side of a predetermined position. If "Yes", the subroutine proceeds to S167. If "No", the subroutine proceeds to S168. Note that the zoom position not being within a predetermined range refers to a case where, for example, the zoom lens position is at the tele end or the vicinity thereof. In this case, a background distant landscape cannot be fit into the field angle and is therefore unsuited for night scene photography.

In S167, SR is set to night scene. The subroutine then proceeds to processing subsequent to module[3].

In S168, SR is set to AUTO. The subroutine then proceeds to processing subsequent to module[3].

Figure 12:
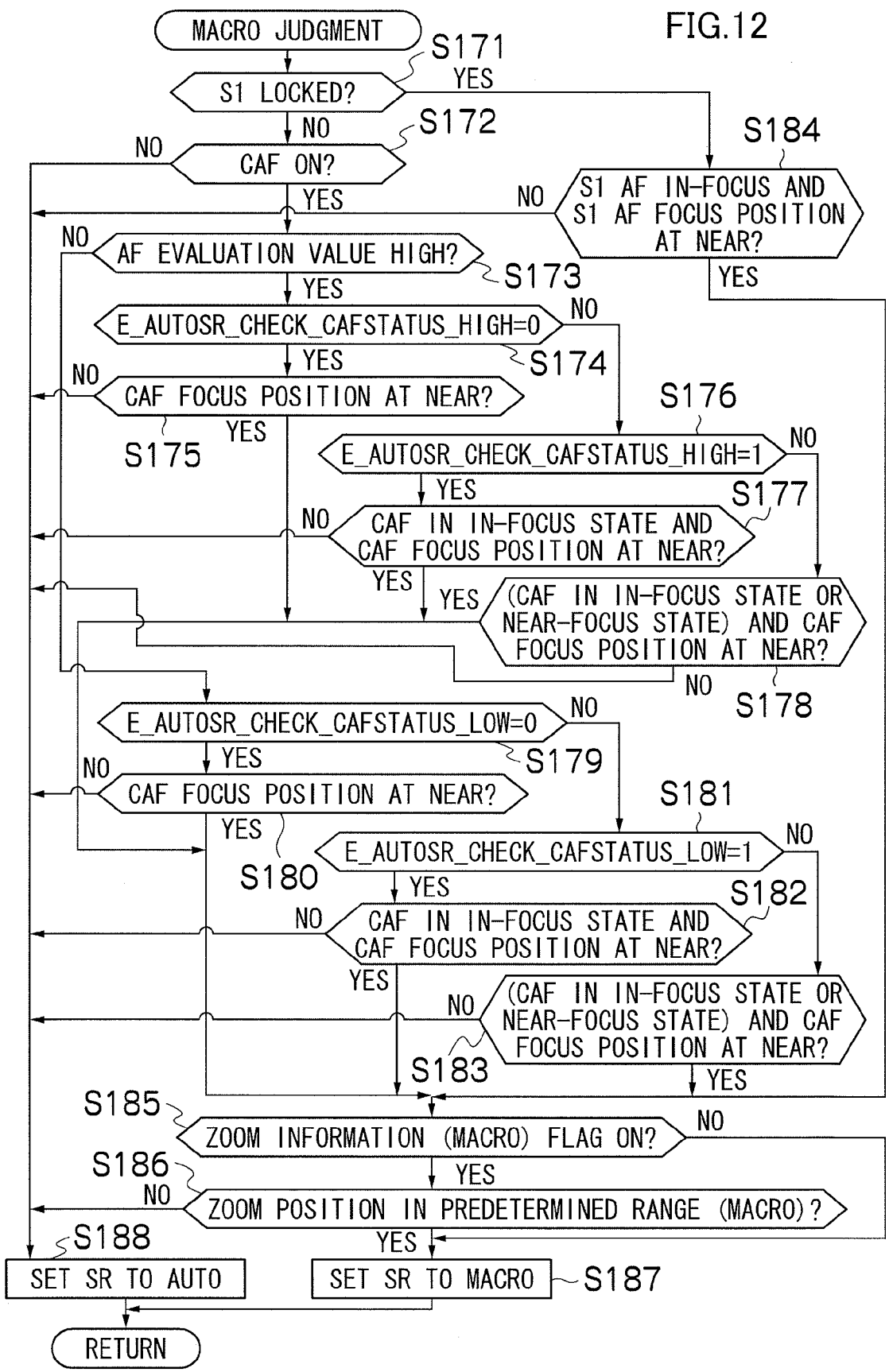
FIG. 12 is a flowchart of a scene judgment subroutine (macro judgment)

FIG. 12 is a flowchart showing details of a scene judgment subroutine (macro judgment, module[4]). Execution of the processing is controlled by the CPU 75 of the digital camera 1. A program defining the processing is stored in the ROM 68.

In S171, a determination is made on whether or not half-press (S1) of the shutter button has been locked. If "Yes", the subroutine proceeds to S184. If "No", the subroutine proceeds to S172.

In S172, a determination is made on whether or not the execution of CAF has been set in advance via settings menu or the manipulation section 11. If "Yes", the subroutine proceeds to S173. If "No", the subroutine proceeds to S188.

In S173, a determination is made on whether or not the AF evaluation value calculated by the pre-actual photography AF processing section 81 is higher than a predetermined threshold stored in the ROM 68. If "Yes", the subroutine proceeds to S174. If "No", the subroutine proceeds to S179. Moreover, the present step S173 may be omitted. In this case, the subroutine proceeds to S174 if "Yes" in S172. In addition, the various subsequent processing is also omitted when "No" is determined in S173.

In S174, a determination is made on whether or not E_AUTOSR_CHECK_CAFSTATUS_HIGH=0 is true. If "Yes", the subroutine proceeds to S175. If "No", the subroutine proceeds to S176.

In S175, a determination is made on whether or not an in-focus position decided as a result of the CAF is to the near (NEAR) side of a predetermined focal distance threshold stored in the ROM 68 or, in other words, whether or not the in-focus position is closer than a predetermined distance. If "Yes", the subroutine proceeds to S185. If "No", the subroutine proceeds to S188.

In S176, a determination is made on whether or not E_AUTOSR_CHECK_CAFSTATUS_HIGH=1 is true. If "Yes", the subroutine proceeds to S177. If "No", the subroutine proceeds to S178.

In S177, a determination is made on whether or not a local maximum point of the AF evaluation value has been detected as a result of the CAF, and a focal distance corresponding to the in-focus position determined by the local maximum point is to the near (NEAR) side of a predetermined focal distance threshold stored in the ROM 68 or, in other words, whether or not the focal distance is shorter than a predetermined distance. If "Yes", the subroutine proceeds to S185. If "No", the subroutine proceeds to S188.

In S178, a determination is made on whether or not a local maximum point of the AF evaluation value has been detected as a result of the CAF or the AF evaluation value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the near (NEAR) side of a predetermined focal distance threshold stored in the ROM 68 or, in other words, whether or not the focal distance is closer than a predetermined distance. If "Yes", the subroutine proceeds to S185. If "No", the subroutine proceeds to S188.

In S179, a determination is made on whether or not E_AUTOSR_CHECK_CAFSTATUS_LOW=0 is true. If "Yes", the subroutine proceeds to S180. If "No", the subroutine proceeds to S181.

In S180, a determination is made on whether or not an in-focus position decided as a result of the CAF is to the near (NEAR) side of a predetermined focal distance threshold stored in the ROM 68 or, in other words, whether or not the in-focus position is closer than a predetermined distance. If "Yes", the subroutine proceeds to S185. If "No", the subroutine proceeds to S188.

In S181, a determination is made on whether or not E_AUTOSR_CHECK_CAFSTATUS_LOW=1 is true. If "Yes", the subroutine proceeds to S182. If "No", the subroutine proceeds to S183.

In S182, a determination is made on whether or not a local maximum point of the AF evaluation value has been detected as a result of the CAF, and a focal distance corresponding to the in-focus position determined by the local maximum point is to the near (NEAR) side of a predetermined focal distance threshold stored in the ROM 68 or, in other words, whether or not the focal distance is shorter than a predetermined distance. If "Yes", the subroutine proceeds to S185. If "No", the subroutine proceeds to S188.

In S183, a determination is made on whether or not a local maximum point of the AF evaluation value has been detected as a result of the CAF or the AF evaluation value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the near (NEAR) side of a predetermined focal distance threshold stored in the ROM 68 or, in other words, whether or not the focal distance is closer than a predetermined distance. If "Yes", the subroutine proceeds to S185. If "No", the subroutine proceeds to S188.

In S184, a determination is made on whether or not an in-focus position has been determined by AF processing of the AF processing section 62 and a focal distance corresponding to the in-focus position is to the near (NEAR) side of a predetermined focal distance threshold stored in the ROM 68 or, in other words, whether or not the focal distance is closer than a predetermined distance. If "Yes", the subroutine proceeds to S185. If "No", the subroutine proceeds to S188.

In S185, a determination is made on whether or not a macro zoom information flag has been set to ON in advance as a set parameter of ROM 68 or from the manipulation section 11. If "Yes", the subroutine proceeds to S186. If "No", the subroutine proceeds to S187.

In S186, a determination is made on whether or not the zoom lens position is within a predetermined range stored in the ROM 68, such as on the wide side of a predetermined position. If "Yes", the subroutine proceeds to S187. If "No", the subroutine proceeds to S188. Note that the zoom position not being within a predetermined range refers to a case where, for example, the zoom lens position is at anywhere other than the wide end or the vicinity thereof. In this case, focusing of the proximal subject cannot be achieved and is therefore unsuited for close photography.

In S187, SR is set to macro. The subroutine then proceeds to processing subsequent to module[4].

In S188, SR is set to AUTO. The subroutine then proceeds to processing subsequent to module[4].

Figure 13:
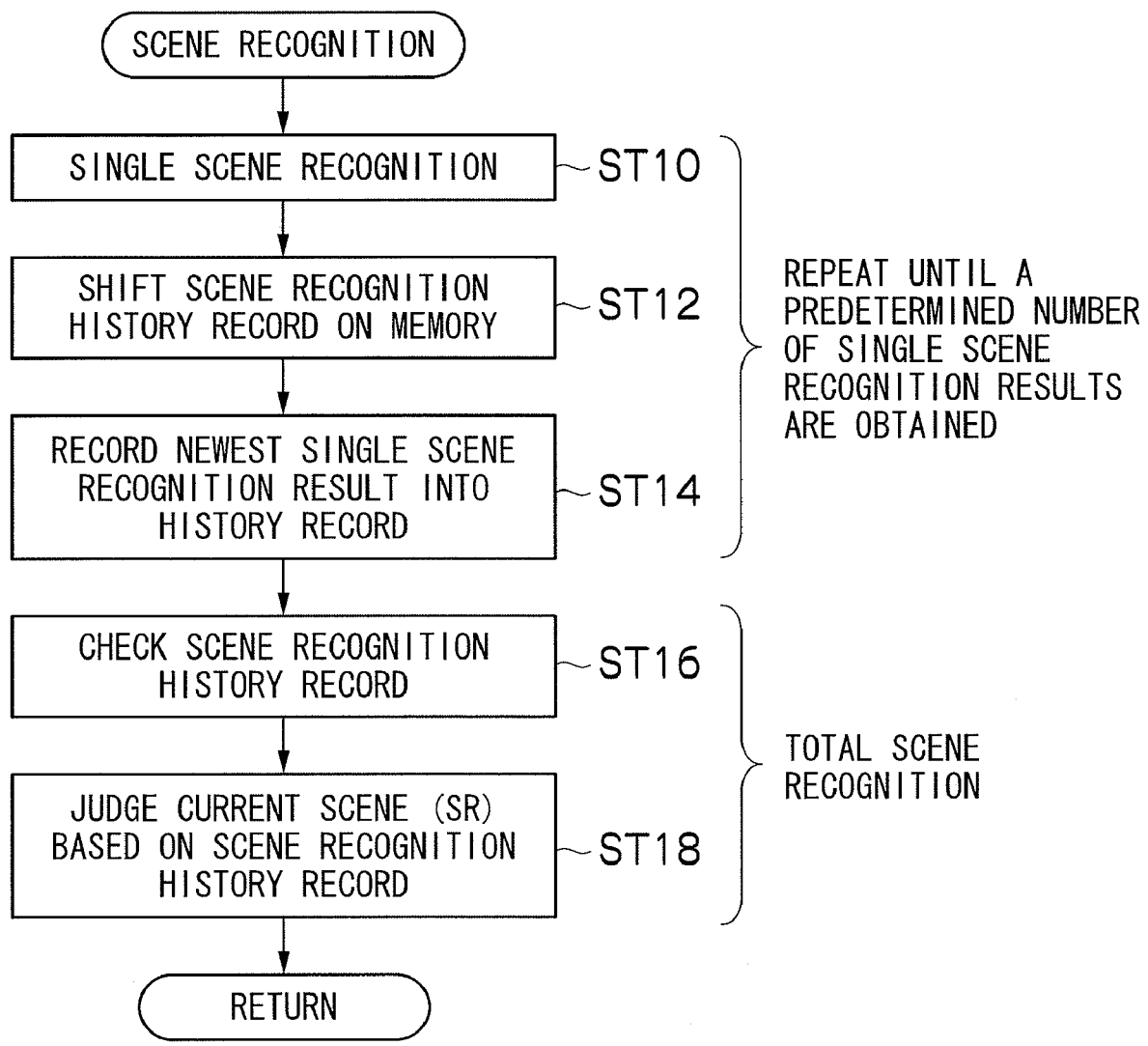
FIG. 13 is a flowchart showing scene recognition processing according to the first embodiment of the present invention.

FIG. 13 is a flowchart showing scene recognition processing according to the first embodiment of the present invention. The flowchart in FIG. 13 explains the single scene recognition and the total scene recognition in S9 to S13 in FIG. 2, in more detail.

First, photographic information including a face detection result, a focusing lens position, a zoom lens position, an in-focus state and a photometric value is acquired by the CPU 75, and scene recognition (above-described single scene recognition) is performed using the information (step ST10).

Storage areas of scene recognition history record on the memory (RAM 69) are shifted to create a free area for storing the newest value of the single scene recognition result (step ST12). The newest scene recognition result in step S10 is written into the storage area for the newest value (step ST14). ST10 to ST14 are repeated until the scene recognition counter becomes a predetermined number (a threshold of the number of single scene recognition results) or more.

Further, the digital camera 1 (CPU 75) judges a current scene SR based on the history record of single scene recognition results (scene recognition history record) recorded in the RAM 69 and sets a photographing mode suitable for photographing each scene. Hereinafter, scene judgment (recognition) based on scene recognition history record shall be referred to as total scene recognition.

In the total scene recognition, scene recognition history record is read (step ST16), and based on the scene recognition history record, the current scene SR is judged (step ST18). A photographing mode is set in accordance with the judgment result of the scene SR. In step ST18, for example, the scene SR currently being photographed is judged based on the number of recognitions (recognition frequency) and the newness of the recognition result in the scene recognition history record.

Figure 14:
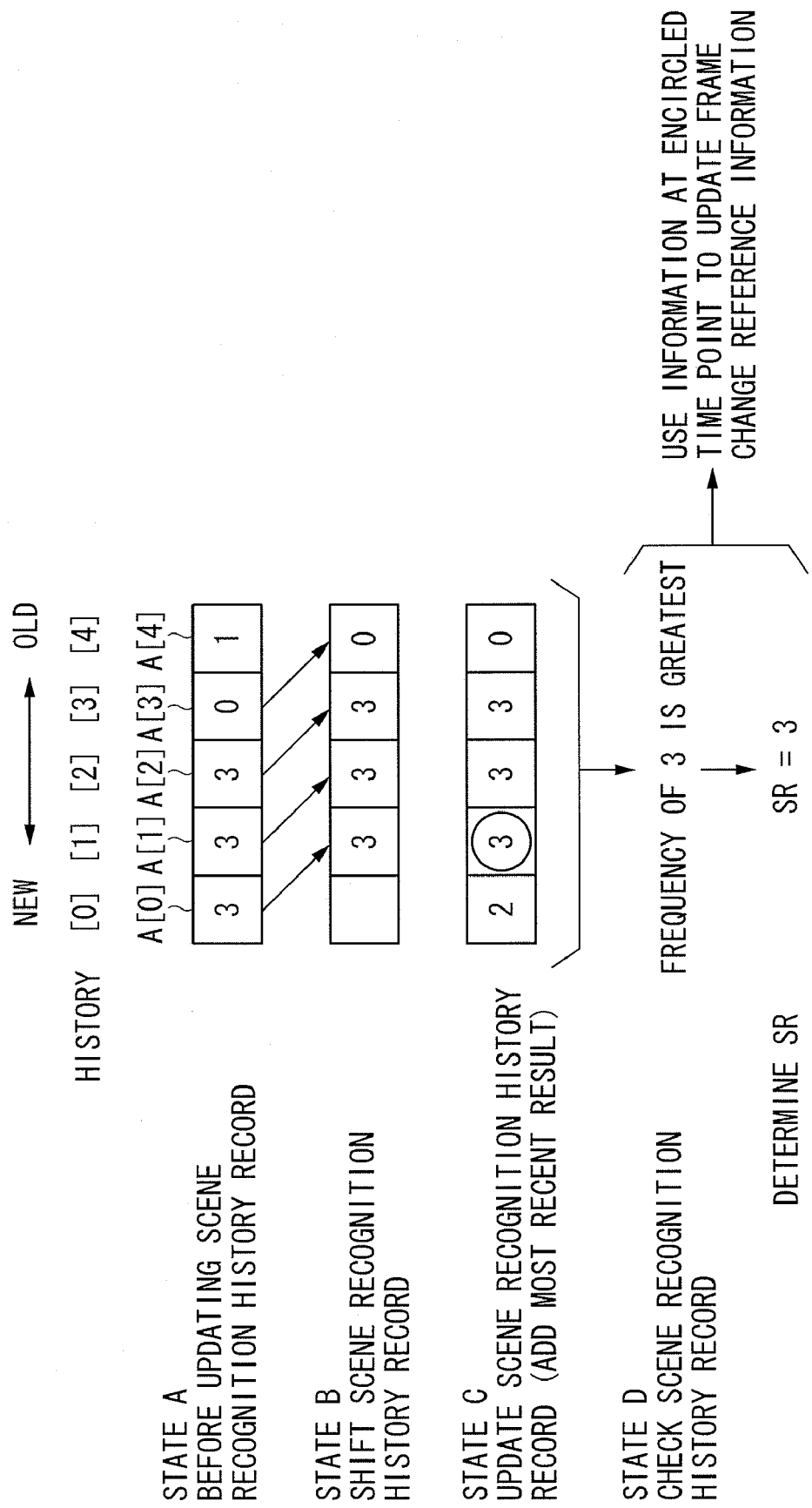
FIG. 14 is a diagram schematically showing total scene recognition processing.
Figure 15:
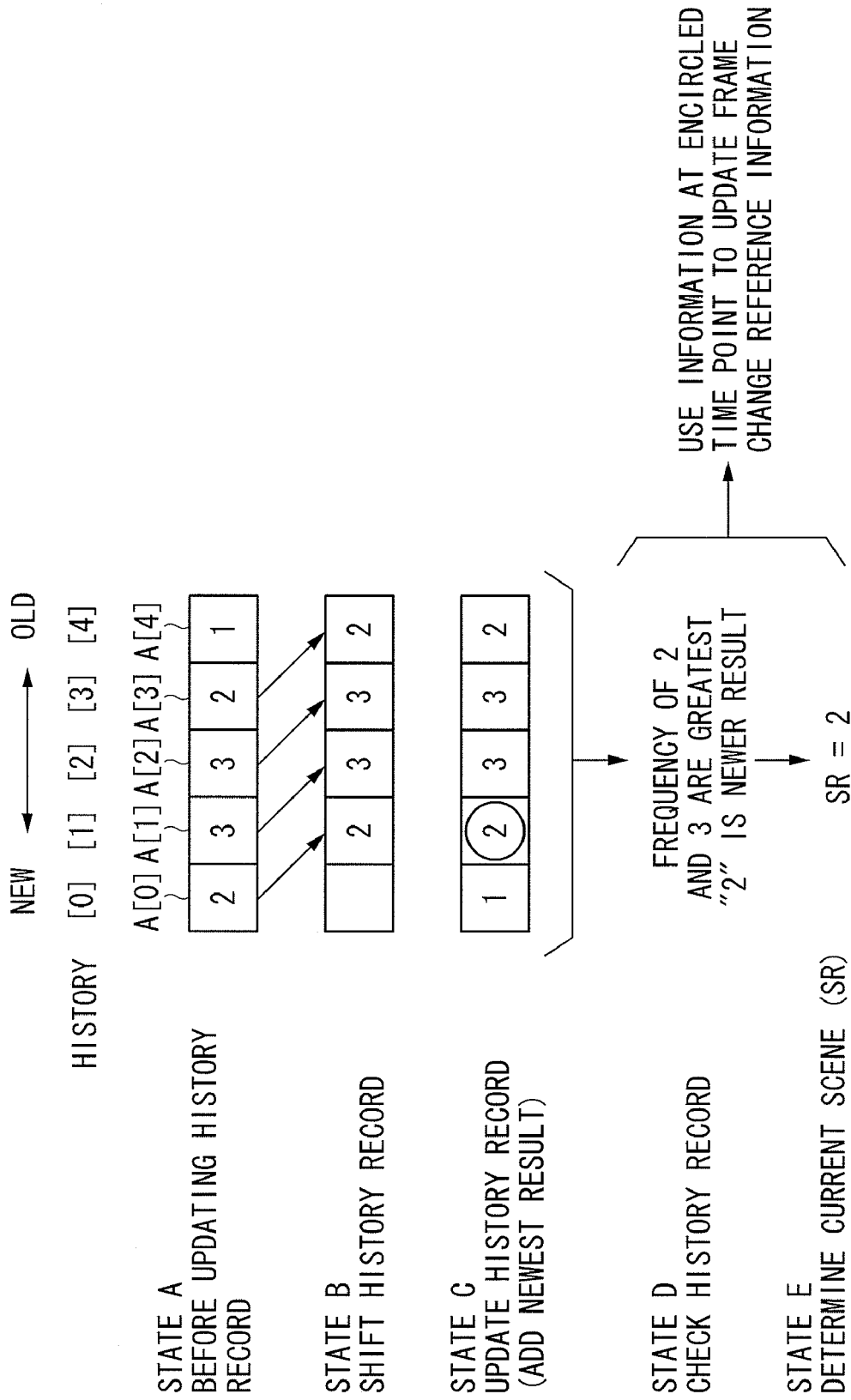
FIG. 15 is a diagram schematically showing total scene recognition processing.

The digital camera 1 according to the present embodiment, in the total scene recognition, judges a scene SR currently being photographed based on the number of recognitions (recognition frequency) and the newness of recognition results with in the scene recognition history record. FIGS. 14 and 15 are diagrams schematically showing total scene recognition processing in S13.

As shown in State A in State A in FIG. 14, storage areas A[0], A[1], A[2], . . . for sequentially storing single scene recognition results are provided on the RAM 69 of the digital camera 1. In the example shown in State A in FIG. 14, each scene is represented by a predetermined numeral (hereinafter referred to as scene ID). "0" when the scene is "AUTO", "1" when the scene is "portrait", "2" when the scene is "landscape", "3" when the scene is "night scene", and "4" when the scene is "macro" are to be written, as scene IDs, in a storage area A[i] (where i=0, 1, 2, . . . ) in the RAM 69. The single scene recognition result in storage area A[0] is the newest, and single scene recognition results become older in the order of A[1], A[2], . . . .

As shown in State A in FIG. 14, five scene recognition results SR are successively stored from the oldest to the newest. A suffix j=0 to 4 is attached to each scene recognition result SR, where the smaller the number, the more recent the scene recognition result. A case where the number of accumulated scene recognition results is 5 is merely an example and any integer equal to or greater than 3 shall suffice.

Each time module[i], which is single scene recognition, is executed in S73, S75, S77, and S79 or in S85, S88, S91, and S94, a new scene recognition result SR is acquired. As a result, the suffixes of previous scene recognition results SR accumulated up to then are incremented by 1 and the previous scene recognition results SR become those one generation older. The new scene recognition result SR is attached with a suffix of 0 to become a current scene recognition result.

In other words, as shown in State B in FIG. 14, when single scene recognition is executed, storage areas A[0], A[1], A[2], . . . for the scene recognition history record on the RAM 69 shift such that A[0]→A[1], A[1]→A[2], A[2]→A[3], . . . , whereby the storage area A[0] of the newest single scene recognition result becomes a free area. Subsequently, as shown in State C in FIG. 14, the newest single scene recognition result is written into the free area A[0].

In State B in FIG. 14, what was SR[0]=3, SR[1]=3, SR[2]=3, SR[3]=0 and SR[4]=1 in State A in FIG. 14 becomes SR[1]=3, SR[2]=3, SR[3]=3, and SR[4]=0 as a result of the addition of a new single scene recognition result SR[0]=2. Prior to the addition of the new single scene recognition result SR[0], the single scene recognition result of the oldest generation SR[4]=1 may either be deleted from or stored in the RAM 69 upon the addition of the new single scene recognition result.

In S13, when a new single scene recognition result is added, a single scene recognition result with the highest frequency of appearance among SR[0], SR[1], SR[2], SR[3], and SR[4] is identified and re-assumed to be the scene recognition result SR (total scene recognition result).

In the example shown in State C in FIG. 14, "night scene" represented by "3" and which appears three times in the scene recognition history record has the greatest frequency. The CPU 75 sets the total scene recognition result to SR=3 and sets the photographing mode to the night scene mode. Consequently, photographing and recording of images can be executed under photographic conditions and image processing conditions of the night scene mode. Further, the frame change reference information is updated based on photographic information used at the point of obtaining the newest one among the single scene recognition results with the greatest frequency. In State C in FIG. 14, the single scene recognition results of the greatest frequency, i.e., 3, are SR[1], SR[2] and SR[3]. Among them, the newest single scene recognition result is SR[1], and thus, the frame change reference information is updated based on photographic information used at the point of obtaining the single scene recognition result SR[3].

When there are a plurality of single scene recognition results which share the greatest frequency of appearance, the single scene recognition result of the newest generation is assumed to be the scene recognition result SR. For example, in State C in FIG. 15, SR[0]=1, SR[1]=2, SR[2]=3, SR[3]=3 and because SR[1]=SR[4]=2, and SR[2]=SR[3]=3, "landscape" represented by "2" and "night scene" represented by "3" respectively appear twice (has maximum frequency) in the scene recognition history record. In this case, total scene recognition is performed based on the newness of the single scene recognition results. In the example shown in State C in FIG. 15, since the single scene recognition result SR[1] having the value of "2" is stored in a storage area on the newer side than the single scene recognition results having the value of "3", the CPU 75 sets the total scene recognition result to SR=2 and sets the photographing mode to the landscape mode. Further, the CPU 75 updates the frame change reference information based on photographic information used at the point of obtaining the single scene recognition result SR[1].

Results of the scene judgments shown in FIGS. 8 to 15 are controlled by a CPU 75 so as to be displayed on the display section 71.

For example, as shown in FIG. 16, characters such as "landscape", "AUTO", "portrait", "night scene", "macro", and the like which are results of scene judgments are superimposed on a live view or a recording image subsequent to the shutter button being fully pressed, and displayed on the display section 71. Character strings, icons, symbols, and other information indicating scene judgment results are generated by an OSD circuit, not shown. If the camera 1 is provided with an sound processing circuit or a speaker, the sound processing circuit or the speaker may be controlled by the CPU 75 so as to output an alarm sound corresponding to the scene judgment result. The scene judgment result is not displayed if "automatic scene recognition OFF" has been set.

From the processing described above, it is possible for a user to recognize what kind of scene the user is attempting to photograph or has already photographed. As shown in FIG. 16, the recognition result is notified in a form readily understandable by the user as a text or an icon display. Recognizable scenes are: portrait (FIG. 8), landscape (FIG. 9), night scene (FIGS. 10 and 11), and macro (FIG. 12). AUTO is set when the scene judgment result does not fit any of these scenes.

In the main processing shown in FIG. 2, scene recognition is performed when a scene change is detected. A frame status when the previous scene recognition result is finalized and changes in the state of a current frame are monitored (S4, FIG. 3). If it is determined that a scene change has occurred when a change has occurred (S5), "status" enters a search state (S6), and the recognizing section becomes operational at the timing of the scene change (S9).

In the frame change check shown in FIG. 3, a plurality of factors for detecting change can be retained, and the order the factors can be shuffled through the settings of E_AUTOSR_FRAME_CHECK1 to 3. When a change is detected, the value of "change_measure" which is an indicator of frame change is incremented (S24, S28, S32). When the value of "change_measure" is equal to or greater than E_AUTOSR_FRAME_CHANGE_MEASURE ("Yes" in S25, S29, S33), it is determined that a frame change has occurred (S35).

Here, photometric value change check (FIG. 4), focus position change check (FIG. 5), and face presence/absence change check (FIG. 6) are shown as specific processing for detecting a frame change. Moreover, although not shown, a frame change may alternatively be detected depending on the occurrence/nonoccurrence of in-focus detection by the pre-actual photography AF processing section 81.

In the photometric value change check shown in FIG. 4, "delta_ev" which acts as an indicator of change amount of a photometric value (photometric value change amount) is determined by calculating a photometric value change amount for each of N segmented areas, performing weighting using weights corresponding to the respective areas, and taking a summation them. Furthermore, an occurrence of a photometric value change is determined when the value of "delta_ev" is equal to or greater than E_AUTOSP_FRAME_DELTA_EV.

In the focus position change check in FIG. 5, "delta_focal_point" which is an indicator of a focus position change amount is calculated based on a difference between the focus position in the frame change reference information (reference information) and a current focus position. An occurrence of a photometric value change is determined when the value of "delta_focal_point" is equal to or greater than a focus position change threshold. Moreover, the threshold used here is assumed having been set in ROM 68 for each zoom position.

In the face presence/absence change check in FIG. 6, it is determined that a face presence/absence change has occurred when the face presence/absence result in the reference information and the current face presence/absence result differ from each other.

Scene recognition history record used in operations of the recognizing section is cleared after obtaining an SR (total scene recognition result) to be adopted as a result of automatic scene recognition (S8). This is performed to prevent information obtained at separated time points from being referenced in scene recognition because the recognizing section is not assumed to be always operational.

Here, in order to clear scene recognition history record, an arrangement is provided in which SR is not updated from the point where the "status" is set to a search state (S6) until the point where the recognizing section operates as many times as needed to obtain a number of single scene recognition results required in total scene recognition (until S11 results in "Y").

In addition, upon determining SR, the (newest) photographic information at the point when the adopted SR with greatest frequency is stored as frame change reference information for checking frame changes (S13).

Moreover, the "status" is set to "finalized state" when the determined SR is other than AUTO (S16), and the recognizing does not work until the scene changes. On the other hand, the "status" is set to "search state" when the determined SR is AUTO (S15), and the recognizing section continues its processing. This is because it is possible that a scene change cannot be correctly detected if the "status" is set to "finalized state" based on a recognition result obtained in the middle of scene change.

If, for example, when a state in the middle of a scene change is registered as reference information, and then a frame change is checked, it is possible that the recognizing section cannot work due to the small difference from the reference information even though it is desired that the recognizing section become operational in a state where the scene change is ultimately concluded. Therefore, in order to avoid this problem, processing is performed to update the reference information based on photographic information corresponding to the finalized scene as described above (S13).

Unless the result of scene recognition can be stabilized, an output result will confuse the user. Therefore, by performing processing for determining what type of scene a particular scene is (S7 to S16) and processing for monitoring whether or not a change has occurred from a recognized scene (S4 to S6) in a mixed manner, it becomes now possible to perform scene recognition in an accurate and stable manner.

Second Embodiment

Figure 17:
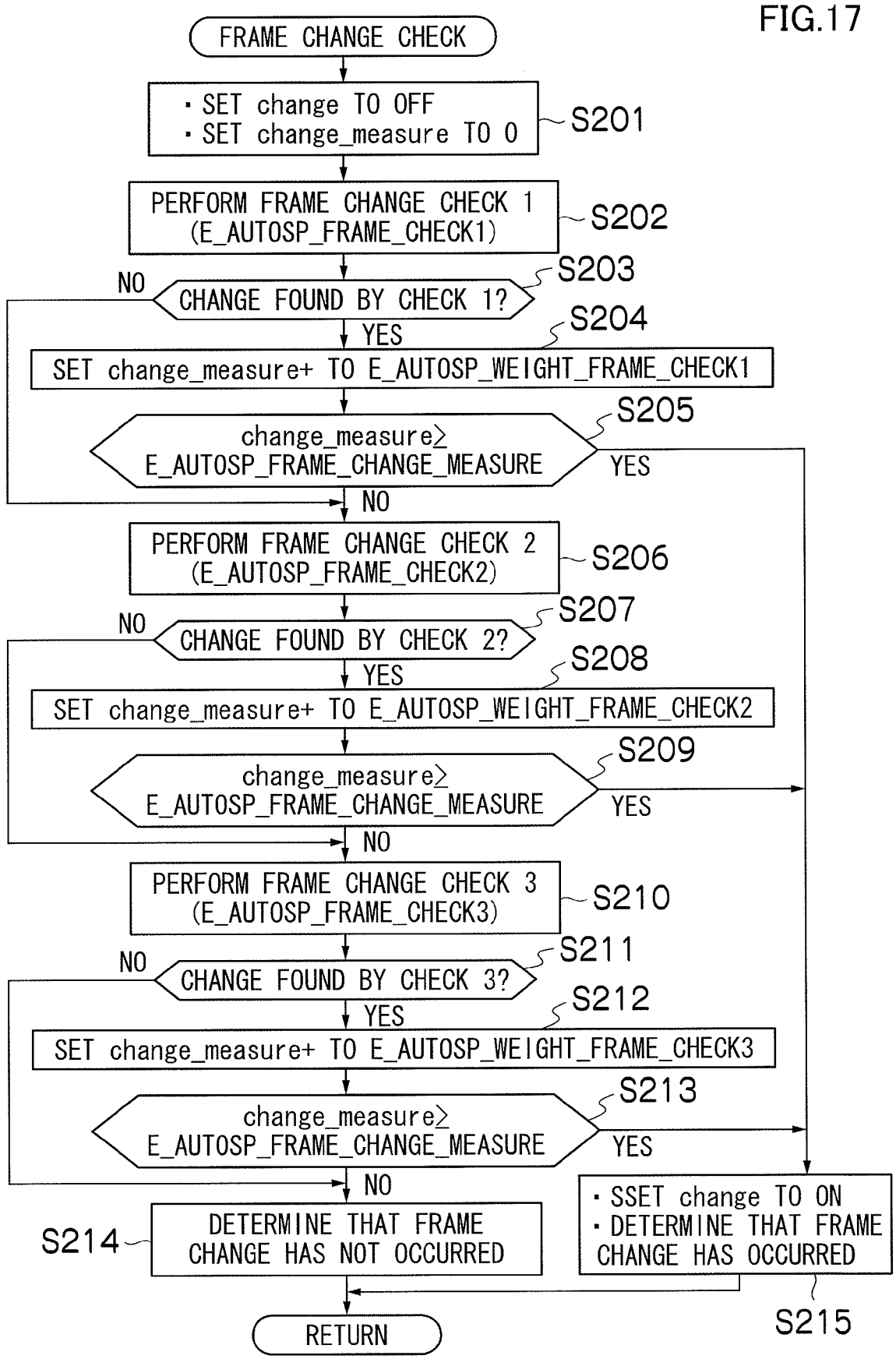
FIG. 17 is a flowchart of a frame change check according to a second embodiment.

FIG. 17 is a flowchart of a frame change check subroutine according to a second embodiment. This processing can be executed in place of the processing shown in FIG. 3. Execution of the processing is controlled by the CPU 75 of the digital camera 1. A program defining the processing is stored in the ROM 68.

S201 to S203 are the same as S21 to S23.

In S204, a value obtained by adding a weight E_AUTOSP_FRAME_CHECK1 corresponding to the first frame change check to the parameter "change_measure" in the RAM 69 is set as the new "change_measure". E_AUTOSP_FRAME_CHECK1 is stored in advance in the ROM 68.

S205 to S207 are the same as S25 to S27.

In S208, a value obtained by adding a weight E_AUTOSP_FRAME_CHECK2 corresponding to the second frame change check to the parameter "change_measure" in the RAM 69 is set as the new "change_measure". E_AUTOSP_FRAME_CHECK2 is stored in advance in the ROM 68.

S209 to S211 are the same as S29 to S31.

In S212, a value obtained by adding a weight E_AUTOSP_FRAME_CHECK3 corresponding to the third frame change check to the parameter "change_measure" in the RAM 69 is set as the new "change_measure". E_AUTOSP_FRAME_CHECK3 is stored in advance in the ROM 68.

S213 to S215 are the same as S33 to S35.

FIG. 18 is a table stored in the ROM 68 showing a relationship between an example of weights E_AUTOSP_FRAME_CHECK1 to 3 corresponding to the first to third frame change checks and an example of "change_measure" values corresponding to the occurrence/nonoccurrence of changes according to the first to third frame change checks.

In this case, as an example, it is assumed that: the first frame change check is face presence/absence change (FIG. 6); the second frame change check is focus position change (FIG. 5); the third frame change check is photometric value change (FIG. 4); and that E_AUTOSP_FRAME_CHECK1=2, E_AUTOSP_FRAME_CHECK2=1, and E_AUTOSP_FRAME_CHECK3=1 are set. In other words, face presence/absence change is assigned a greater weight than those of focus position change and photometric value change.

Although the table covers all possible change result combinations of the first to third frame change checks, the depiction thereof is omitted. For example, in the case of E_AUTOSP_FRAME_CHANGE_MEASURE=2, if it is determined by the first frame change check (face presence/absence change) that a change has occurred, then change_measure=2=E_AUTOSP_FRAME_CHANGE_MEASURE becomes true. Therefore, "Yes" is determined in S205, and the subroutine proceeds to S215 where it is determined that a frame change has occurred. In other words, since the weight corresponding to face presence/absence change is large, the occurrence of a face presence/absence change alone immediately results in an occurrence of a frame change.

On the other hand, when it is determined in the first frame change check (face presence/absence change) that a change has not occurred, change_measure=1<E_AUTOSP_FRAME_CHANGE_MEASURE becomes true even when it is determined in the second frame change check (focus position change) that a change has occurred. Therefore, unless it is determined in the third frame change check that a change has occurred, then "No" is determined in S213, and the subroutine proceeds to S214 where it is determined that a frame change has not occurred. In other words, since the weight corresponding to (assigned to) the focus position change is small, an occurrence of a focus position change alone does not immediately result in an occurrence of a frame change, and an occurrence of a frame change is determined only upon the occurrence of a change due to additional another factor.

The contents of the table shown in FIG. 18 or, in other words, the weights corresponding to the respective frame change checks and the value of E_AUTOSP_FRAME_CHANGE_MEASURE can be freely set by the user via the manipulation section 11 from an "important item selection" screen displayed on the display section 71.

Accordingly, when there are a plurality of factors that determine whether a scene has changed, scene change criteria can be expressed in various forms by enabling weights corresponding to the respective factors to be settable. If the user is able to freely set conditions for determination of an occurrence of scene change, scene change criteria can be customized and a change in a factor emphasized by the user can be strongly reflected onto scene change determination.

Third Embodiment

Figures 2, 19:
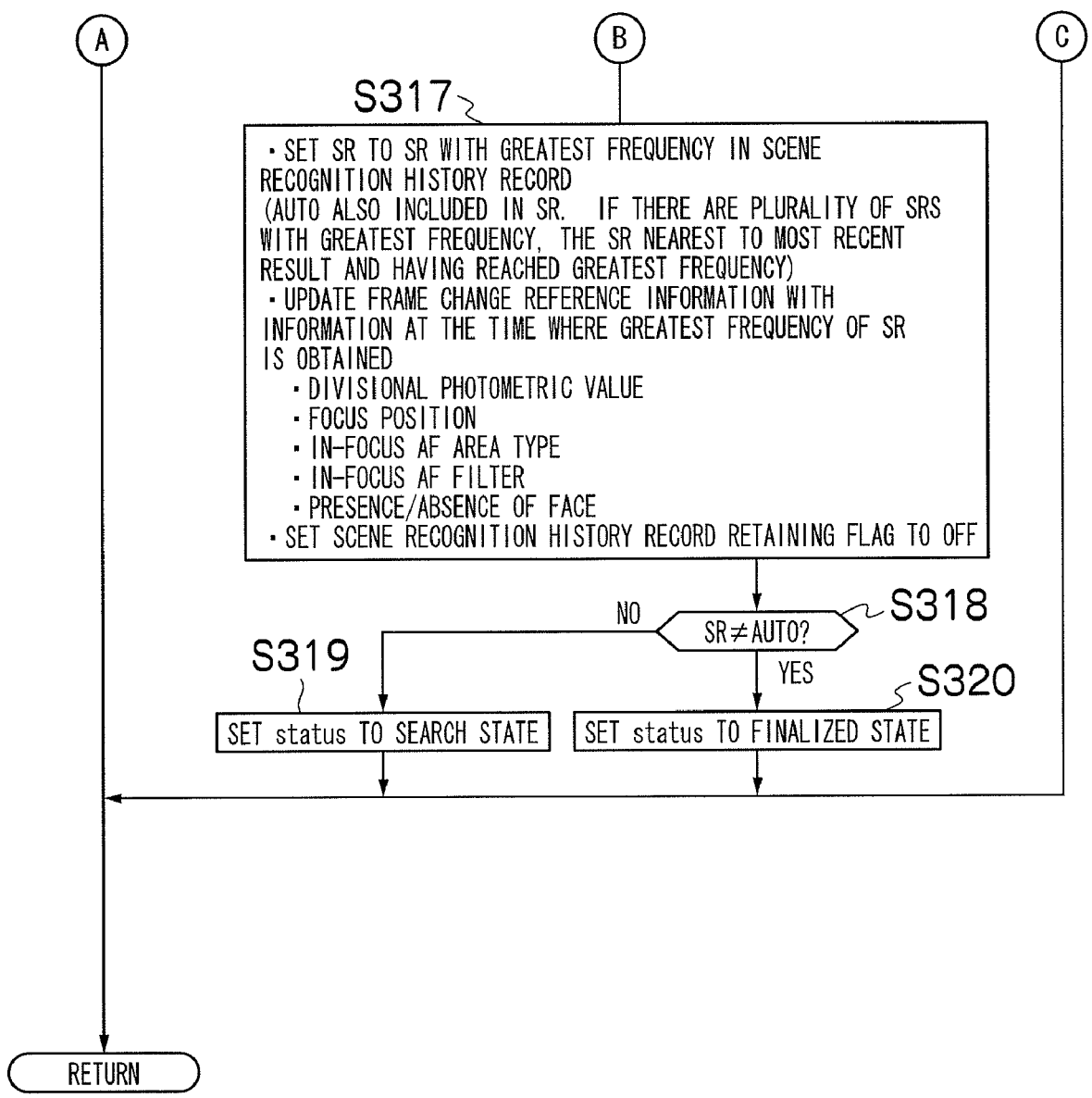
FIG. 19 is a flowchart of scene recognition main processing according to a third embodiment.

FIG. 19 is a flowchart of main processing according to a third embodiment. This processing can be executed in place of the processing shown in FIG. 2. Execution of the processing is controlled by the CPU 75 of the digital camera 1. A program defining the processing is stored in the ROM 68. In this embodiment, frame change check (single frame change check) are performed based on frame change reference information and photographic information a plurality of times, and further, the frame change check results are accumulated as frame change history record, and frame change check (total frame change check) is performed based on the frame change history record.

S301 to S303 are the same as S1 to S3. However, in S302, frame change history record is also initialized.

In S304, frame change history record stored in RAM 69 is advanced to older side by one generation. In other words, frame change check results in frame change history record are shifted. In STATE A in FIG. 20, as an example, five frame change check results starting from the newest, namely, 1, 1, 0, 0, 0, are shifted. As a result, a storage area for the newest frame change check result in the frame change history record becomes "null" and older check results in the frame change history record become 1, 1, 0, 0 (STATE B in FIG. 20). Moreover, the number of frame change check results in the history record is not required to be five.

In S305, a frame change check (single frame change check) is performed on a loaded newest frame and the result is added to the frame change history record as the newest frame change check result.

In S306, as a result of S305, a determination is made on whether or not a frame change has occurred. If "Yes", the subroutine proceeds to S307. If "No", the subroutine returns to S301.

In S307, the change flag of the newest frame change check result in the frame change history record stored in RAM 69 is set to ON. In STATE C in FIG. 20, as an example, an occurrence of a frame change is determined for the newest frame and the frame change history record becomes 1, 1, 1, 0, 0.

S308 is the same as S4.

In S309 and S310, frame change check (total frame change check) is performed based on the frame change history record. In S309, the frame change history record stored in the RAM 69 is referenced and the number of frame changes occurred (E_AUTOSR_FRAME_CHECK_HISTORY) is counted.

In S310, it is determined whether or not the number of frame change occurrences (E_AUTOSR_FRAME_CHECK_ HISTORY) counted in S309 among the previous M (in FIG. 20, M=5) number of frame change check results is equal to or greater than a predetermined scene change determination threshold (E_AUTOSR_ SCENE_CHANGE_JUDGE) stored in the ROM 68. If "Yes", the main processing proceeds to S310. If "No", the main processing returns to S301.

In S310, it is determined that a scene change has occurred, whereby "status" is set to a search state and the frame change history record in the RAM 69 is cleared. That is, the frame change history record 1, 1, 1, 0, 0 shown in STATE C in FIG. 20 is all cleared and determination (total frame change check) of occurrence/nonoccurrence of a scene change based on the frame change history record is not performed until M number of frame change check results are newly accumulated.

In S311, a determination is made on whether or not the scene recognition history record retaining flag is ON. If "Yes", the main processing proceeds to S313. If "No", the main processing proceeds to S312.

In S312, the scene recognition counter in the RAM 69 is set to 0, and the scene recognition history record is cleared.

S313 to S321 are respectively the same as S9 to S17.

In the present processing, a frame status when the previous scene recognition result SR had been finalized and changes in the state of a current frame are monitored. A predetermined number of the frame change states (single frame change check results) are to be sequentially stored from oldest to newest as a frame change history record. If the number of determination results of "frame change occurred" in the history record including E_AUTOSR_FRAME_CHECK_HISTORY number of results is equal to or greater than E_AUTOSR_SCENE_CHANGE_JUDGE ("Yes" in S309), it is determined that "scene change occurred" is made (S310) and the recognizing section becomes operational (S313).

In this manner, by using the frame change history record when performing a scene change check, hunting can be prevented and accurate scene change check (determination) can be performed.

Fourth Embodiment

Figures 1, 21:
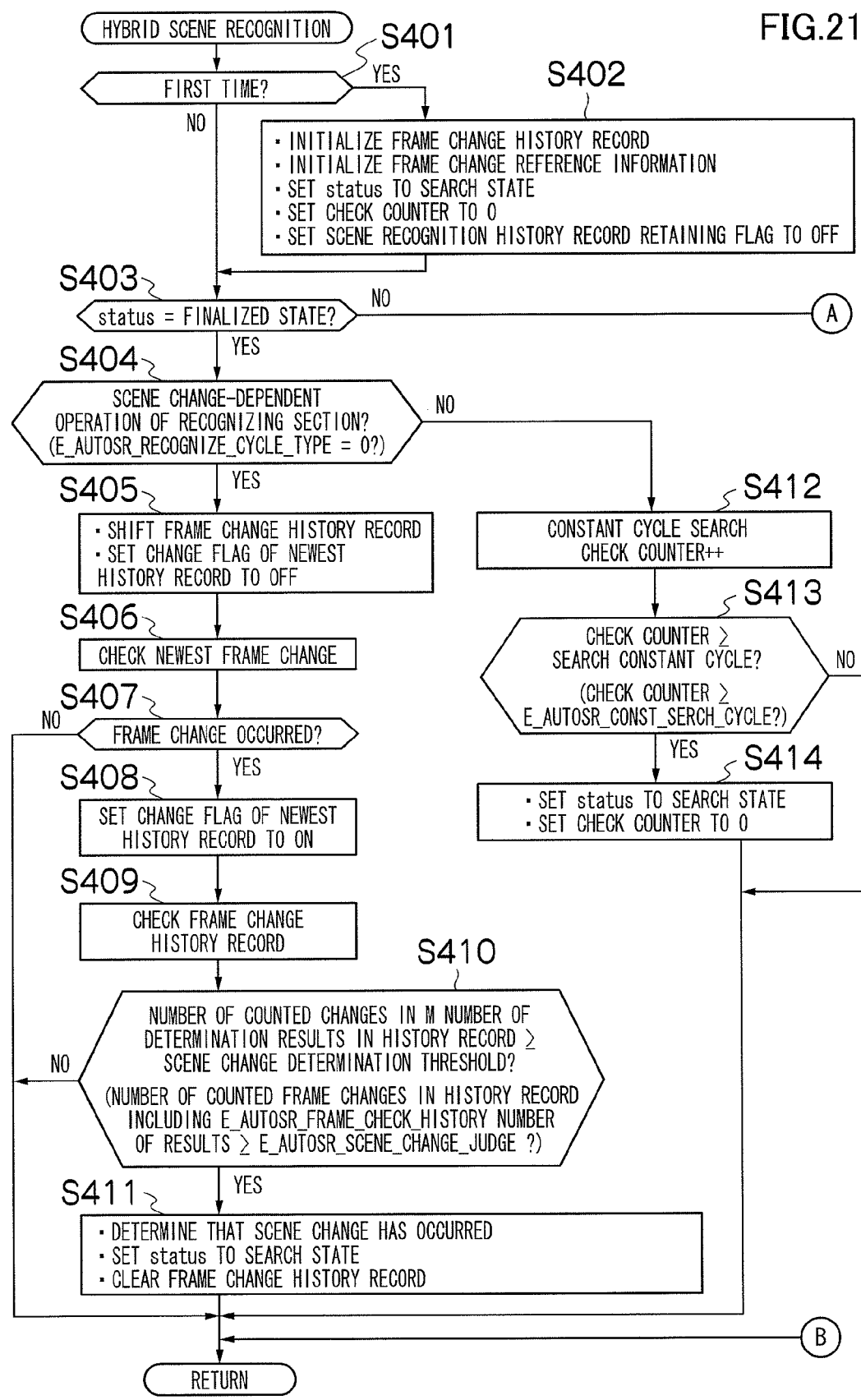
FIG. 21 is a flowchart of scene recognition main processing (scene change recognition/cyclic recognition concomitant) according to a fourth embodiment.
Figures 2, 21:
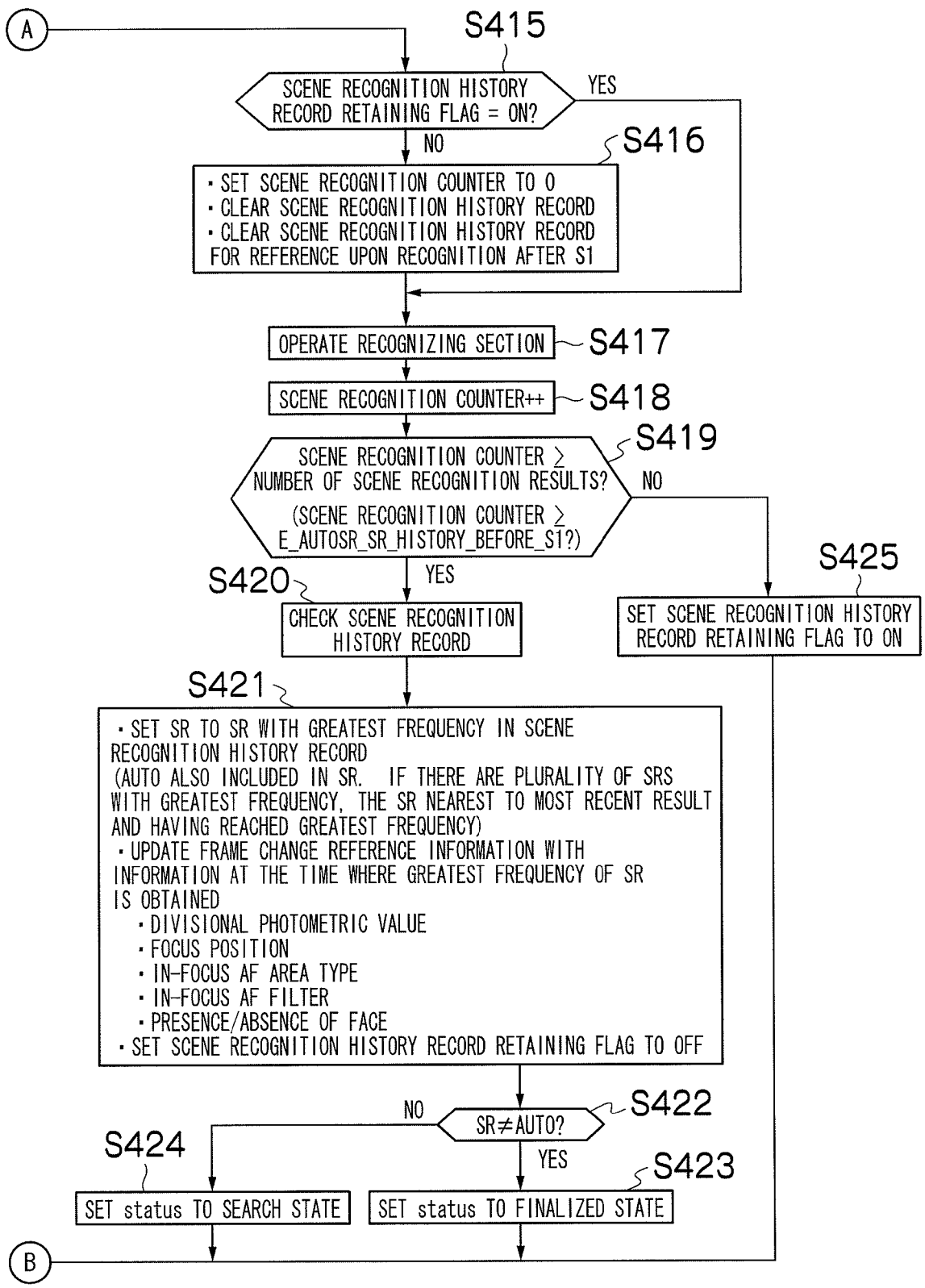

FIG. 21 is a flowchart of main processing (scene change recognition/cyclic recognition concomitant) according to a fourth embodiment. This processing can be executed selectively with the processing shown in FIG. 2 (or FIG. 19). Execution of the processing is controlled by the CPU 75 of the digital camera 1. A program defining the processing is stored in the ROM 68.

S401 is the same as S1.

In S402, the frame change history records in the RAM 69 are initialized, the frame change reference information is initialized, "status" is set to a search state, the check counter is set to 0, and the scene recognition history record retaining flag is set to OFF.

In S403, a determination is made on whether or not "status" is a finalized state. If "Yes", the main processing proceeds to S404. If "No", the main processing proceeds to S415.

In S404, a determination is made on whether or not a flag instructing to cause the recognizing section to become cyclically operational (E_AUTOSR_RECOGNIZE_CYCLE_ TYPE=0) has been set. If "Yes", the main processing proceeds to S405. If "No", the main processing proceeds to S412. The value of E_AUTOSR_RECOGNIZE_CYCLE_TYPE may either be arbitrarily inputted by the user via the manipulation section 11 or be stored in advance in the ROM 68 by the manufacturer. The cyclic unit is also arbitrary and may be arbitrarily set by the user from the manipulation section 11. For example, a cycle can be set to "every two seconds" or "every five frames". By causing the recognizing section to operate cyclically, recognition results can be prevented from changing rapidly and stability can be increased. In addition, since checks are performed cyclically, even if an inappropriate recognition is temporarily made, such an inappropriate recognition does not remain outputted subsequent to such a result.

S405 to S411 are respectively the same as S304 to S310.

In S412 to S414, "status" is set to a search state depending on the occurrence/nonoccurrence of the arrival of a constant cycle in which a scene change search is performed. In other words, in S412, the check counter is incremented by 1, and in S413, a determination is made on whether or not the check counter has reached a predetermined search cycle E_AUTOSR_CONST_SEARCH_CYCLE stored in the ROM 68. If "Yes", the main processing proceeds to S414. If "No", the main processing returns to S401. In S414, "status" is set to a search state and the check counter is set to 0.

S415 to S425 are respectively the same as S311 to S321.

A timing when the recognizing section becomes operational (that is, scene recognition is performed), may set at a point when scene change is detected at a constant frequency, and both setting timings have drawbacks and advantages. When the scene recognition is set to be performed at a point when scene change is detected, responsiveness is increased compared to when it is set at a constant frequency. In contrast, in the case when scene recognition is set to be performed per constant cycle, greater stability is achieved and even when an erroneous scene judgment is once made, such a judgment will not be outputted on the screen. Accordingly, enabling the user to select which of the methods is to be adopted makes it possible to enhance user-specific usability.

In addition, even when the selection as to the timing is to be made in advance by a designer (manufacture) instead of enabling user selection, it is possible to realize operations of both cases by taking advantage of parametric differences utilizing common firmware. Therefore, it is even possible to change control according to users who are targets of different camera products (models) without changing firmware.

Fifth Embodiment

Next, a fifth embodiment of the present invention will be described. Hereinafter, descriptions of configurations similar to that of the first embodiment shall be omitted.

The present embodiment is arranged such that the number of single scene recognition results used to judge a scene SR during total scene recognition during S1-on is reduced as compared to before S1 (during S1-off or during live view display).

Figure 22:
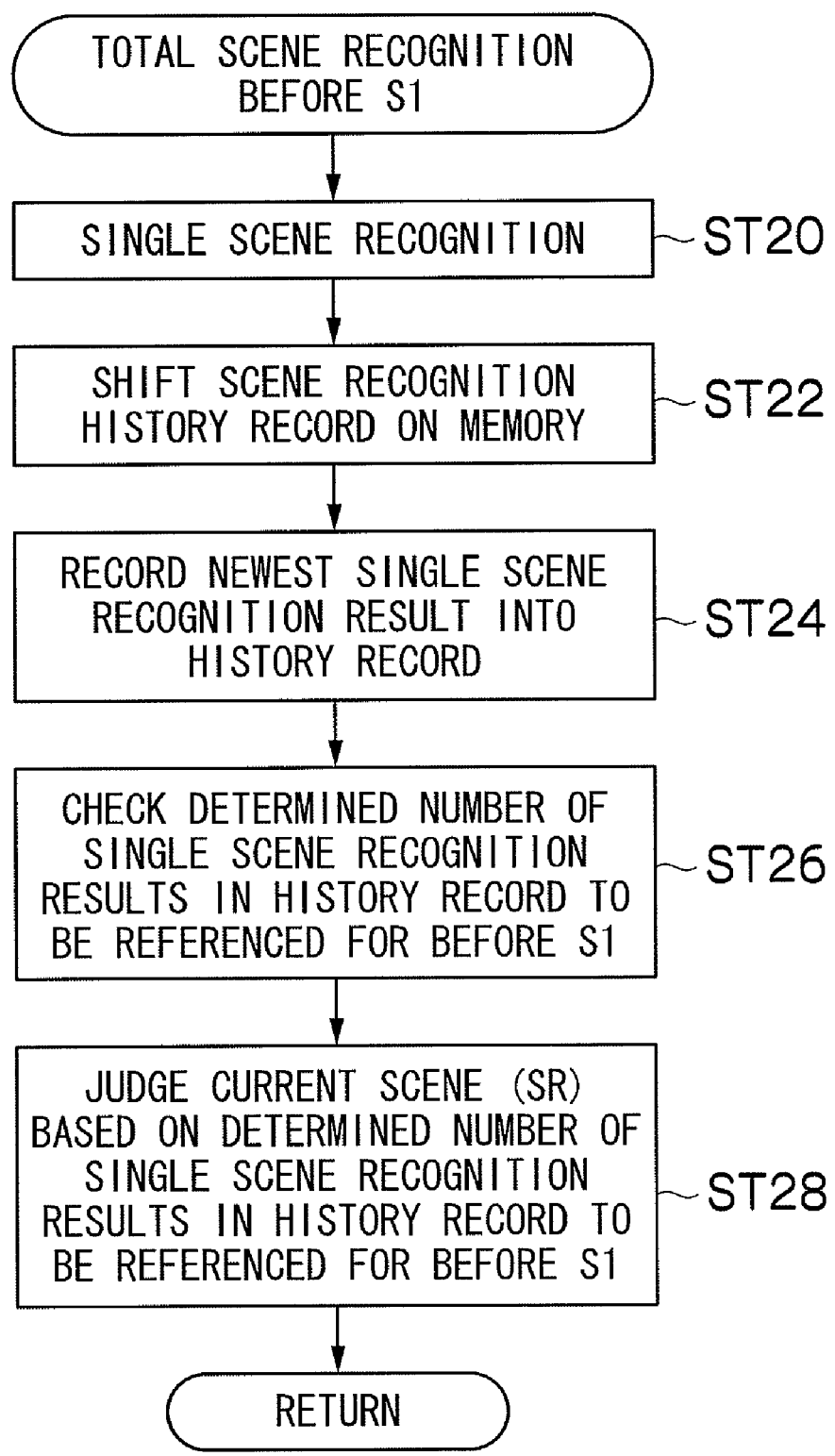
FIG. 22 is a flowchart showing total scene recognition processing (before S1) according to a second embodiment of the present invention.

FIG. 22 is a flowchart showing total scene recognition processing (before S1) according to the fifth embodiment of the present invention.

First, photographic information on a face detection result, a focusing lens position, a zoom lens position, an in-focus state and a photometric value is acquired by the CPU 75, and scene recognition (single scene recognition) is performed using the photographic information (step ST20).

Storage areas of scene recognition history record on the memory (RAM 69) are shifted to create a free area for storing the newest value of single scene recognition result (step ST22). The newest single scene recognition result in step ST20 is written into the storage area for the newest value (step ST24).

A scene recognition history record including a predetermined number of single scene recognition results (the number of results to be referenced for before S1) used to judge a scene SR in the total scene recognition before S1 (during live view display) are read (step ST26), and based on the scene recognition history record, the current scene SR is judged (step ST28). For example, in the case where the number of the single scene recognition results "a" to be referenced when the total scene recognition before S1 is performed, is set as "a=5," five single scene recognition results are read out. Moreover, in step ST28, in the same manner as in step ST18 described above, in the total scene recognition, the scene SR currently being photographed is judged based on, for example, the number of recognitions (recognition frequency) and the newness of the recognition results in the scene recognition history record. A photographing mode is set in accordance with the judgment result of the scene SR.

Figure 23:
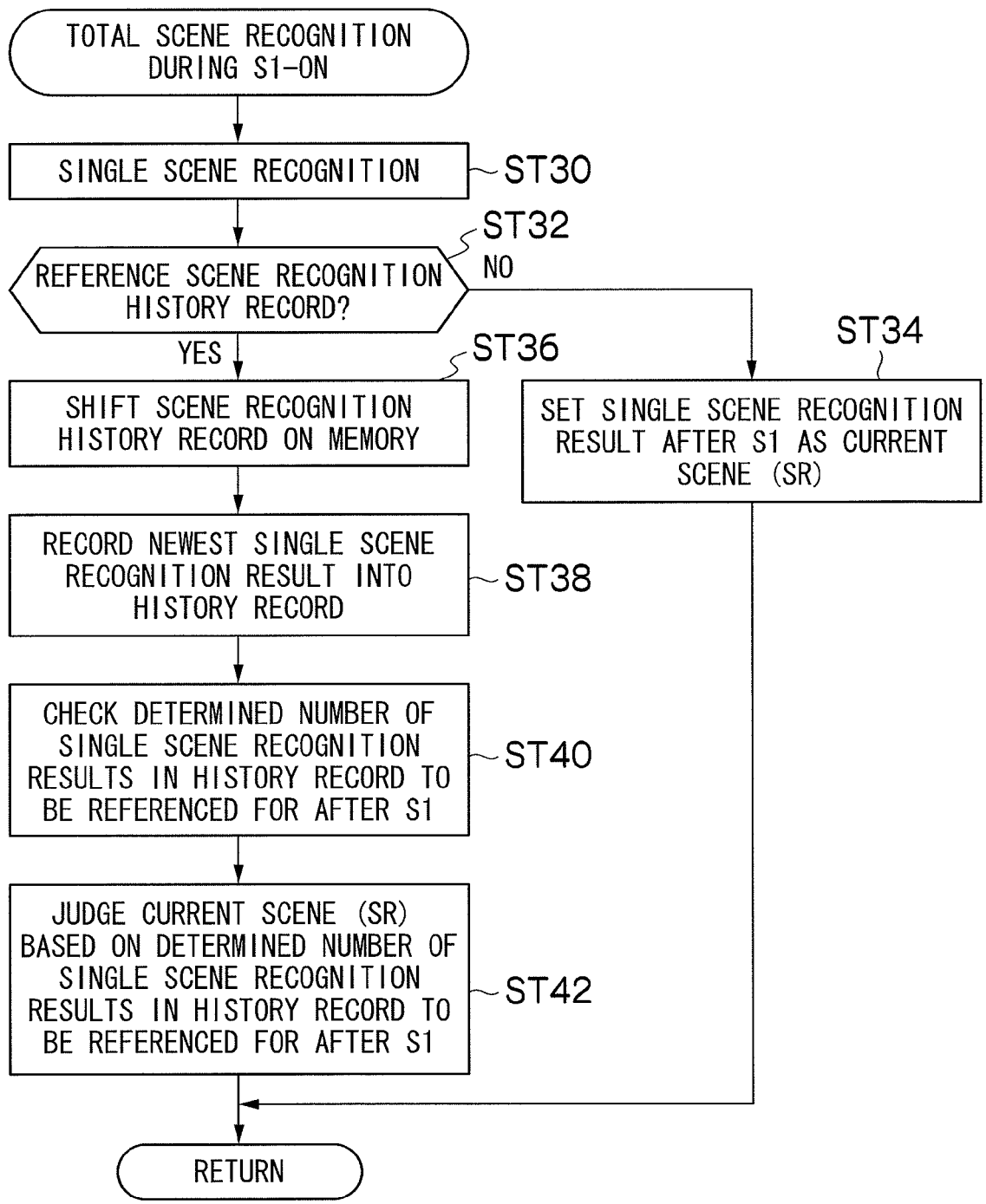
FIG. 23 is a flowchart showing total scene recognition processing (during S1-on) according to the second embodiment of the present invention.

FIG. 23 is a flowchart showing total scene recognition processing (during S1-on) according to the fifth embodiment of the present invention.

First, information on a face detection result, a focusing lens position, a zoom lens position, an in-focus state and a photometric value is acquired by the CPU 75, and scene recognition (single scene recognition) is performed using the information (step ST30).

A judgment is made on whether the scene recognition history record is to be referenced (step ST32). When the scene recognition during S1-on is set so as not to reference the scene recognition history record (No in step ST32), the single scene recognition result in step ST30 is set as the current scene (SR) (step ST34).

When the scene recognition during S1-on is set so as to reference the scene recognition history record (perform total scene recognition) (Yes in step ST32), storage areas of the scene recognition history record on the memory (RAM 69) are shifted to create a free area for storing the newest value of the single scene recognition result (step ST36). The newest single scene recognition result in step ST30 is written into the storage area for the newest value (step ST38).

Scene recognition history record including the number of single scene recognition results to be referenced for after S1, the number is smaller than the number of single scene recognition results to be referenced for before S1, is read (step ST40). Then, based on the scene recognition history record, the current scene SR is judged (step ST42). For example, in the case where the number of the single scene recognition results "a" to be referenced when the total scene recognition before S1 is performed, is set as "a=5," the number of the single scene recognition results "b" to be referenced when the total scene recognition after S1 is performed, can be set as "b=4." In this case, four single scene recognition results are read out. Moreover, in step ST42, in the same manner as in step S18 described above, in total scene recognition, the scene SR currently being photographed is judged based on, for example, the number of recognitions (recognition frequency) and the newness of the recognition result in the scene recognition history record. A photographing mode is set in accordance with the judgment result of the scene SR.

Generally, photographic information obtained by S1 AE and S1 AF (hereinafter referred to as S1 AUTO) is more accurate than photographic information obtained by CAE and CAF (hereinafter referred to as CAUTO). Therefore, it is assumed that a single scene recognition result based on photographic information during S1 AUTO is more accurate than a single scene recognition result based on that during CAUTO. In the present embodiment, by reducing the number of single scene recognition results used to judge a scene SR in total scene recognition during S1-on in comparison to before S1 (during live view display), the number of single scene recognition results before S1 in scene recognition history record to be referenced in total scene recognition during S1-on can be lowered and the influence thereof can be reduced.

According to the present embodiment, by reducing the number of single scene recognition results in history record used to judge a scene SR in total scene recognition during S1-on in comparison to before S1 (during live view display), it is now possible to achieve both stability of total scene recognition results before S1 and accuracy of total scene recognition results during S1-on.

Moreover, when placing emphasis on accuracy, it is also possible to arrange the total scene recognition during S1-on so that history record on single scene recognition results before S1 is not referenced.

Sixth Embodiment

Next, a sixth embodiment of the present invention will be described. Hereinafter, descriptions of configurations similar to that of the first embodiment shall be omitted.

In the present embodiment, total scene recognition is arranged so as to perform weighting when aggregating scene recognition history record such that a greater weight is assigned to a newer single scene recognition result (the newer the single scene recognition is, the greater the weight is assigned).

Figures 24A, 24B:
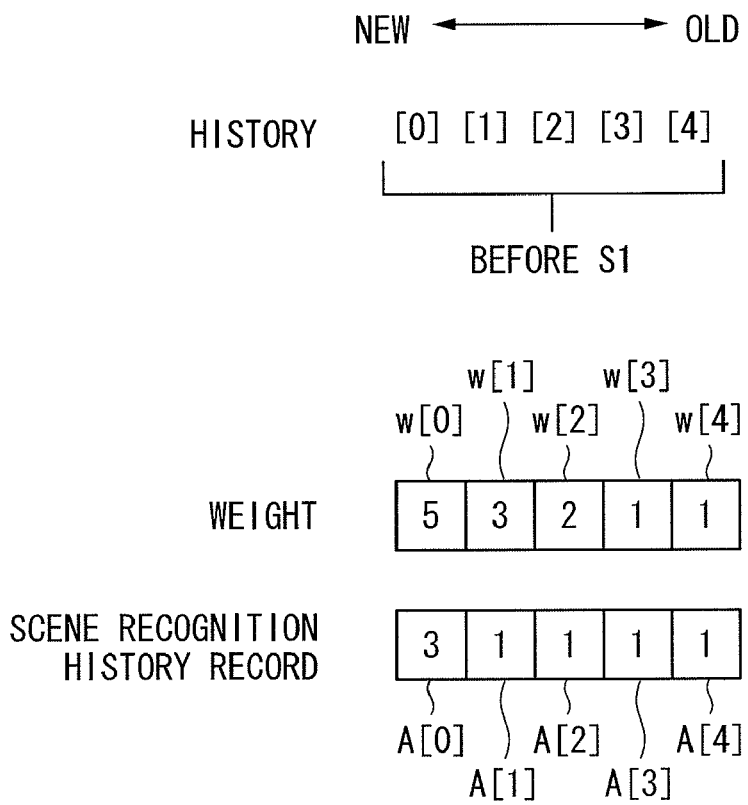
FIGS. 24A and 24B are diagrams schematically showing total scene recognition processing (before S1) according to a third embodiment of the present invention.

FIGS. 24A and 24B are diagrams schematically showing total scene recognition processing (before S1) according to the sixth embodiment of the present invention.

In the same manner as the first and fifth embodiments described above, as shown in FIG. 24A, during live view display before S1, single scene recognition results before S1 are sequentially stored as scene recognition history record in predetermined storage areas A[0], A[1], A[2], . . . of the RAM 69.

When a scene recognition history record is updated, the CPU 75 reads out and aggregates single scene recognition results from the scene recognition history record to perform total scene recognition. As shown in FIG. 24A, the digital camera 1 according to the present embodiment stores in advance in the RAM 69 weights w[i] (where i=0, 1, 2, . . . ) to be assigned to individual single scene recognition results in the scene recognition history record. The value of the weight w[i] is set so that the older the scene recognition history record is, the smaller the value becomes. The CPU 75 performs multiplication by weight w[i] when aggregating single scene recognition results to calculate a score for each scene, and the scene with the highest score is judged to be the current scene (SR).

In the example shown in FIG. 24A, the scores of the respective scenes are as follows, as shown FIGS. 24A and 24B.

$$\text{Score}(ID = 1) = 1 \times w[1] + 1 \times w[2] + 1 \times w[3] + 1 \times w[4]$$
$$= 3 + 2 + 1 + 1$$
$$= 7$$

$$\text{Score}(ID = 3) = 1 \times w[0]$$
$$= 5$$

Therefore, a scene ID indicating the total scene recognition result is SR=1 and the photographing mode is set to the "portrait" mode.

Figures 25A, 25B:
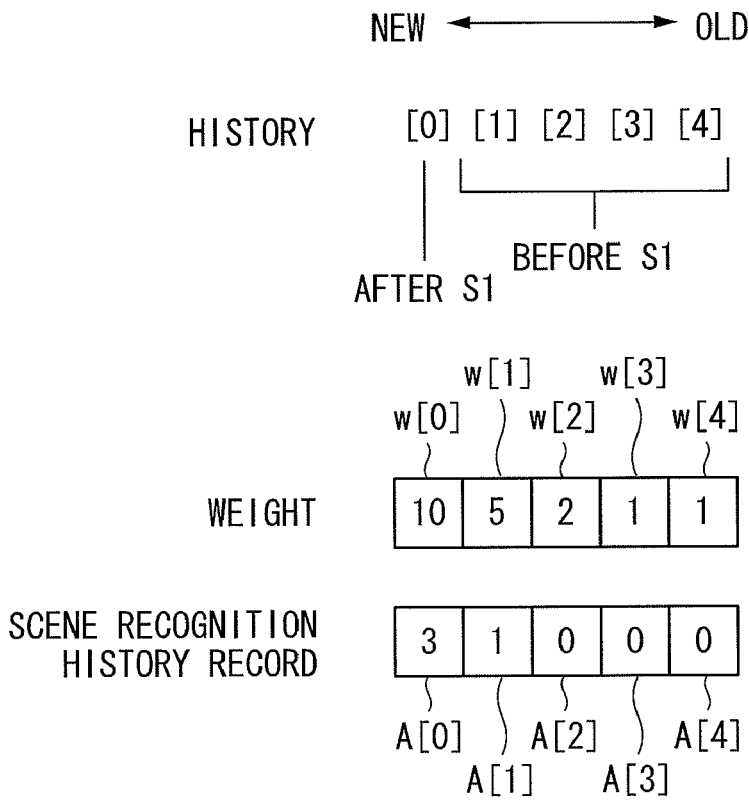
FIGS. 25A and 25B are diagrams schematically showing total scene recognition processing (during S1-on) according to the third embodiment of the present invention.

FIGS. 25A and 25B are diagrams schematically showing total scene recognition processing (during S1-on) according to the sixth embodiment of the present invention.

In the example shown in FIG. 25A, the weight assigned to the scene recognition results in the history record after S1 is maximized and the scores of the respective scenes are as follows, as shown in FIG. 25B.

$$\text{Score}(ID = 0) = 1 \times w[2] + 1 \times w[3] + 1 \times w[4]$$
$$= 2 + 1 + 1$$
$$= 4$$

$$\text{Score}(ID = 1) = 1 \times w[1]$$
$$= 5$$

$$\text{Score}(ID = 3) = 1 \times w[0]$$
$$= 10$$

Therefore, a scene ID indicating the total scene recognition result is SR=3 and the photographing mode is set to the "night scene" mode.

Moreover, it is also possible to arrange only results after S1 to be used by assigning weights with values greater than 0 to be applied to single scene recognition results during S1-on and setting all weights before S1 to 0.

While the present embodiment is arranged so that values of weights differ between before S1 and during S1-on (after S1-on), the same values may be used instead.

Figure 26:
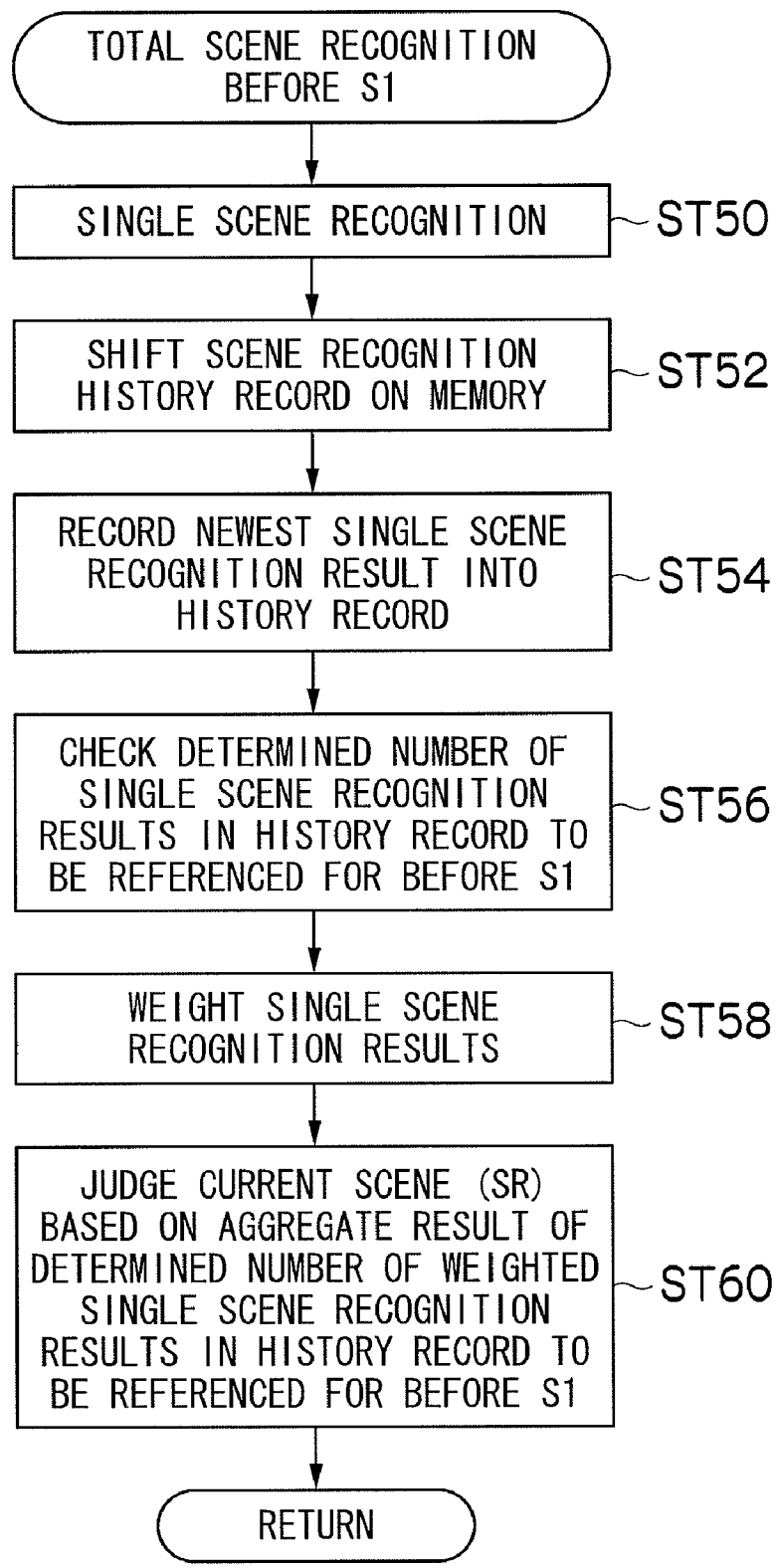
FIG. 26 is a flowchart showing total scene recognition processing (before S1) according to the third embodiment of the present invention.

FIG. 26 is a flowchart showing total scene recognition processing (before S1) according to the sixth embodiment of the present invention.

First, information on a face detection result, a focusing lens position, a zoom lens position, an in-focus state and a photometric value is acquired by the CPU 75, and scene recognition (single scene recognition) is performed using the information (step ST50).

Storage areas of scene recognition history record on the memory (RAM 69) are shifted to create a free area for storing the newest value of single scene recognition result (step ST52). The newest scene recognition result in step ST50 is written into the storage area for the newest value (step ST54).

Scene recognition history record including the number of single scene recognition results (the number of results to be referenced for before S1) used to judge a scene SR in the total scene recognition before S1 (during live view display) are read (step ST56) and weighting is executed (step ST58). Based on the weighted scene recognition history record, the current scene SR is judged (step ST60). Moreover, in step ST60, in the same manner as in step ST18 described above, in total scene recognition, the scene SR currently being photographed is judged based on, for example, the number of recognitions (recognition frequency) and the newness of the recognition result in the scene recognition history record. A photographing mode is set in accordance with the judgment result of the scene SR.

Figure 27:
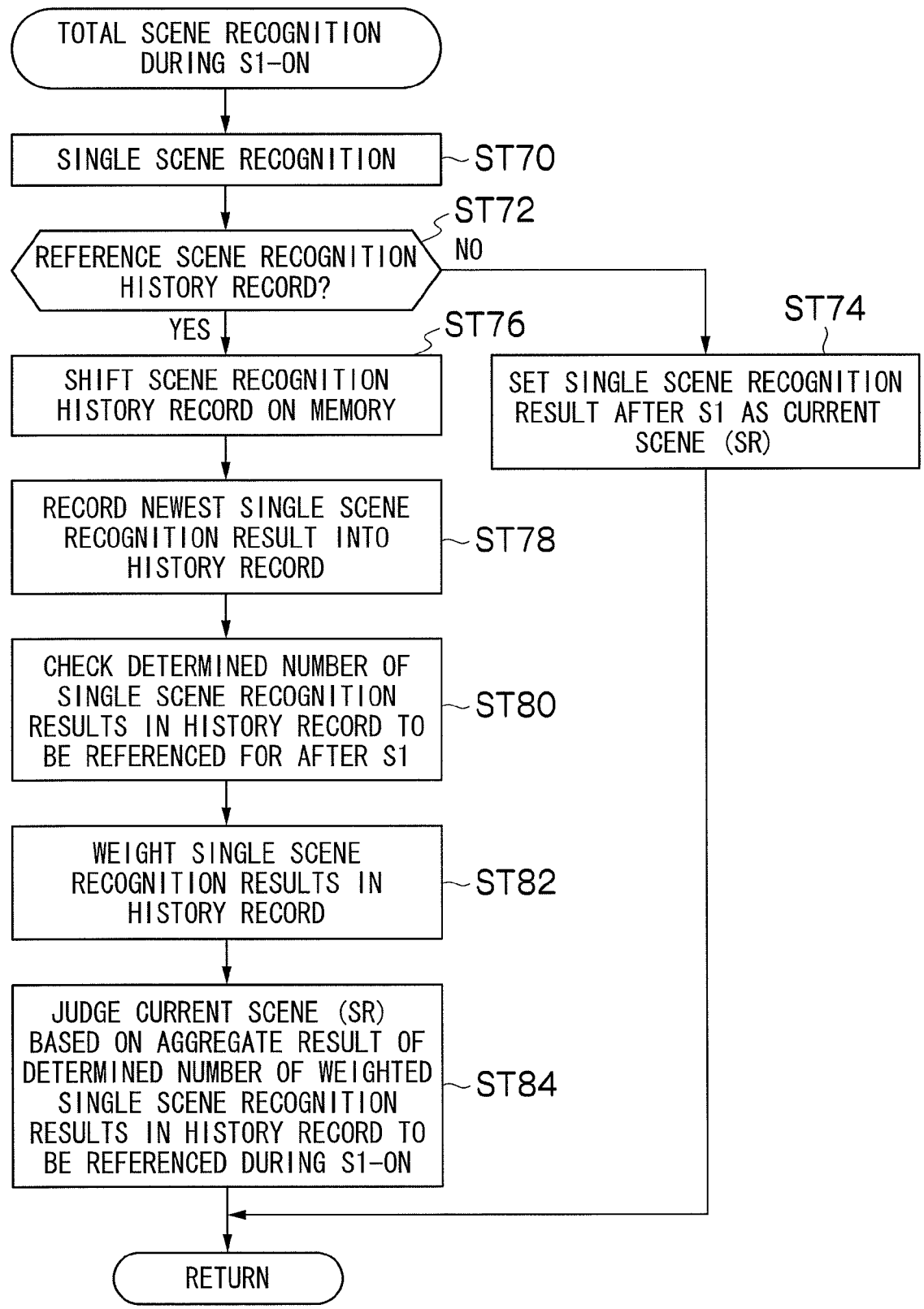
FIG. 27 is a flowchart showing total scene recognition processing (during S1-on) according to the third embodiment of the present invention.

FIG. 27 is a flowchart showing total scene recognition processing (during S1-on) according to the sixth embodiment of the present invention.

First, information on a face detection result, a focusing lens position, a zoom lens position, an in-focus state and a photometric value is acquired by the CPU 75, and scene recognition (single scene recognition) is performed using the information (step ST70).

A judgment is made on whether the scene recognition history record is to be referenced (step ST72). When the scene recognition during S1-on is set so as not to reference scene recognition history record (No in step ST72), the single scene recognition result in step ST70 is set as the current scene (SR) (step ST74).

When the scene recognition during S1-on is set so as to reference scene recognition history record (perform total scene recognition) (Yes in step ST72), storage areas of the scene recognition history record on the memory (RAM 69) are shifted to create a free area for storing the newest value of the scene recognition result (step ST76). The newest scene recognition result in step ST70 is written into the storage area for the newest value (step ST78).

Scene recognition history record including the number of single scene recognition results to be referenced for after S1 which is smaller than the number of single scene recognition results to be referenced for before S1 is read (step ST80) and weighting is executed (step ST82). Based on the scene recognition history record, the current scene SR is judged (step ST84). Moreover, in step ST84, in the same manner as in step ST18 described above, the scene SR currently being photographed is judged based on, for example, the number of recognitions (recognition frequency) and the newness of the recognition result in the scene recognition history record. A photographing mode is set in accordance with the judgment result of the scene SR.

According to the present embodiment, by weighting single scene recognition results when aggregating scene recognition history record such that the newer the single scene recognition result is, the greater the weight is assigned, responsiveness in the event of an occurrence of a scene change can be improved, and both stability and responsiveness of scene recognition results can be achieved. In addition, since single scene recognition results based on photographic information during S1 AUTO have a high degree of accuracy, it is now possible to improve scene recognition accuracy by increasing the weight assigned to single scene recognition results during S1-on.

Seventh Embodiment

Next, a seventh embodiment of the present invention will be described. Hereinafter, descriptions of configurations similar to that of the first embodiment shall be omitted.

The present embodiment involves storing history record of photographic information (information on photographic scene, for example, at least one of a face detection result, a focusing lens position, a zoom lens position, an in-focus state and a photometric value) to be used in scene recognition in the RAM 69, calculating representative values of the respective types of photographic information from the photographic information history record, and performing total scene recognition based on the representative values.

Figure 28:
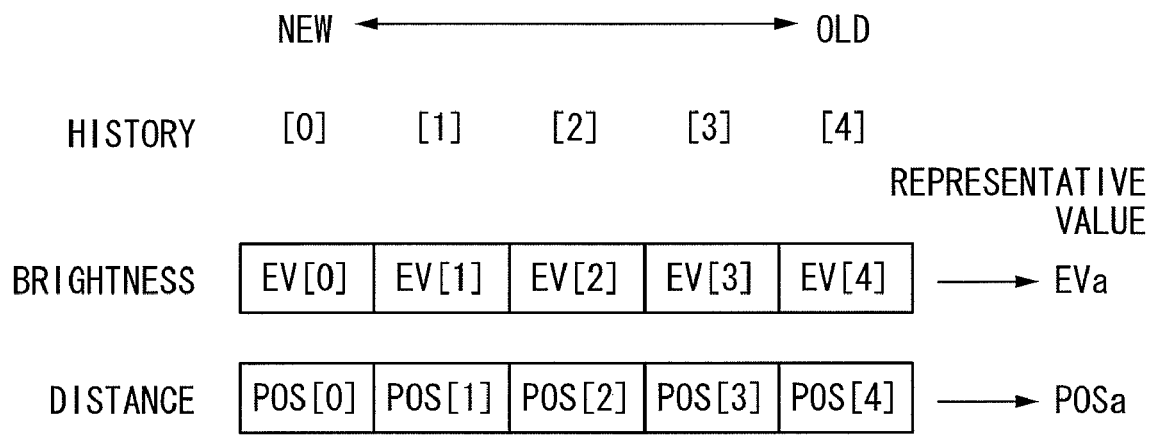
FIG. 28 is a diagram schematically showing total scene recognition processing according to a fourth embodiment of the present invention.

FIG. 28 is a diagram schematically showing total scene recognition processing according to the seventh embodiment of the present invention.

In the same manner as the first embodiment described above, the digital camera 1 according to the present embodiment performs continuous AE (CAE) and continuous AF (CAF) during the photographing mode. In addition, when the shutter button is pressed halfway (during S1-on), S1 AE and S1 AF are performed. As shown in FIG. 28, photographic information obtained by CAE and CAF, and S1 AE and S1 AF, is sequentially stored in the RAM 69.

While brightness EV[i] (photometric value or EV value) and subject distance POS[i] (e.g., focusing lens position) are presented as examples as photographic information in the example shown in FIG. 28, other information (such as face detection results (presence/absence of face, number of faces), zoom lens position, and photometric value) may be stored instead.

The CPU 75 reads out the photographic information history record and calculates representative values of the respective types of photographic information at each predetermined time interval. For example, photographic information can be read out whenever new photographic information is stored in the RAM 69 by CAE to update CAF and the photographic information in the RAM 69, or whenever a predetermined number of photographic information is stored in the history record). The CPU 75 performs total scene recognition based on the representative values. In this case, for example, an average value or a median value can be used as the representative value of photographic information. In addition, as the representative value, for example, it is also possible to use an average value calculated by arranging values of photographic information in a descending order of size, excluding N number of units of photographic information from the maximum value-size side and M number of units of photographic information from the minimum value-size side (where both N=M and N≠M are permissible), and calculating an average value on the remaining units of photographic information. In this case, since values extremely distanced from other photographic information can be excluded, the effects of scene change or noise can be mitigated.

Figure 29:
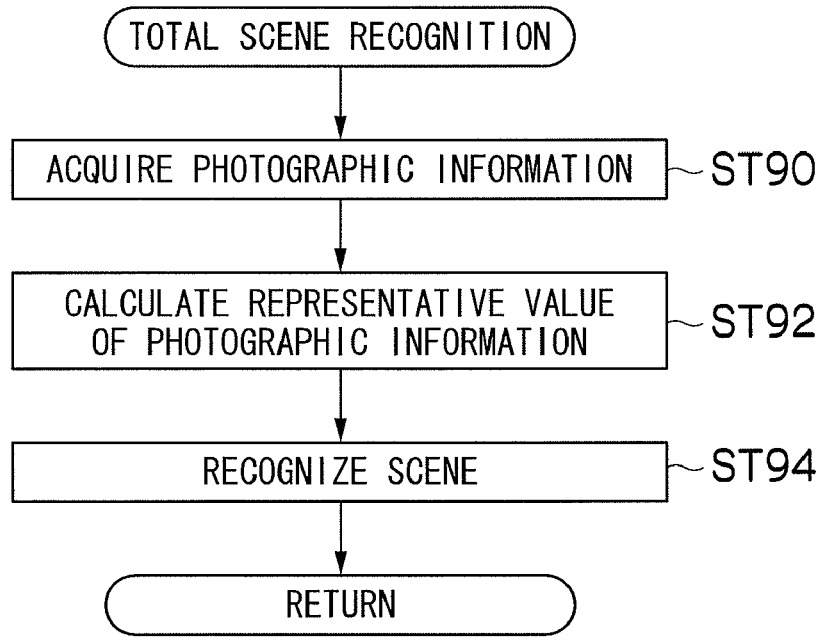
FIG. 29 is a flowchart showing total scene recognition processing according to the fourth embodiment of the present invention.

FIG. 29 is a flowchart showing total scene recognition processing according to the seventh embodiment of the present invention. The processing shown in FIG. 29 is executed during the photographing mode at each predetermined time interval. For example, the processing can be executed whenever new photographic information is stored in the RAM 69 by CAE and CAF to update the photographic information in the RAM 69, or whenever a predetermined number of photographic information is stored in the history record).

A photographic information history record (for example, brightness and subject distance) is read from the RAM 69 (step ST90), and representative values thereof (EVa, POSa) are calculated (step ST92).

Total scene recognition is performed based on the representative values (EVa, POSa) (step ST94) and a photographing mode is set in accordance with the total scene recognition result.

According to the present embodiment, by chronologically storing photographic information for scene recognition obtained during AE and AF, and performing scene recognition using photographic information history record, it is now possible to acquire a stable scene recognition result.

Eighth Embodiment

Next, an eighth embodiment of the present invention will be described. Hereinafter, descriptions of configurations similar to that of the first embodiment shall be omitted.

Figure 30:
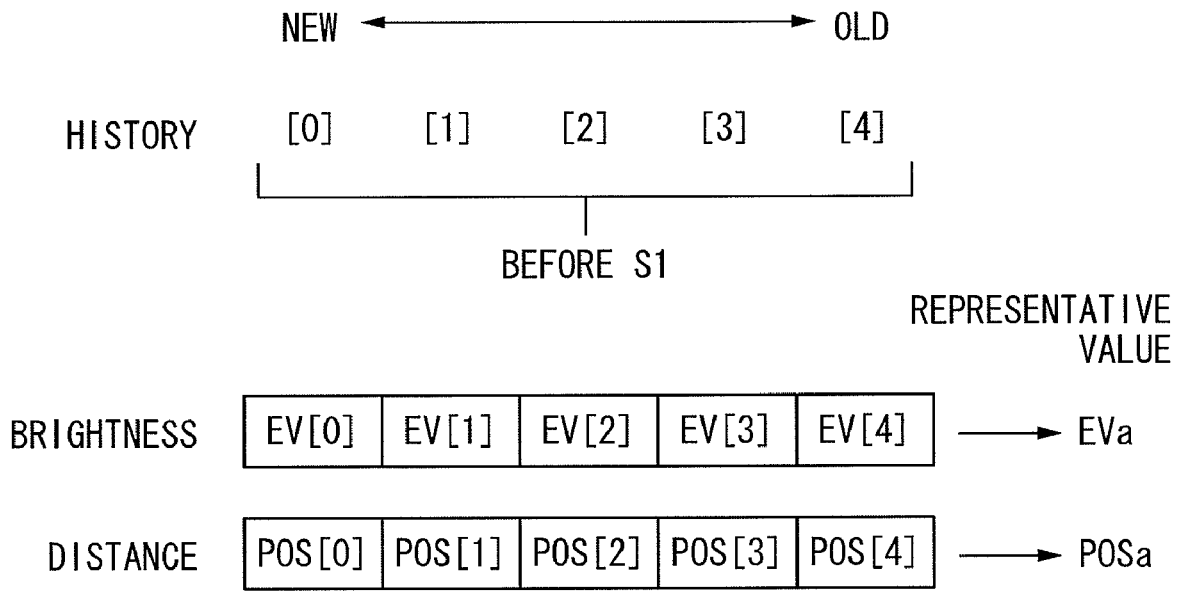
FIG. 30 is a diagram schematically showing total scene recognition processing (before S1) according to a fifth embodiment of the present invention.
Figure 31:
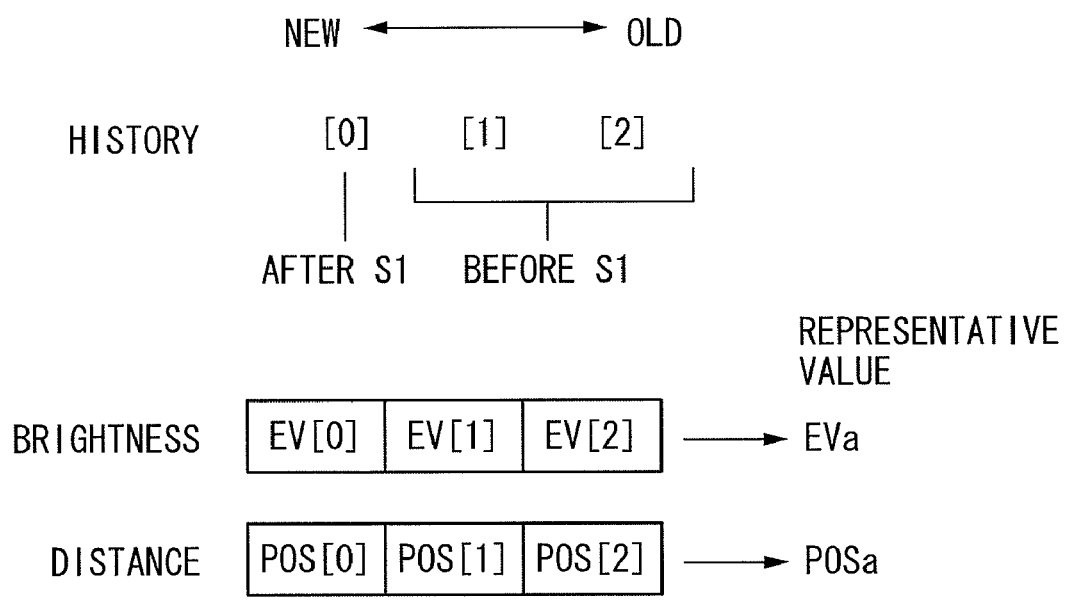
FIG. 31 is a diagram schematically showing total scene recognition processing (during S1-on) according to the fifth embodiment of the present invention.

FIG. 30 is a diagram schematically showing total scene recognition processing (before S1) according to the eighth embodiment of the present invention, and FIG. 31 is a diagram schematically showing total scene recognition processing (during S1-on) according to the eighth embodiment of the present invention. As shown in FIG. 30 and FIG. 31, the present embodiment is arranged such that the number of photographic information in photographic information history record to be used in total scene recognition during S1-on is reduced as compared to before S1 (during live view display).

Figure 32:
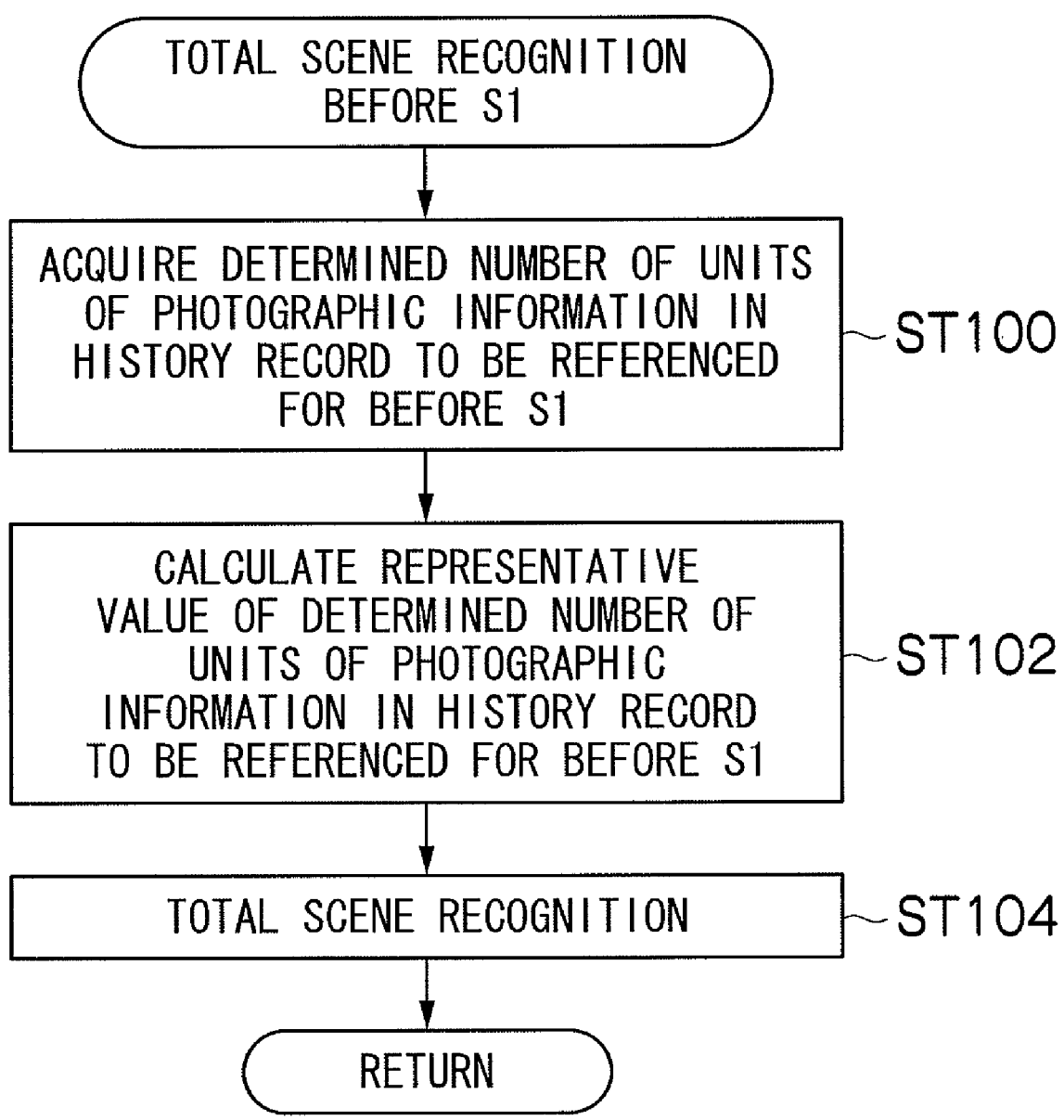
FIG. 32 is a flowchart showing total scene recognition processing (before S1) according to the fifth embodiment of the present invention.

FIG. 32 is a flowchart showing total scene recognition processing (before S1) according to the eighth embodiment of the present invention. The processing shown in FIG. 32 is executed during the photographing mode at each predetermined time interval. For example, the processing can be executed whenever new photographic information is stored in the RAM 69 by CAE and CAF to update the photographic information in the RAM 69, or whenever a predetermined number of photographic information is stored in the history record).

A photographic information history record including a predetermined number (corresponding to a number of units of photographic information to be referenced for before S1) of units of photographic information (for example, brightness and subject distance) is read from the RAM 69 (step ST100), and representative values thereof (EVa, POSa) are calculated (step ST102).

Total scene recognition is performed based on the representative values (EVa, POSa) (step ST104) and a photographing mode is set in accordance with the total scene recognition result.

Figure 33:
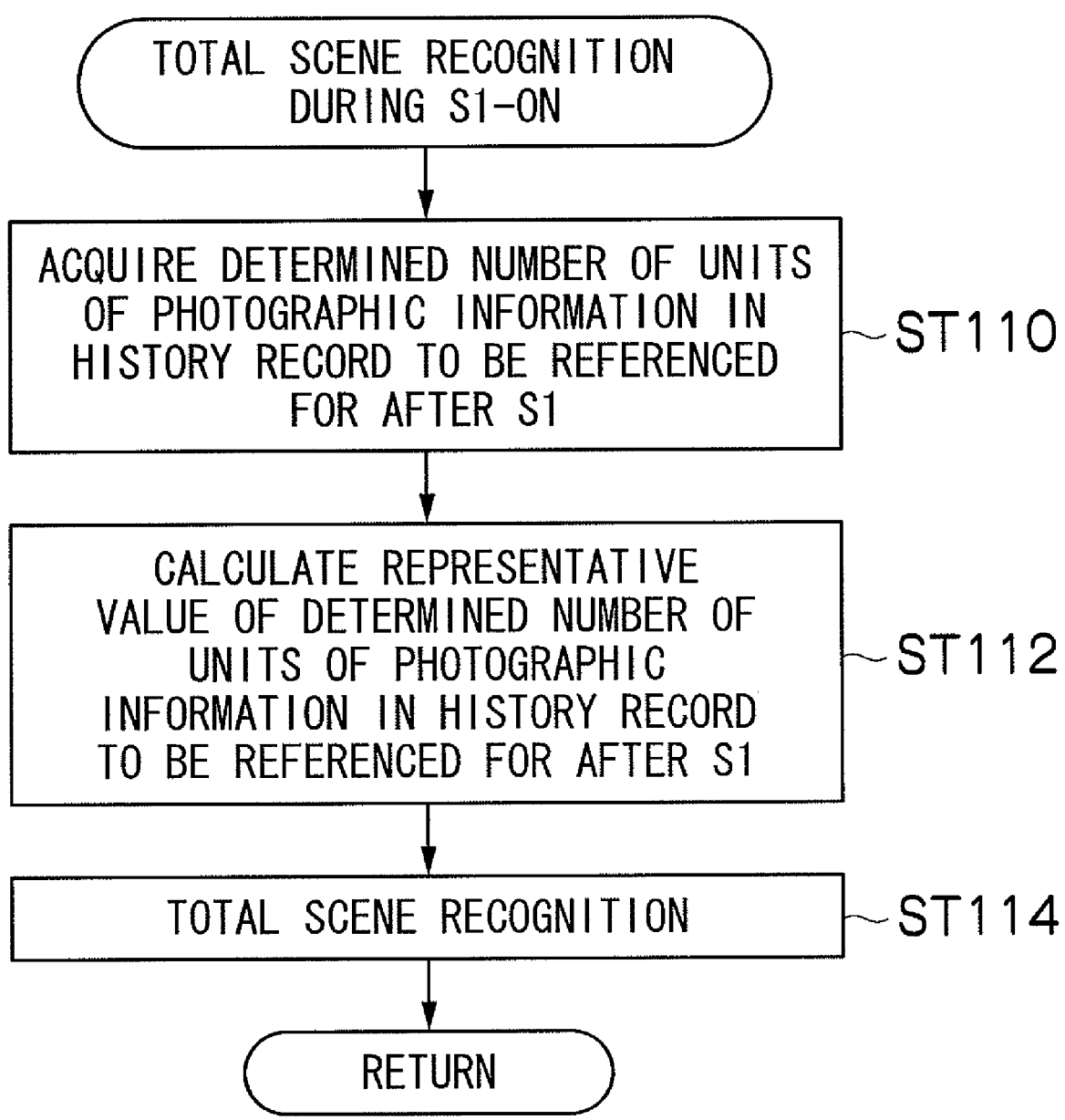
FIG. 33 is a flowchart showing total scene recognition processing (during S1-on) according to the fifth embodiment of the present invention.

FIG. 33 is a flowchart showing total scene recognition processing (during S1-on) according to the eighth embodiment of the present invention. The processing shown in FIG. 33 is executed after S1-on at each predetermined time interval. For example, the processing can be performed whenever new photographic information is stored in the RAM 69 by CAE and CAF to update the photographic information in the RAM 69, or whenever a predetermined number of photographic information is stored in history record).

A photographic information history record including a predetermined number of units of photographic information (for example, brightness and subject distance) (a number of units of photographic information to be referenced for after S1) which is smaller than the number of units of photographic information to be referenced for before S1 is read from the RAM 69 (step ST110), and representative values thereof (EVa, POSa) are calculated (step ST112).

Total scene recognition is performed based on the representative values (EVa, POSa) (step ST114) and a photographing mode is set in accordance with the total scene recognition result.

Generally, photographic information obtained through S1 AUTO is more accurate than photographic information obtained through CAUTO. In the present embodiment, the number of units of photographic information in the history record to be used in total scene recognition during S1-on is reduced in comparison to the number of units of photographic information to be used in total scene recognition before S1 (during live view display). Thus, the number of units of photographic information before S1 in scene recognition history record to be referenced in total scene recognition during S1-on can be lowered and the influence thereof can be reduced. Accordingly, it is now possible to achieve both stability of total scene recognition results before S1 and accuracy of total scene recognition results during S1-on.

Ninth Embodiment

Next, a ninth embodiment of the present invention will be described. Hereinafter, descriptions of configurations similar to that of the first embodiment shall be omitted.

The present embodiment involves performing weighting when calculating representative values of photographic information such that the value of a weight assigned to new photographic information is increased.

Figure 34:
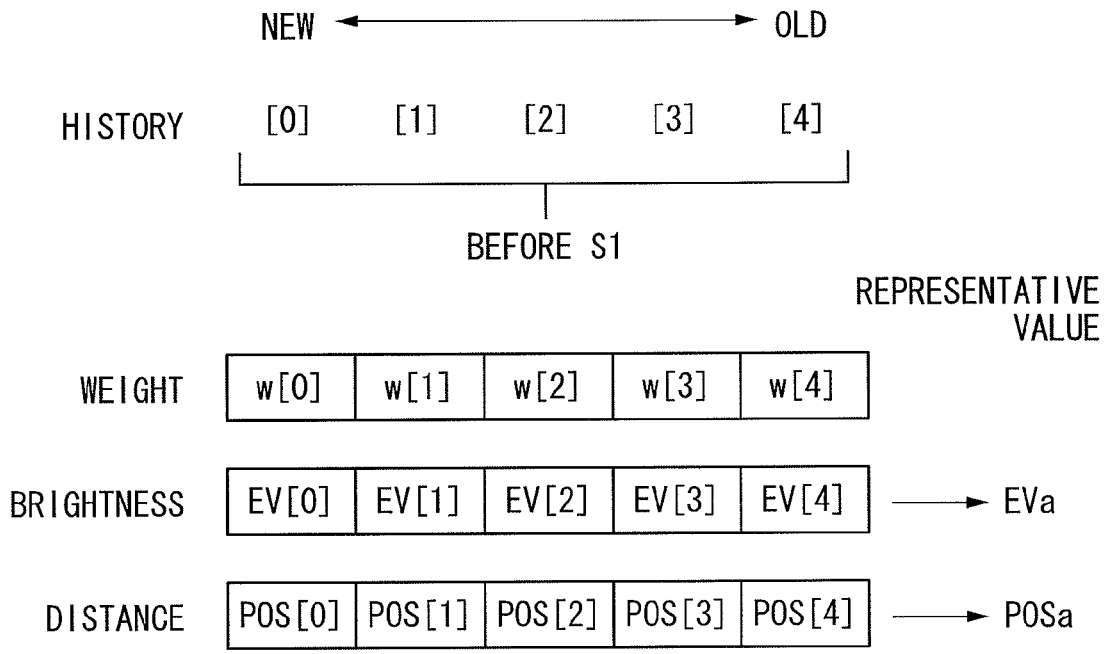
FIG. 34 is a diagram schematically showing total scene recognition processing (before S1) according to a sixth embodiment of the present invention.
Figure 35:
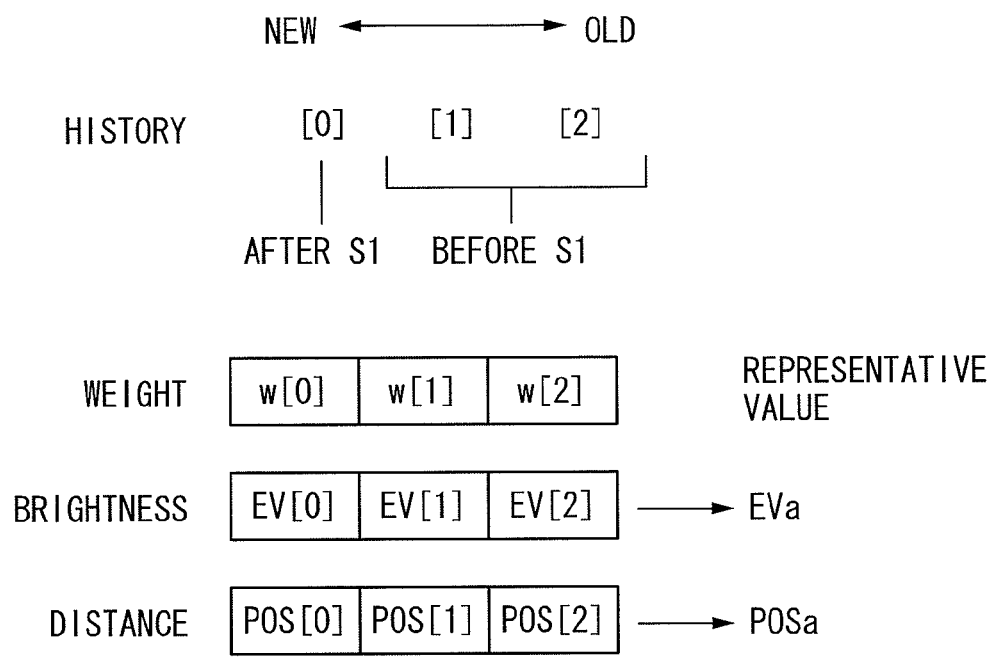
FIG. 35 is a diagram schematically showing total scene recognition processing (during S1-on) according to the sixth embodiment of the present invention.

FIG. 34 is a diagram schematically showing total scene recognition processing (before S1) according to the ninth embodiment of the present invention, and FIG. 35 is a diagram schematically showing total scene recognition processing (during S1-on) according to the ninth embodiment of the present invention.

As shown in FIG. 34 and FIG. 35, the digital camera 1 according to the present embodiment stores in advance in the RAM 69 weights w[i] (where i=0, 1, 2, . . . ) to be assigned when aggregating photographic information. The value of the weight w[i] is set so that the older the photographic information in the history record is, the smaller the value is assigned. Moreover, the value of the weight w[i] may differ between before S1 and during S1-on, or may be the same.

Figure 36:
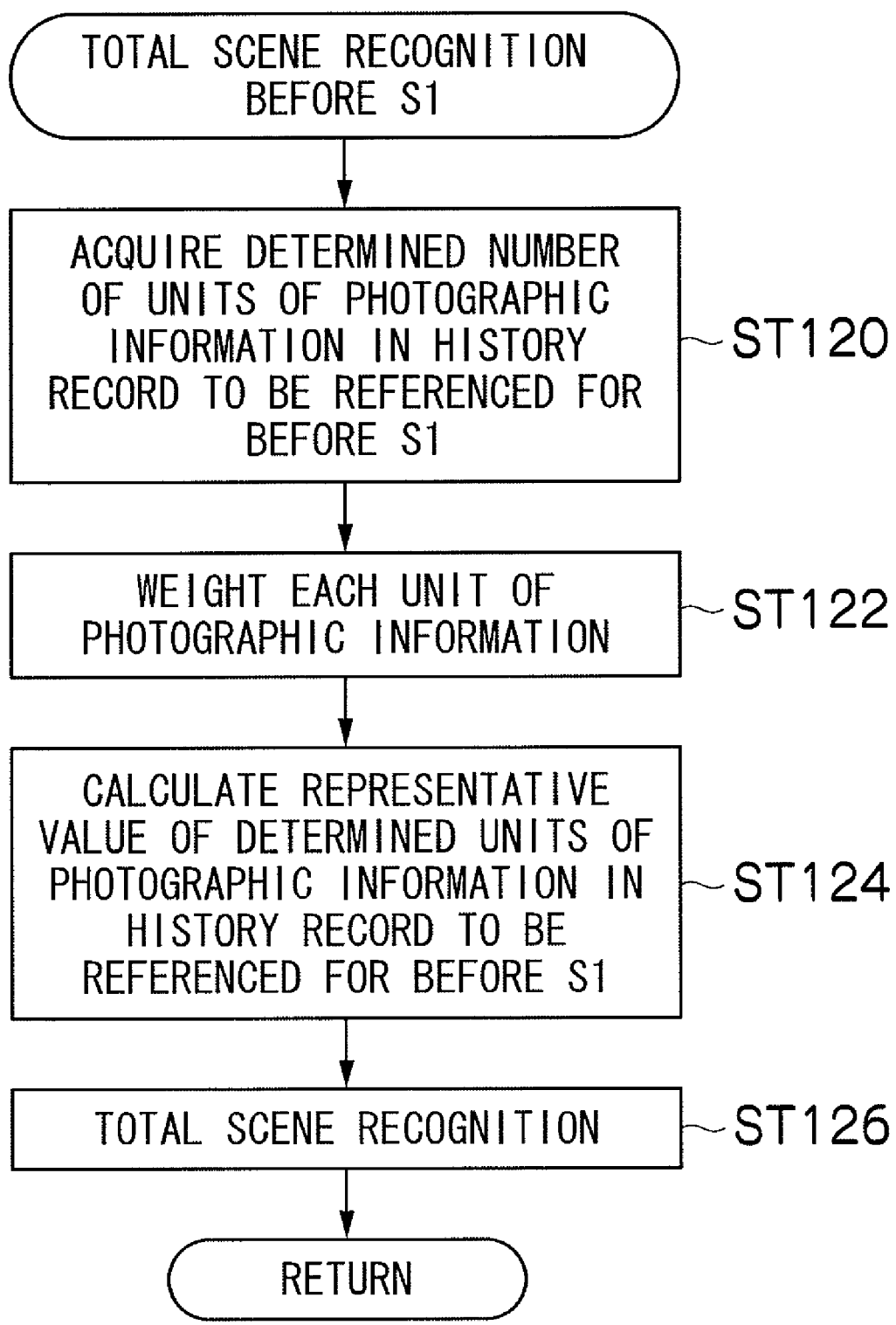
FIG. 36 is a flowchart showing total scene recognition processing (before S1) according to the sixth embodiment of the present invention.

FIG. 36 is a flowchart showing total scene recognition processing (before S1) according to the ninth embodiment of the present invention. The processing shown in FIG. 36 is executed during the photographing mode at each predetermined time interval. For example, the processing can be executed whenever new photographic information is stored in the RAM 69 by CAE and CAF to update the photographic information in the RAM 69, or whenever a predetermined number of photographic information is stored in the history record.

A photographic information history record including a predetermined number (corresponding to the number to be referenced for before S1) of units of photographic information (for example, brightness and subject distance) is read from the RAM 69 (step ST120), each of the photographic information is weighted (step ST122), and representative values (weighted average values) EVa and POSa thereof are calculated (step ST124).

Total scene recognition is performed based on the representative values (EVa, POSa) (step ST126) and a photographing mode is set in accordance with the total scene recognition result.

Figure 37:
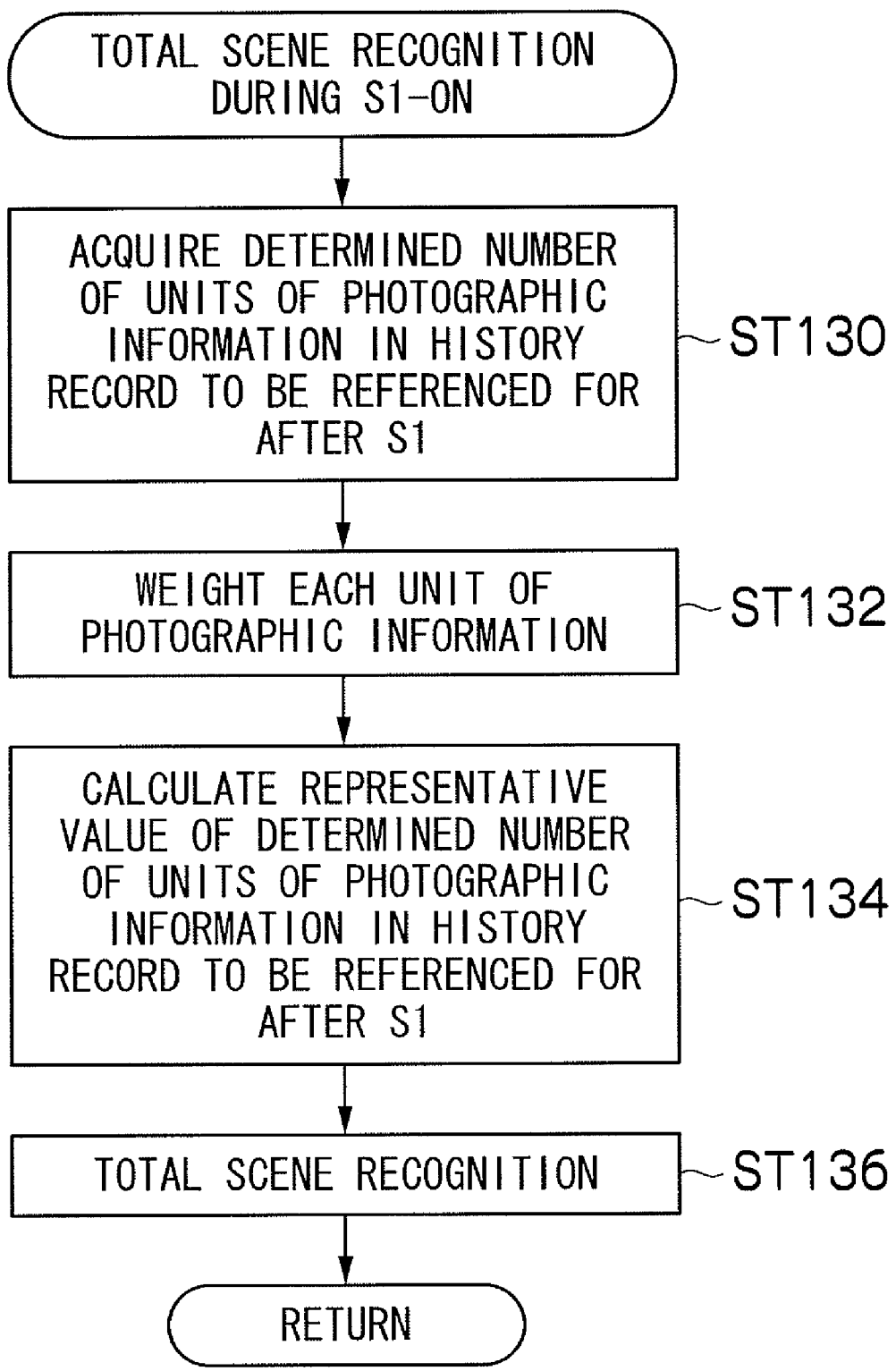
FIG. 37 is a flowchart showing total scene recognition processing (during S1-on) according to the sixth embodiment of the present invention.

FIG. 37 is a flowchart showing total scene recognition processing (during S1-on) according to the ninth embodiment of the present invention. The processing shown in FIG. 37 is executed after S1-on at each predetermined time interval. For example, the processing can be executed whenever new photographic information is stored in the RAM 69 by CAE and CAF to update the photographic information in the RAM 69, or whenever a predetermined number of photographic information is stored in history record.

A photographic information history record including a predetermined number of units of photographic information (for example, brightness and subject distance), the number of units of photographic information to be referenced for after S1 which is smaller than the number of units of photographic information to be referenced for before S1 is read from the RAM 69 (step ST130), each of the photographic information is weighted (step ST132), and representative values (weighted average values) EVa and POSa thereof are calculated (step ST134).

Total scene recognition is performed based on the representative values (EVa, POSa) (step ST136) and a photographing mode is set in accordance with the total scene recognition result.

According to the present embodiment, by performing weighting per photographic information when calculating representative values of photographic information, responsiveness in the event of an occurrence of a scene change can be improved, and both stability and responsiveness of scene recognition results can be achieved. In addition, since photographic information obtained during S1 AUTO has a high degree of accuracy, it is now possible to improve scene recognition accuracy by increasing the weight assigned to photographic information during S1-on.

What is claimed is:

1. An imaging apparatus comprising:
an information acquiring device configured to acquire photographic information which is information on a photographic scene from an image;
a reference information registering device configured to register reference information which is set based on the photographic information;
a scene change determining device configured to determine whether or not the scene has changed based on the reference information stored in the reference information registering device and current photographic information acquired from a current image by the information acquiring device;
a scene recognizing device configured to perform a scene recognition processing to recognize a scene based the current photographic information acquired from the current image by the information acquiring device when it is determined, by the scene change determining device, that a scene is changed; and
a control device configured to perform at least one of display control, photographic control, signal processing control, and information recording control in response to the result of the scene recognition processing by the scene recognizing device,
wherein the scene change determining device comprises:
a single scene change determining device which successively determines the occurrence/nonoccurrence of scene change based on the reference information stored in the reference information registering device and the current photographic information acquired by the information acquiring device;
a scene change history record registering device which registers, as a scene change history record, a history of single scene change determination results by the single scene determining device; and
a total scene change determining device which determines whether the photographic scene has changed or not based on the scene change history record.

2. The imaging apparatus according to claim 1, wherein the total scene recognizing device includes:
a weight setting device which weights each single scene recognition result in the scene recognition history record registered in the scene recognition history record registering device such that the greater weight is assigned to the newer single scene recognition result; and
a calculating device which calculates a cumulative score for each single scene recognition result weighted by the weight setting device, and
the total scene recognizing device determines a single scene recognition result with the highest cumulative score calculated by the calculating device, as the total scene recognition result.

3. An imaging apparatus comprising:
an information acquiring device configured to acquire photographic information which is information on a photographic scene from an image;

a reference information registering device configured to register reference information which is set based on the photographic information;

a scene change determining device configured to determine whether or not the scene has changed based on the reference information stored in the reference information registering device and current photographic information acquired from a current image by the information acquiring device;

a scene recognizing device configured to perform a scene recognition processing to recognize a scene based the current photographic information acquired from the current image by the information acquiring device when it is determined, by the scene change determining device, that a scene is changed; and a control device configured to perform at least one of display control, photographic control, signal processing control, and information recording control in response to the result of the scene recognition processing by the scene recognizing device, wherein the scene recognizing device comprises:

a single scene recognizing device which executes, for a predetermined time period or a predetermined times, single scene recognition for recognizing the photographic scene based on the photographic information acquired by the information acquiring device;

a scene recognition history record registering device which registers, as a scene recognition history record, a history of single scene recognition results by the single scene recognizing device; and a total scene recognizing device which executes total scene recognition for recognizing the photographic scene based on the scene recognition history record registered in the scene recognition history record registering device.

4. The imaging apparatus according to claim 3, wherein the total scene recognizing device detects a photographic scene with a greatest frequency from the scene recognition history record, and recognizes the photographic scene with the greatest frequency as the total scene recognition result.

5. The imaging apparatus according to claim 4, wherein when the total scene recognizing device detects a plurality of photographic scenes with the greatest frequency are detected, the total scene recognizing device recognizes a most recent photographic scene with the greatest frequency as the total scene recognition result.

6. The imaging apparatus according to claim 4, further comprising a shutter button which instructs photometering and ranging for primary exposure when halfway pressed and instructs primary exposure when fully pressed, wherein a number of single scene recognition results before the shutter button is halfway pressed and a number of single scene recognition results after the shutter button is halfway pressed are separately set in the scene recognition history record registered in the scene recognition history record registering device.

7. An imaging apparatus comprising:

an information acquiring device configured to acquire photographic information which is information on a photographic scene from an image;

a reference information registering device configured to register reference information which is set based on the photographic information;

a scene change determining device configured to determine whether or not the scene has changed based on the reference information stored in the reference information registering device and current photographic information acquired from a current image by the information acquiring device;

a scene recognizing device configured to perform a scene recognition processing to recognize a scene based the current photographic information acquired from the current image by the information acquiring device when it is determined, by the scene change determining device, that a scene is changed; and a control device configured to perform at least one of display control, photographic control, signal processing control, and information recording control in response to the result of the scene recognition processing by the scene recognizing device;

a photographic information history record registering device which registers, as a photographic information history record, a history of the photographic information acquired by the information acquiring device, wherein the scene recognizing device comprises a total scene recognizing device which performs total scene recognition for recognizing the photographic scene based on the photographic information history record registered in the history record registering device; and further comprising:

a shutter button which instructs photometering and ranging for primary exposure when halfway pressed and instructs primary exposure when fully pressed, wherein a number of units of photographic information before the shutter button is halfway pressed and a number of units of photographic information after the shutter button is halfway pressed are separately set in the photographic information history record registered in the photographic information history record registering device.

8. An imaging method comprising:

acquiring photographic information which is information on a photographic scene from an image;

recognizing a scene from the acquired photographic information;

storing reference information which is set based on the photographic information corresponding to the scene recognition result;

determining whether the scene has changed or not from based on the stored reference information and the current photographic information acquired from a current image;

performing a scene recognition processing to recognize the scene based on the current photographic information when it is determined that the scene has changed; and performing at least one of display control, photographic control, signal processing control, and information recording control in response to the result of the scene recognition processing wherein the recognizing of a scene includes:

a single scene recognizing step for recognizing the photographic scene based on the acquired photographic information;

a scene recognition history record registering step for registering a predetermined number of newest single scene recognition results recognized in the single scene recognizing step as a scene recognition history record in a history record registering device; and a total scene recognizing step for recognizing the photographic scene based on the scene recognition history record registered in the scene recognition history record registering device.

* * * * *